US010540940B2

(12) United States Patent
Ikeda et al.

(10) Patent No.: US 10,540,940 B2
(45) Date of Patent: Jan. 21, 2020

(54) DISPLAY DEVICE

(71) Applicant: Japan Display Inc., Tokyo (JP)

(72) Inventors: Kojiro Ikeda, Tokyo (JP); Masaaki Kabe, Tokyo (JP); Chikyu Nakaoka, Tokyo (JP)

(73) Assignee: Japan Display Inc., Tokyo (JP)

( * ) Notice: Subject to any disclaimer, the term of this patent is extended or adjusted under 35 U.S.C. 154(b) by 131 days.

(21) Appl. No.: 15/727,931

(22) Filed: Oct. 9, 2017

(65) Prior Publication Data

US 2018/0122332 A1 May 3, 2018

(30) Foreign Application Priority Data

Nov. 1, 2016 (JP) .................................. 2016-214518

(51) Int. Cl.
*G09G 5/02* (2006.01)
(52) U.S. Cl.
CPC ................... *G09G 5/026* (2013.01)
(58) Field of Classification Search
CPC .................................................... H01L 27/156
USPC ........................................ 345/87, 213, 690
See application file for complete search history.

(56) References Cited

U.S. PATENT DOCUMENTS

| 7,515,122 | B2* | 4/2009 | Miller | G09G 3/3216 |
| | | | | 345/76 |
| 8,552,635 | B2* | 10/2013 | Kim | G09G 3/2003 |
| | | | | 313/504 |
| 8,952,374 | B2* | 2/2015 | Jinta | H01L 27/3218 |
| | | | | 257/40 |
| 2005/0083355 | A1 | 4/2005 | Tezuka et al. | |
| 2005/0225548 | A1 | 10/2005 | Han et al. | |
| 2011/0181633 | A1* | 7/2011 | Higashi | G09G 3/2003 |
| | | | | 345/691 |
| 2016/0155776 | A1 | 6/2016 | Kabe et al. | |
| 2016/0155777 | A1 | 6/2016 | Kabe et al. | |

FOREIGN PATENT DOCUMENTS

| JP | H09-204156 A | 8/1997 |
| JP | 2005-141209 A | 6/2005 |
| JP | 5227018 B2 | 7/2013 |
| JP | 2016-102935 A | 6/2016 |
| JP | 2016-102971 A | 6/2016 |

* cited by examiner

*Primary Examiner* — Calvin C Ma
(74) *Attorney, Agent, or Firm* — K&L Gates LLP

(57) ABSTRACT

According to one embodiment, a display device, includes a first main pixel, wherein the first main pixel comprises a first sub-pixel displaying a first color, a second sub-pixel displaying a second color different from the first color, and a third sub-pixel displaying a third color different from the first and second colors, the first and second sub-pixels are arranged in a second direction, the first and third sub-pixels are arranged in a first direction, and the second and third sub-pixels are arranged in the first direction, and each of the first and second sub-pixels has a first length in the first direction, and the third sub-pixel has a second length smaller than the first length in the first direction.

16 Claims, 37 Drawing Sheets

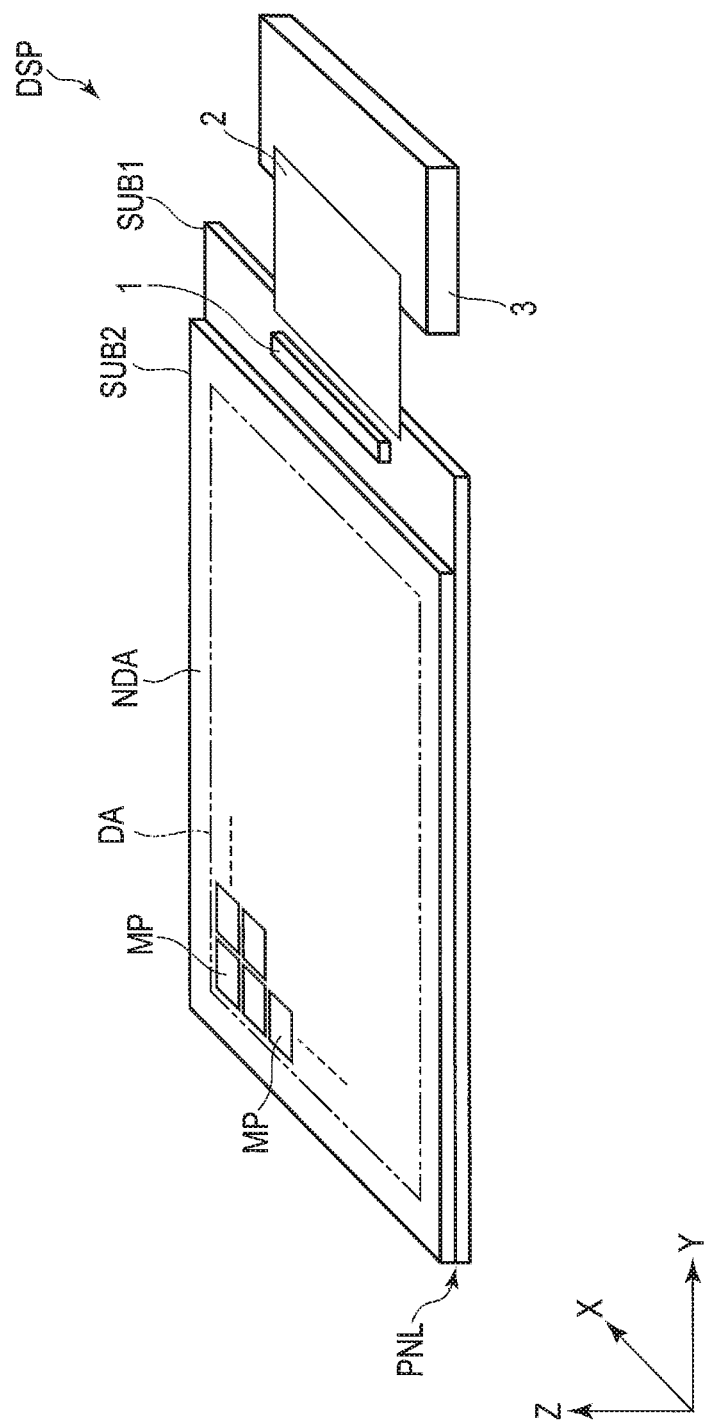
F I G. 1

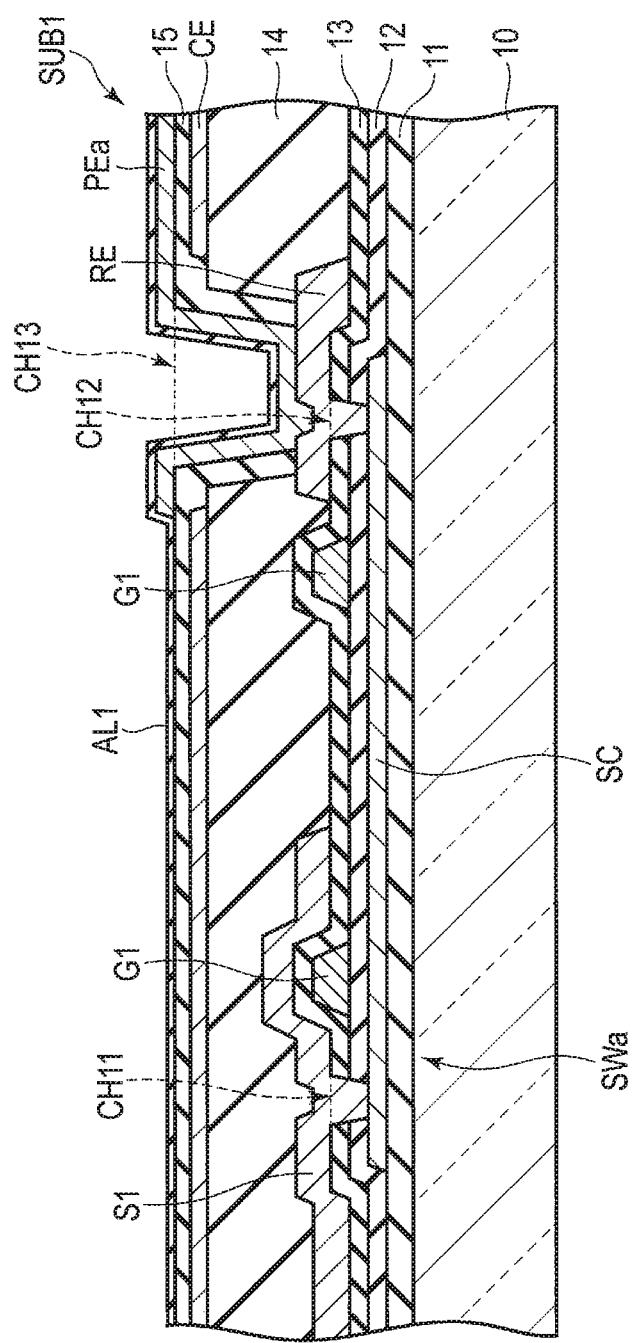
F I G. 3

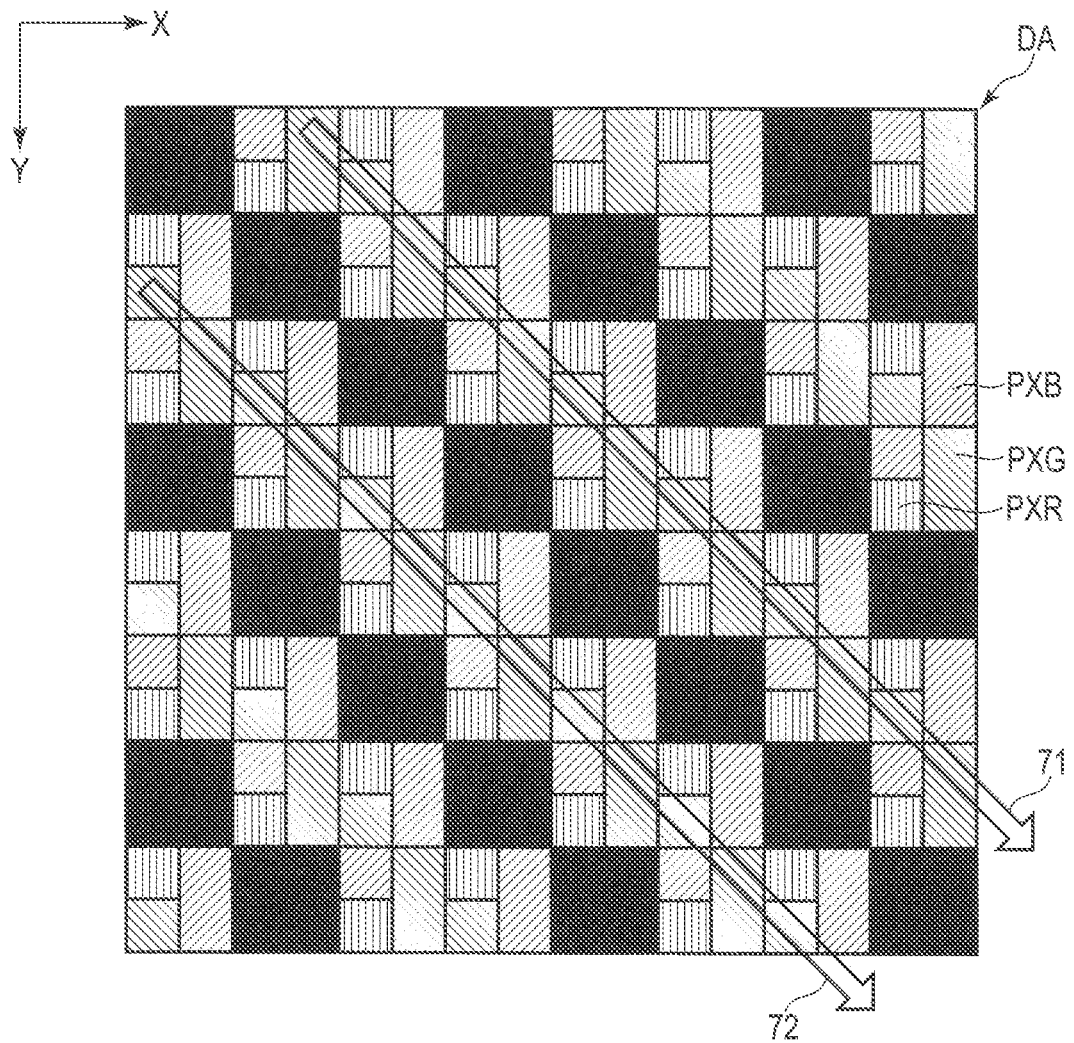
F I G. 7

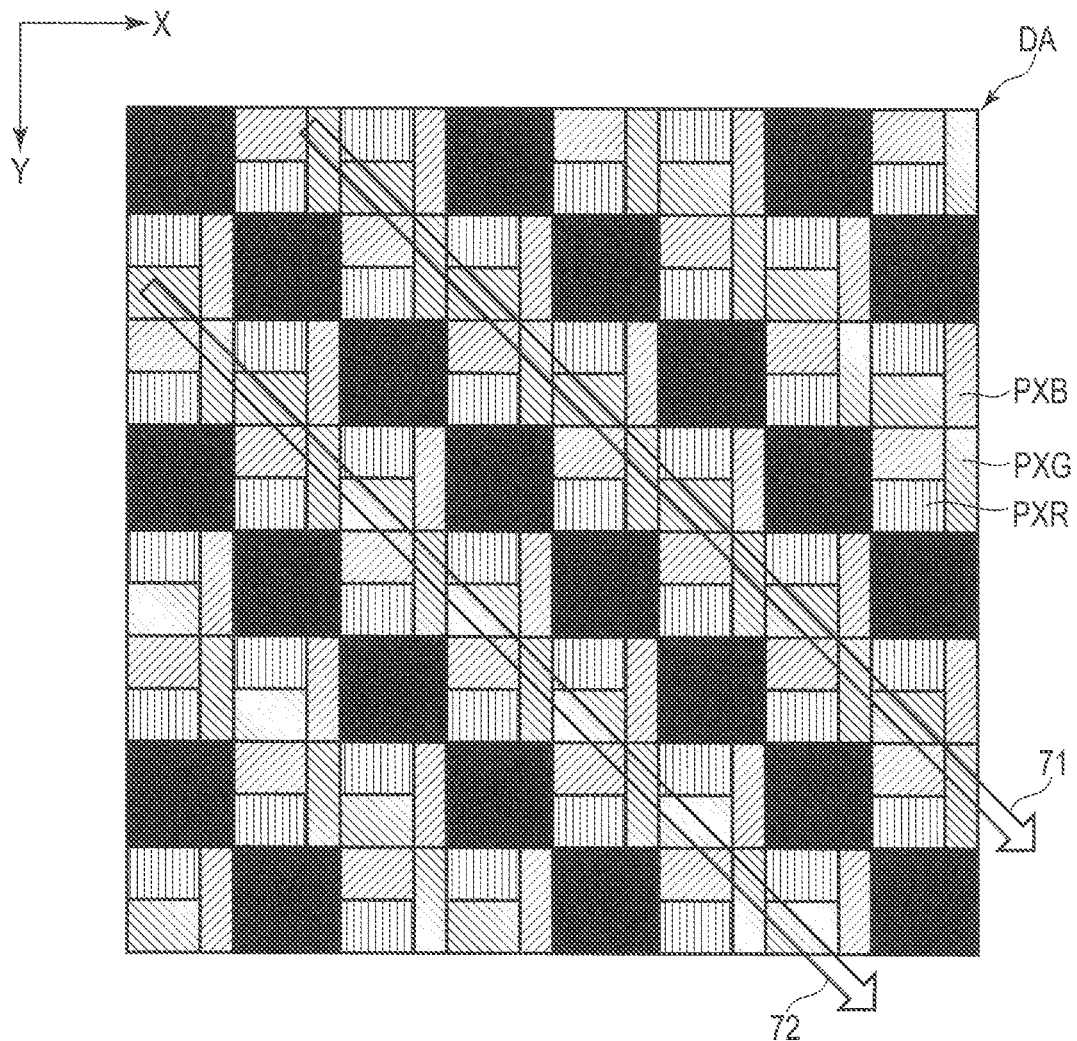
F I G. 10

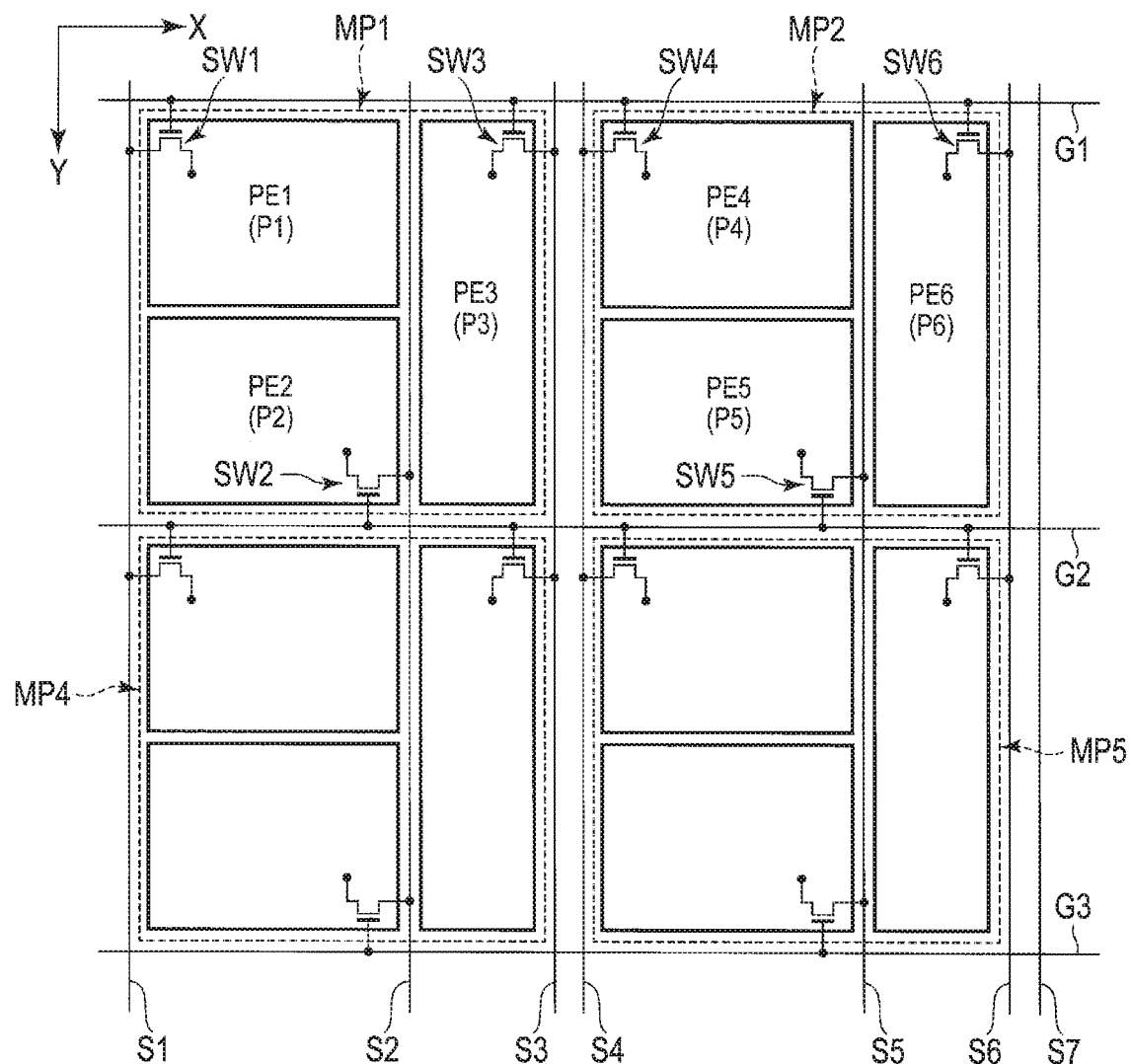
F I G. 12

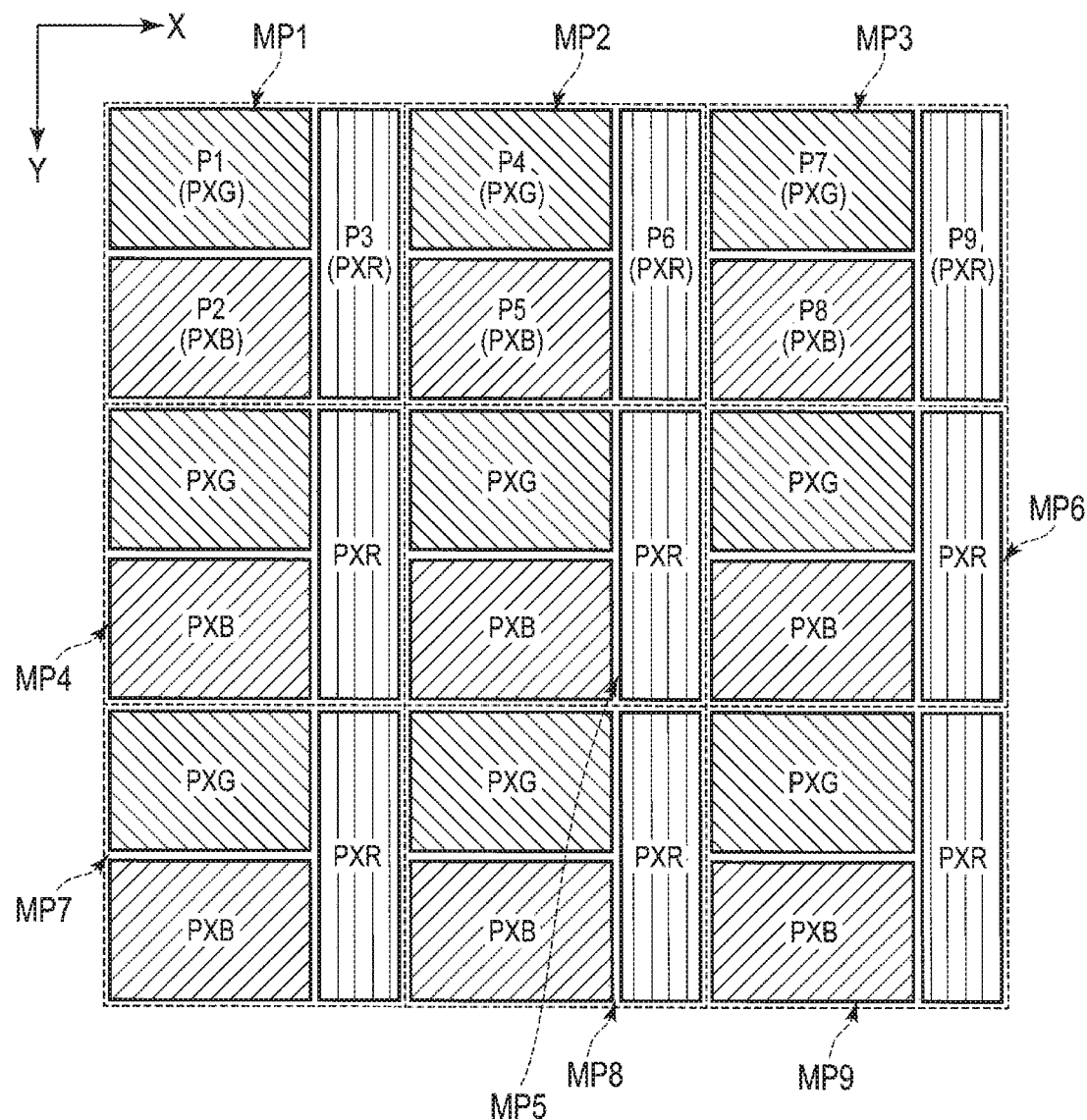
F I G. 13

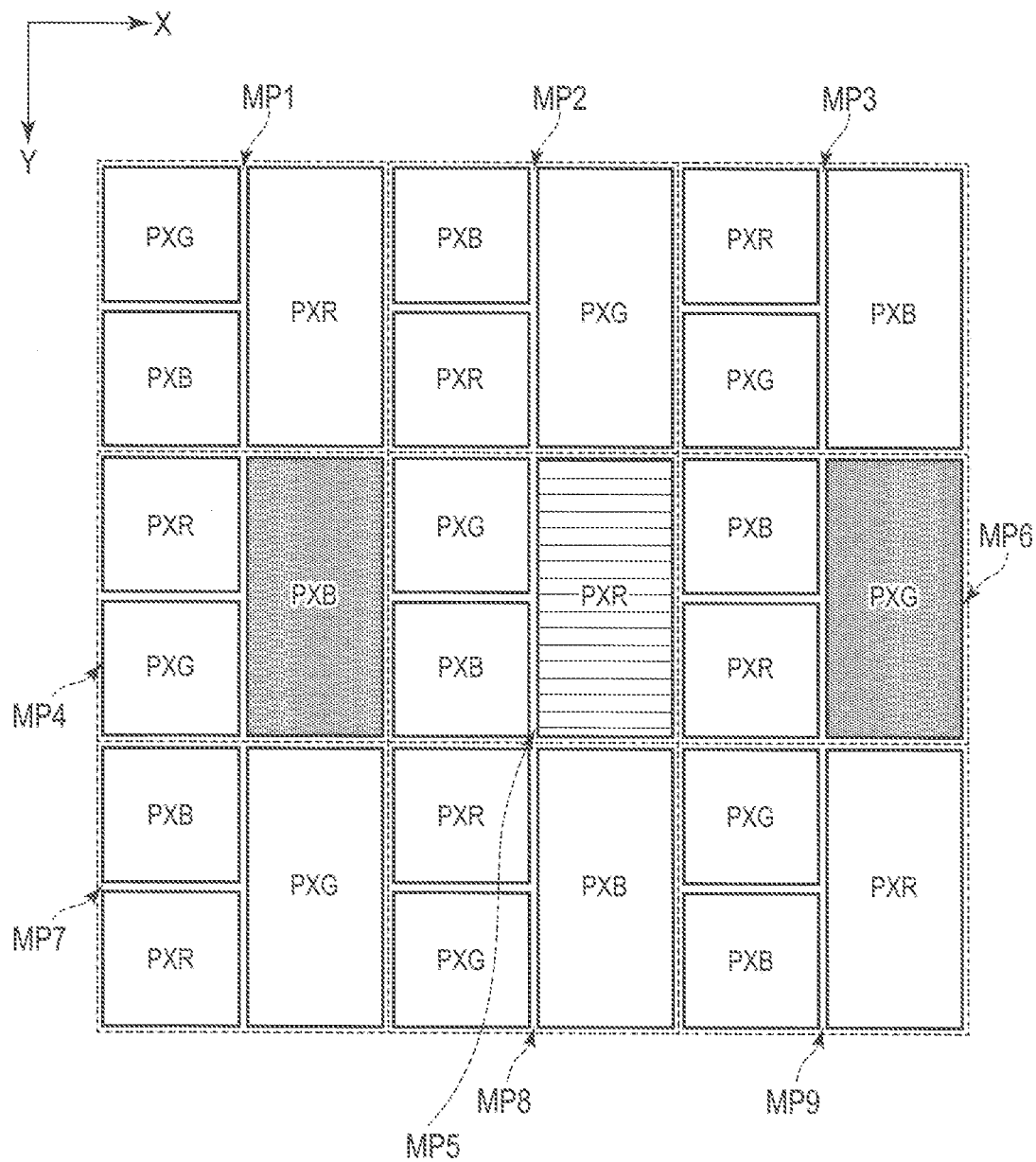
F I G. 18B

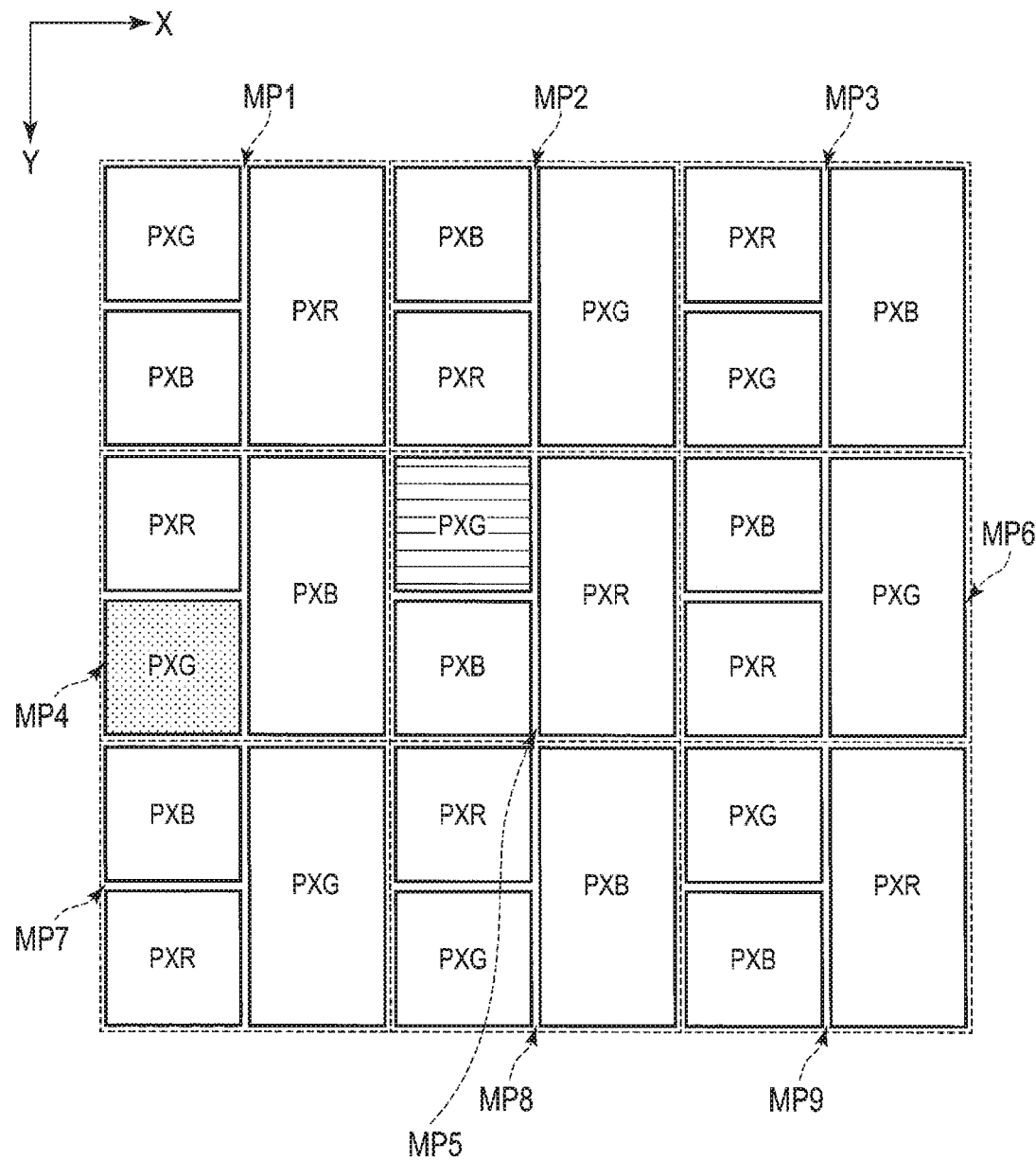
F I G. 19A

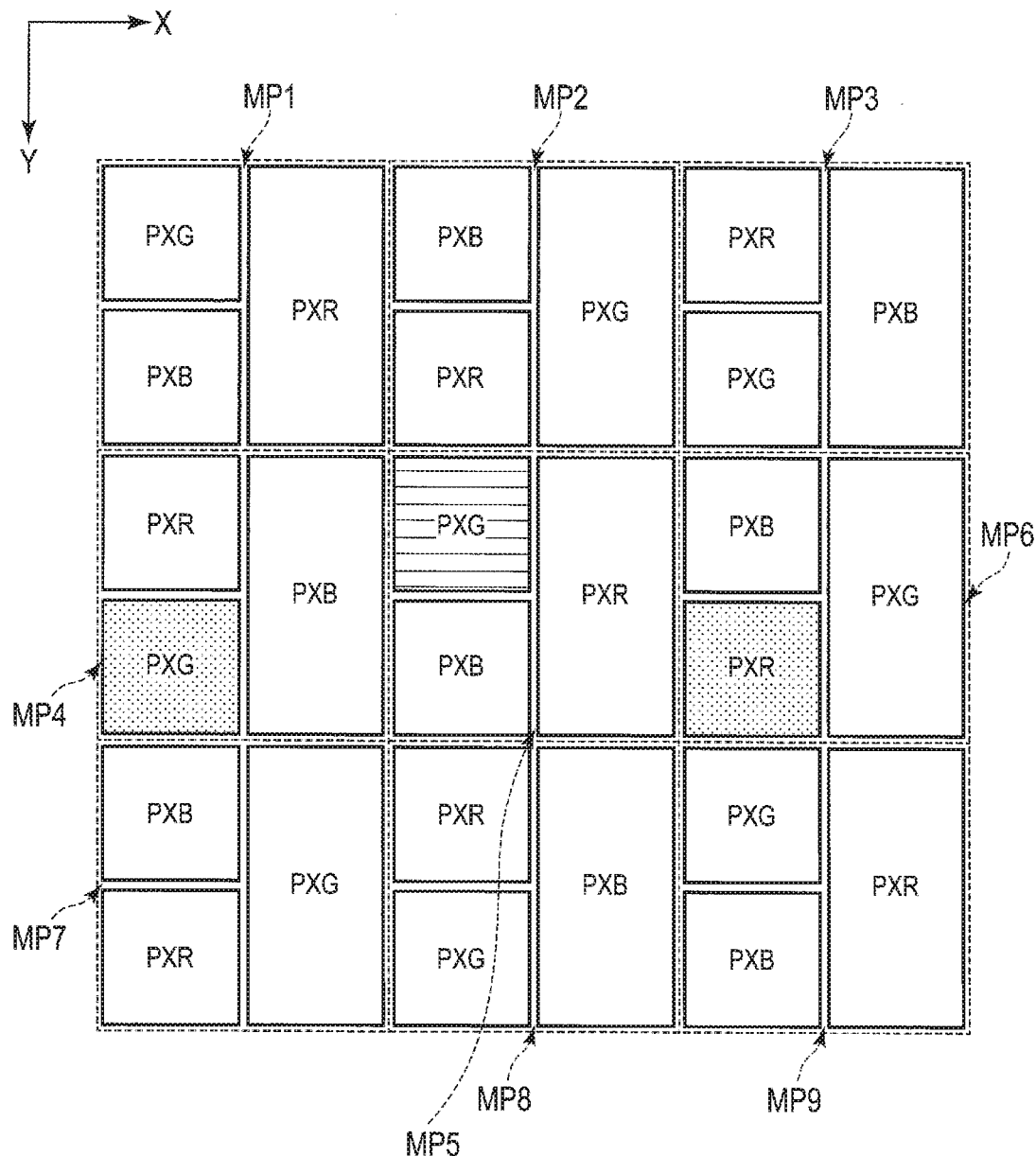
F I G. 19B

DISPLAY DEVICE

CROSS-REFERENCE TO RELATED APPLICATIONS

This application is based upon and claims the benefit of priority from Japanese Patent Application No. 2016-214518, filed Nov. 1, 2016, the entire contents of which are incorporated herein by reference.

FIELD

Embodiments described herein relate generally to a display device.

BACKGROUND

Recently, requests for higher definition for a display device have been increased. If the pixel density is increased in accordance with higher definition, image quality may be degraded.

For example, a display device in which in a pixel composed of red, green, and blue sub-pixels, two sub-pixels are disposed to be arranged in any of the horizontal direction and the vertical direction has been well known.

SUMMARY

The present disclosure generally relates to a display device.

According to one embodiment, a display device, includes a first main pixel, wherein the first main pixel comprises a first sub-pixel displaying a first color, a second sub-pixel displaying a second color different from the first color, and a third sub-pixel displaying a third color different from the first and second colors, the first and second sub-pixels are arranged in a second direction, the first and third sub-pixels are arranged in a first direction, and the second and third sub-pixels are arranged in the first direction, and each of the first and second sub-pixels has a first length in the first direction, and the third sub-pixel has a second length smaller than the first length in the first direction.

Additional features and advantages are described herein, and will be apparent from the following Detailed Description and the figures.

BRIEF DESCRIPTION OF THE DRAWINGS

FIG. 1 is a perspective view showing a structural example of a display device DSP according to the embodiments.

FIG. 3 is a cross-sectional view showing a structural example of a first substrate SUB1 shown in FIG. 1.

FIG. 7 is an illustration for explanation of an example of coloring at the time of displaying an oblique line in a display area DA including main pixels shown in FIG. 6.

FIG. 10 is an illustration for explanation of a displayed state of displaying an oblique line in the display area DA including main pixels shown in FIG. 9.

FIG. 12 is an illustration showing an example of a structural example applicable to the pixel array shown in FIG. 9.

FIG. 13 is an illustration showing another example of the pixel array in the display area DA shown in FIG. 2.

FIG. 18B is an illustration for explanation of a reference pixel and two pixels to be corrected according to Example 2.

FIG. 19A is an illustration for explanation of a reference pixel and a pixel to be corrected according to Example 3.

FIG. 19B is an illustration for explanation of a reference pixel and two pixels to be corrected according to Example 3.

DETAILED DESCRIPTION

Figure 2:
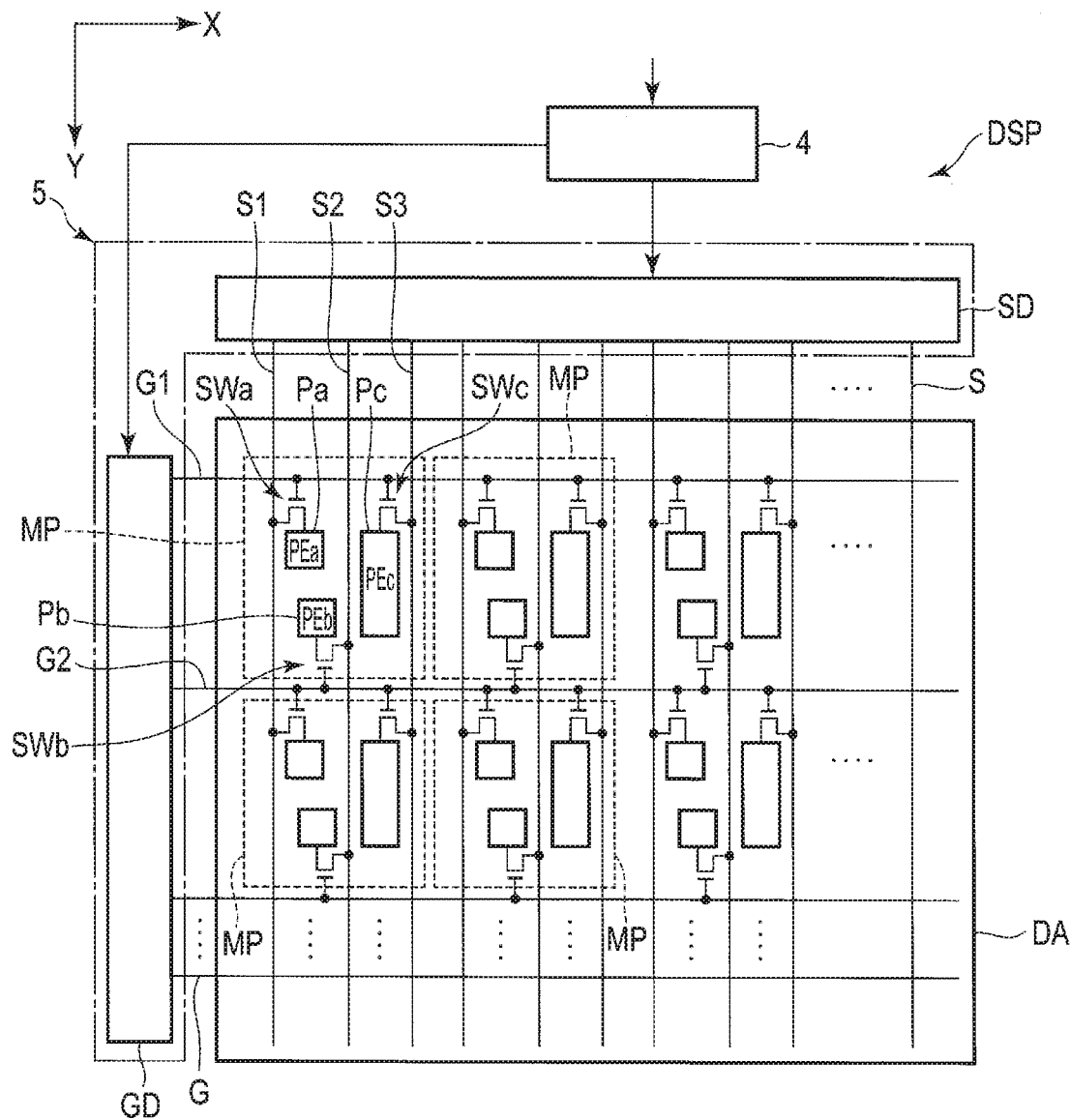
FIG. 2 is a diagram showing a structural example of the display device DSP according to the embodiments.

In general, according to one embodiment, a display device, includes a plurality of main pixels including a first main pixel disposed in intersecting first and second directions, wherein the first main pixel comprises a first sub-pixel displaying a first color, a second sub-pixel displaying a second color different from the first color, and a third sub-pixel displaying a third color different from the first and second colors, the first and second sub-pixels are arranged in the second direction, the first and third sub-pixels are arranged in the first direction, and the second and third sub-pixels are arranged in the first direction, and each of the first and second sub-pixels has a first length in the first direction, and the third sub-pixel has a second length smaller than the first length in the first direction.

According to another embodiment, a display device, includes a plurality of main pixels including a first main pixel and a second main pixel adjacent to each other, disposed in intersecting first and second directions, wherein the first main pixel comprises first to third sub-pixels, the third sub-pixel has an area larger than areas of the first and second sub-pixels, the first and second sub-pixels are arranged in the second direction, the first and third sub-pixels are arranged in the first direction, and the second and third sub-pixels are arranged in the first direction, the second main pixel comprises fourth to sixth sub-pixels, the sixth sub-pixel has an area larger than areas of the fourth and fifth sub-pixels, the fourth and fifth sub-pixels are arranged in the second direction, the fourth and sixth sub-pixels are arranged in the first direction, and the fifth and sixth sub-pixels are arranged in the first direction, any one of the first to third sub-pixels is a reference pixel and any one of the fourth to sixth sub-pixels is a correcting target pixel to be corrected, input data to drive the reference pixel on a first luminance level is set at first input data, input data to drive the correcting target pixel on a second luminance level is set at second input level, the second input data is converted into corrected data of a third luminance level different from the second luminance level, based on the first input data and the second input data, and the correcting target pixel is driven based on the corrected data.

According to yet another embodiment, a display device, includes a plurality of main pixels including a first main pixel disposed in intersecting first and second directions, wherein the first main pixel comprises first to third sub-pixels, the third sub-pixel has an area larger than areas of the first and second sub-pixels, the first and second sub-pixels are arranged in the second direction, the first and third sub-pixels are arranged in the first direction, and the second and third sub-pixels are arranged in the first direction, any one of the first to third sub-pixels is a correcting target pixel to be corrected, input data to drive the correcting target pixel on a first luminance level is converted into corrected data of a second luminance level different from the first luminance level, and the correcting target pixel is driven based on the corrected data.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape and the like, of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

In the embodiments, a liquid crystal display device is explained as an example of the display device. The major configuration explained in the present embodiment can also be applied to a self-luminous display device comprising an organic electroluminescent display element, and the like, an electronic paper display device comprising an electrophoretic element, and the like, a display device employing micro-electromechanical systems (MEMS), or a display device employing electrochromism.

The display device of the embodiments can be used for, for example, various devices such as a smartphone, a tablet terminal, a mobile telephone terminal, a personal computer, a TV receiver, a vehicle-mounted device, and a game console.

FIG. 1 is a perspective view showing a structural example of a display device DSP according to the embodiments. In the drawing, a first direction X and a second direction Y intersect each other, and a third direction Z intersects the first direction X and the second direction Y. For example, the first direction X, the second direction Y, and the third direction Z are orthogonal to each other but may intersect at an angle other than 90 degrees. In the present specification, a direction facing a tip side of an arrow indicating the third direction Z is called an upper direction (or simply upwardly), and a direction facing a side opposite to the tip of the arrow is called a lower direction (or simply downwardly). An observation position at which the display device DSP is observed is assumed to be located on the tip side of the arrow indicating the third direction Z, and viewing from the observation position toward the X-Y plane defined by the first direction X and the second direction Y is called a planar view.

The display device DSP comprises a display panel PNL, an IC chip 1, a flexible substrate 2 and the like. The display panel PNL implies a liquid crystal display panel, which comprises a first substrate SUB1, a second substrate SUB2, and a liquid crystal layer (a liquid crystal layer LC explained later). The second substrate SUB2 is opposed to the first substrate SUB1. The display panel PNL includes a display area DA on which an image is displayed and a frame-shaped non-display area NDA surrounding the display area DA. The display panel PNL also includes a plurality of main pixels MP arrayed in a matrix in the first direction X and the second direction Y in the display area DA.

The display panel PNL of the embodiments may be a transmissive display panel comprising a transmissive display function of displaying an image by allowing the light from the lower surface side of the first substrate SUB1 to be selectively transmitted, a reflective display panel comprising a reflective display function of displaying an image by allowing the light from the upper surface side of the second substrate SUB2 to be selectively transmitted, or a transflective display panel comprising both of the transmissive display function and the reflective display function.

The IC chip 1 and the flexible substrate 2 are connected to the first substrate SUB1. The flexible substrate 2 connects the display panel PNL and an external circuit board 3. Each of the IC chip 1, the flexible substrate 2, and the circuit board 3 functions as a signal supply source configured to supply a signal necessary to display the image to the display panel PNL. The IC chip 1, the flexible substrate 2, and the circuit board 3 are not necessarily required in the display device DSP of the embodiments.

FIG. 2 is a diagram showing a structural example of the display device DSP according to the embodiments.

The display device DSP comprises a signal processor 4 and a driver 5. The signal processor 4 and the driver 5 are provided in any one of the signal supply sources shown in FIG. 1. When input data (for example, RGB data) is input to the signal processor 4, the signal processor 4 executes predetermined data conversion and outputs the data to the driver 5. The driver 5 comprises a signal line drive circuit SD, a scanning line drive circuit GD, and the like. The driver 5 controls driving of the display area DA, based on various signals from the signal processor 4.

The display area DA includes a plurality of main pixels MP, a plurality of scanning lines G (G1 to Gn), a plurality of signal lines S (S1 to Sm), and the like. The main pixels MP are arrayed in a matrix in the first direction X and the second direction Y. The scanning lines G are spaced apart and arranged in the second direction Y. Each of the scanning lines G is electrically connected to the scanning line drive circuit GD. The signal lines S are spaced apart and arranged in the first direction X. Each of the signal lines S is electrically connected to the signal line drive circuit SD.

Each main pixel MP comprises, for example, three sub-pixels Pa, Pb, and Pc. The sub-pixels Pa and Pb are arranged in the second direction Y, and each of the sub-pixels is located between the scanning lines G1 and G2 and between the signal lines S1 and S2. The sub-pixels Pa and Pc are arranged in the first direction X and the sub-pixels Pb and Pc are also arranged in the first direction X. The sub-pixel Pc is located between the scanning lines G1 and G2 and between the signal lines S2 and S3. The sub-pixel Pa displays a first color, the sub-pixel Pb displays a second color different from the first color, and the sub-pixel Pc displays a third color different from the first color and the second color.

The sub-pixel Pa comprises a switching element SWa and a pixel electrode PEa. The switching element SWa is electrically connected to the scanning line G1 and the signal line S1. The pixel electrode PEa is electrically connected to the switching element SWa. The sub-pixel Pb comprises a switching element SWb and a pixel electrode PEb. The switching element SWb is electrically connected to the scanning line G2 and the signal line S2. The pixel electrode PEb is electrically connected to the switching element SWb. The sub-pixel Pc comprises a switching element SWc and a pixel electrode PEc. The switching element SWc is electrically connected to the scanning line G1 and the signal line S3. The pixel electrode PEc is electrically connected to the switching element SWc. In other words, two scanning lines and three signal lines are allocated to one main pixel MP. The other main pixels P have similar configuration.

FIG. 3 is a cross-sectional view showing a structural example of a first substrate SUB1 shown in FIG. 1. A structural example of the first substrate SUB1 including the switching element SWa and the pixel electrode PEa of the sub-pixel Pa shown in FIG. 2 will be explained. In the present embodiment, any one of a display mode using a lateral electric field approximately parallel to the main substrate surface, a display mode using a longitudinal electric field approximately perpendicular to the main substrate surface, a display mode using an inclined electric field angled with respect to the main substrate surface, and a display mode using a combination of these display modes can be employed. The main substrate surface indicates a surface parallel to the X-Y plane defined by the first direction X and the second direction Y shown in FIG. 1. The first substrate SUB1 in the example illustrated has a configuration corresponding to a fringe field switching (FFS) mode which is one of the display modes using the lateral electric field.

The first substrate SUB1 includes a first insulating substrate 10, a first insulating film 11, a second insulating film 12, a third insulating film 13, a fourth insulating film 14, a fifth insulating film 15, a switching element SWa, a pixel electrode PEa, a common electrode CE, a first alignment film AL1, and the like. The first insulating substrate 10 is formed of a glass substrate or resin substrate having a light transmitting property. The switching element SWa is formed in, for example, a top-gate structure, but may be formed in a bottom-gate structure. In addition, in the example illustrated, the switching element SWa is composed of a double-gate thin-film transistor, but may be composed of a single-gate thin-film transistor.

The first insulating film 11 is formed on the first insulating substrate 10. A semiconductor layer SC of the switching element SWa is formed on the first insulating film 11. The semiconductor layer SC is formed of, for example, poly-crystalline silicon, but may be formed of amorphous silicon, an oxide semiconductor, or the like.

The second insulating film 12 is formed on the first insulating film 11 and the semiconductor layer SC. The scanning line G1 is formed on the second insulating film 12 and opposed to the semiconductor layer SC at two parts. The third insulating film 13 is formed on the scanning line G1 and the second insulating film 12. The signal line S1 and a relay electrode RE1 are formed on the third insulating film 13. The signal line S1 is in contact with the semiconductor layer SC through a contact hole CH11 which penetrates the second insulating film 12 and the third insulating film 13. The relay electrode RE is in contact with the semiconductor layer SC through a contact hole CH12 which penetrates the second insulating film 12 and the third insulating film 13.

The fourth insulating film 14 is formed on the third insulating film 13, the source line S1, and the relay electrode RE. The common electrode CE is formed on the fourth insulating film 14. The fifth insulating film 15 is formed on the fourth insulating film 14 and the common electrode CE. The first insulating film 11, the second insulating film 12, the third insulating film 13, and the fifth insulating film 15 are formed of, for example, an inorganic material such as a silicon nitride (SiN) or a silicon oxide (SiO). The fourth insulating film 14 is formed of, for example, an organic material such as an acrylic resin.

The pixel electrode PEa is formed on the fifth insulating film 15. The pixel electrode PEa is in contact with the relay electrode RE through a contact hole CH13 which penetrates the fourth insulating film 14 and the fifth insulating film 15. The common electrode CE and the pixel electrode PEa are formed of, for example, a transparent conductive material such as indium tin oxide (ITO) or indium zinc oxide (IZO). The first alignment film AL1 is formed on the fifth insulating film 15 and the pixel electrode PEa. The first alignment film AL1 is formed of, for example, a material having a horizontal alignment property.

Figure 4:
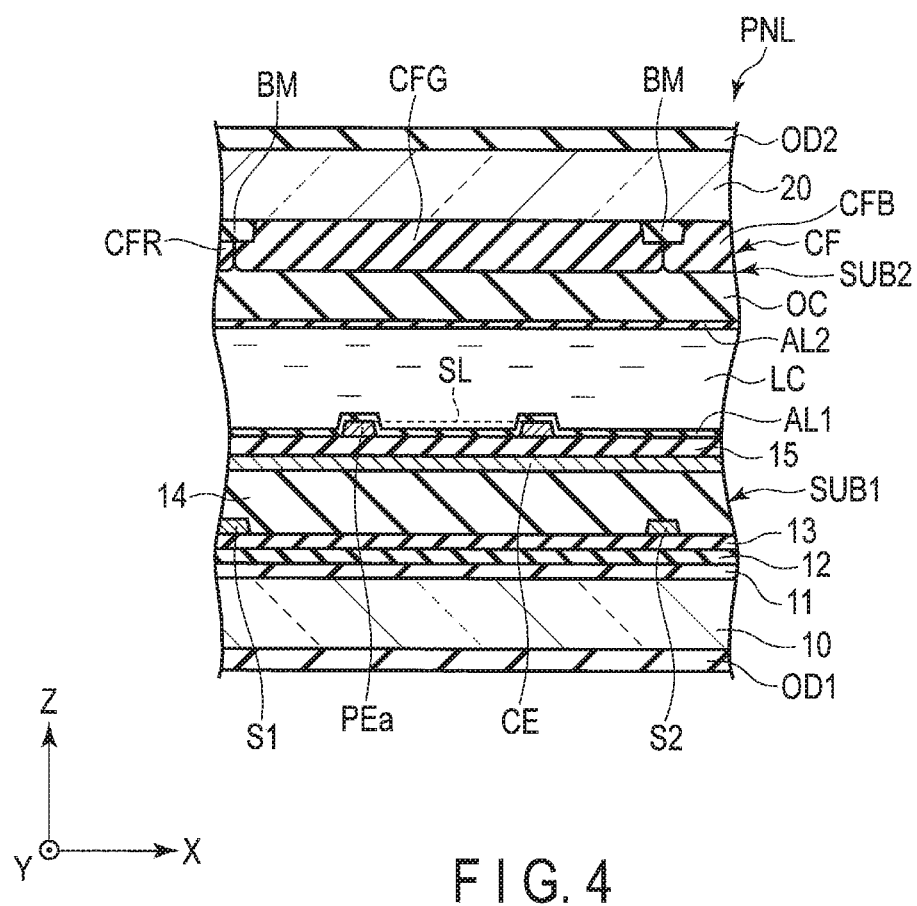
FIG. 4 is a cross-sectional view showing the structural example of the display panel PNL shown in FIG. 1.

FIG. 4 is a cross-sectional view showing the structural example of the display panel PNL shown in FIG. 1. A structural example of the display panel PNL including the signal lines S1 and S2 and the pixel electrode PEa shown in FIG. 2 will be explained.

In the first substrate SUB1, the signal lines S1 and S2, the common electrode CE, the pixel electrode PEa, the first insulating film 11, the second insulating film 12, the third insulating film 13, the fourth insulating film 14, the fifth insulating film 15, and the first alignment film AL1 are located between the first insulating substrate 10 and the liquid crystal layer LC. The signal lines S1 and S2 are located between the third insulating film 13 and the fourth insulating film 14. The common electrode CE is located between the fourth insulating film 14 and the fifth insulating film 15. The pixel electrode PEa is located between the fifth insulating film 15 and the first alignment film ALL The pixel electrode PEa includes a slit SL directly above the common electrode CE. The common electrode CE is located not only between the signal lines S1 and S2, but also directly above the signal lines S1 and S2.

The second substrate SUB2 includes a second insulating substrate 20, a light-shielding layer BM, a color filter CF, an overcoat layer OC, a second alignment film AL2, and the like. The second insulating substrate 20 is a transparent glass substrate or resin substrate, similarly to the first insulating substrate 10. The light-shielding layer BM, the color filter CF, the overcoat layer OC, and the second alignment film AL2 are located between the second insulating substrate 20 and the liquid crystal layer LC. The light-shielding layer BM is formed at a position opposed to the signal lines S1 and S2. The light-shielding layer BM is also formed at a position opposed to the scanning lines and the switching elements, though not illustrated in the drawing.

The color filter CF includes a red color filter CFR, a green color filter CFG, and a blue color filter CFB. As explained later, the red color filter CFR is disposed in a sub-pixel (PXR) displaying a red color. The green color filter CFG is disposed in a sub-pixel (PXG) displaying a green color. The blue color filter CFB is disposed in a sub-pixel (PXB) displaying a blue color. In the example illustrated, the green color filter CFG is formed at a position opposed to the pixel electrode PEa. An end portion of each of the color filters CFR, CFG, and CFB overlaps the light-shielding layer BM. The color filters CFR, CFG, and CFB are formed of colored resin materials. In the example illustrated, the color filter CF is formed on the second substrate SUB2, but may be formed on the first substrate SUB1.

The overcoat layer OC covers the color filter layer CF. The overcoat layer OC is formed of a transparent resin material. The second alignment film AL2 is formed on a side of the overcoat layer OC, which is opposed to the first substrate SUB1. The second alignment film AL2 is formed of a material having a horizontal alignment property, similarly to the first alignment film AL1.

The liquid crystal layer LC is held between the first substrate SUB1 and the second substrate SUB2 and is in contact with the first alignment film AL1 and the second alignment film AL2. The liquid crystal layer LC is constituted by a liquid crystal material having a negative dielectric anisotropy or a liquid crystal material having a positive dielectric anisotropy.

The first optical element OD1 is disposed on a side opposite to the side of the first substrate SUB1 which is opposed to the liquid crystal layer LC. The second optical element OD2 is disposed on a side opposite to the side of the second substrate SUB2 which is opposed to the liquid crystal layer LC. The first optical element OD1 comprises a polarizer PL1 and the second optical element OD2 comprises a polarizer PL2. Each of the first optical element OD1 and the second optical element OD2 may comprise other optical elements such as a retardation film.

As illustrated in the drawing, both of the pixel electrode PE and the common electrode CE are disposed on the first substrate SUB1, in the display mode using the lateral electric field. In the display mode using the longitudinal electric field or the inclined electric field, for example, the pixel electrode PE is disposed on the first substrate SUB1 while the common electrode CE is disposed on the second substrate SUB2.

Figure 5:
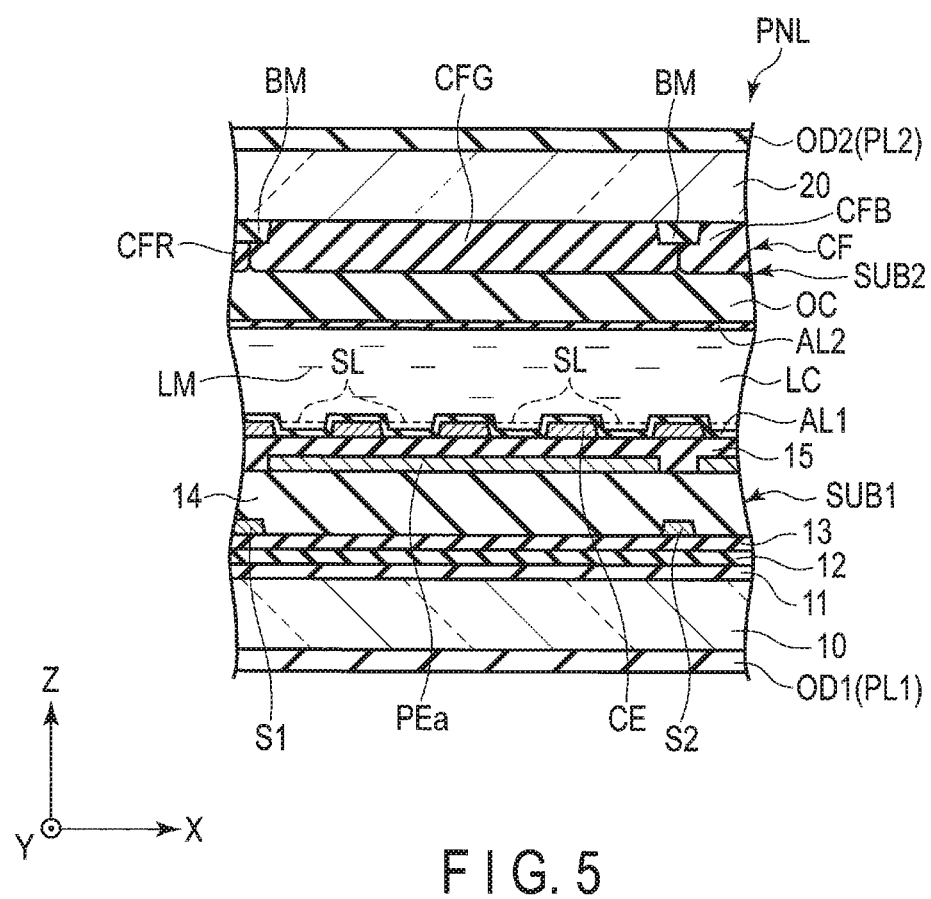
FIG. 5 is a cross-sectional view showing another structural example of the display panel PNL shown in FIG. 1.

FIG. 5 is a cross-sectional view showing another structural example of the display panel PNL shown in FIG. 1. The structural example shown in FIG. 5 is different from the structural example in FIG. 4 with respect to a feature that the pixel electrode PEa is located between the first insulating substrate 10 and the common electrode CE. The only differences from the structural example shown in FIG. 4 are explained. The pixel electrode PEa is located on the fourth insulating film 14 and covered with the fifth insulating film 15. The pixel electrode PEa is formed in a flat plate shape and does not include a slit. The common electrode CE is located on the fifth insulating film 15 and covered with the first alignment film ALL The common electrode CE includes slits SL directly above the pixel electrode PEa.

Figure 6:
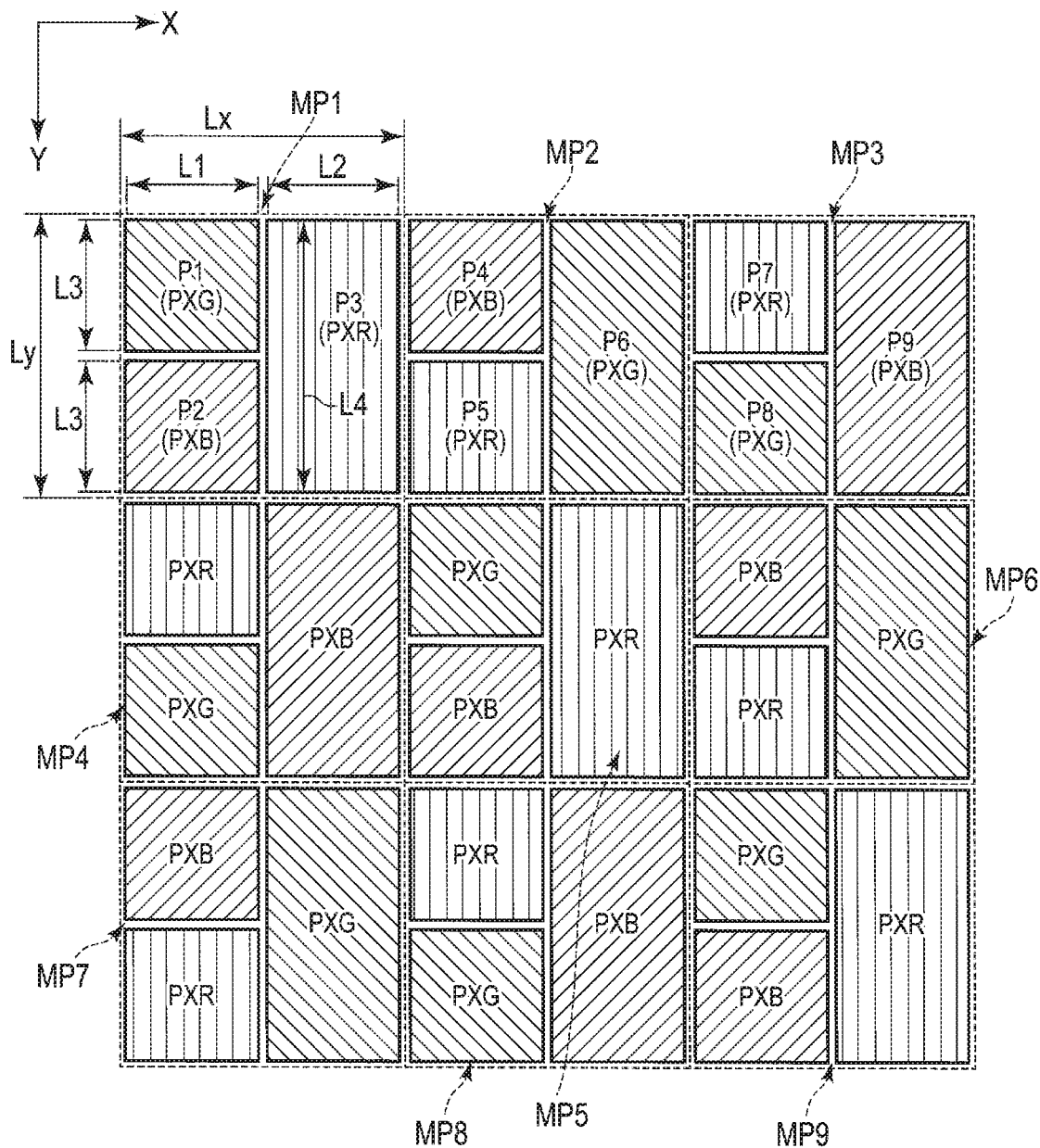
FIG. 6 is an illustration showing an example of pixel array in the display area DA shown in FIG. 2.

FIG. 6 is an illustration showing an example of pixel array in the display area DA shown in FIG. 2.

Nine main pixels MP1 to MP9 are illustrated in the drawing. The main pixels MP1 to MP3 are arranged in this order in the first direction X, the main pixels PX4 to MP6 are arranged in this order in the first direction X, and the main pixels PX7 to MP9 are arranged in this order in the first direction X. The main pixels MP1, MP4, and MP7 are arranged in this order in the second direction Y, the main pixels PX2, MP5, and MP8 are arranged in this order in the second direction Y, and the main pixels PX3, PX6, and MP9 are arranged in this order in the second direction Y.

The main pixel MP1 comprises sub-pixels P1 to P3. The main pixel MP2 comprises sub-pixels P4 to P6. The main pixel MP3 comprises sub-pixels P7 to P9. The sub-pixels P1, P4, and P7 are configured similarly to the sub-pixel Pa shown in FIG. 2. The sub-pixels P2, P5, and P8 are configured similarly to the sub-pixel Pb shown in FIG. 2. The sub-pixels P3, P6, and P9 are configured similarly to the sub-pixel Pc shown in FIG. 2.

The sub-pixels P1, P6, and P8 are sub-pixels PXG displaying green and each of the sub-pixels comprises the green color filter CFG shown in FIG. 4. The sub-pixels P2, P4, and P9 are sub-pixels PXB displaying blue and each of the sub-pixels comprises the blue color filter CFB shown in FIG. 4. The sub-pixels P3, P5, and P7 are sub-pixels PXR displaying red and each of the sub-pixels comprises the red color filter CFR shown in FIG. 4. As illustrated in the drawing, the green sub-pixels PXG are drawn with hatch lines sloped right-downward, the blue sub-pixels PXB are drawn with hatch lines sloped right-upward, and the red sub-pixels PXR are drawn with longitudinal lines. For example, green, blue, and red correspond to the first color, the second color, and third color, respectively, but the colors are not limited to this combination.

The main pixels MP5 and MP9 have the same configuration as the main pixel MP1. The main pixels MP6 and MP7 have the same configuration as the main pixel MP2. The main pixels MP4 and MP8 have the same configuration as the main pixel MP3.

In the following explanations, the main pixel MP1 corresponding to the first main pixel is noted, the sub-pixel P1 corresponds to the first sub-pixel, the sub-pixel P2 corresponds to the second sub-pixel, and the sub-pixel P3 corresponds to the third sub-pixel.

The main pixel MP1 comprises sub-pixels P1 to P3 of different colors. The sub-pixel P2 is adjacent to the sub-pixel P1, and the sub-pixel P3 is adjacent to the sub-pixels P1 and P2. The main pixel MP1 has a length Lx in the first direction X, and a length Ly in the second direction Y. For example, the length Lx is equal to the length Ly, and the main pixel MP1 is formed in a square shape.

Each of the sub-pixels P1 and P2 has a length L1 in the first direction X, and the sub-pixel P3 has a length L2 in the first direction X. The length L1 is equal to the length L2.

A sum of the lengths of the sub-pixels P1 and P2 in the second direction Y is equal to the length of the sub-pixel P3 in the second direction Y. In the example illustrated, each of the sub-pixels P1 and P2 has a length L3 in the first direction X, and the sub-pixel P3 has a length L4 in the second direction Y. The length L4 is larger than the length L3 and is approximately twice the length L3.

The sub-pixels P1 and P2 have the substantially same shape and the same area. For example, the length L1 is substantially equal to the length L3, and the sub-pixels P1 and P2 are formed in a substantially square shape. The length L4 is substantially twice the length L2, and the sub-pixel P3 is formed in a rectangular shape elongated in the second direction Y. An area of the sub-pixel P3 is larger than an area of the sub-pixel P1 and is substantially twice the area of the sub-pixel P1. In the main pixel MP1, the sub-pixel P3 has the largest area, and the sub-pixels P1 and P2 have the smallest area.

Nine main pixels MP1 to MP9 illustrated in the drawing constitute one display block. Such display blocks are repeatedly arranged in the first direction X and the second direction Y to constitute the display area DA.

Further suppression of degradation of the display quality is required in the pixel array shown in FIG. 6, irrespective of the displayed pattern.

FIG. 7 is an illustration for explanation of an example of coloring at the time of displaying an oblique line in a display area DA including main pixels shown in FIG. 6.

In FIG. 7, a potion colored in black does not contribute to the display (or corresponds to a region displaying black), the sub-pixel PXG represented by hatch lines sloped right-downward displays green, the sub-pixel PXB represented by hatch lines sloped right-upward displays blue, and the sub-pixel PXR represented by longitudinal lines displays red. In the example illustrated, the portion contributing to the display (or the portion through which light is transmitted) includes a number of sub-pixels PXB and PXG having larger areas, and the area of the sub-pixel PXR is smaller than the areas of the sub-pixels PXB and PXG. For this reason, the blue and green display areas are larger than the red display area in the portion contributing to the display, and the portion is entirely colored in cyan. In other words, when the illustrated pattern is displayed, white balance is degraded and the portions of arrows 71 and 72 illustrated in the drawing can easily be recognized visually to be colored in cyan.

Figure 8:
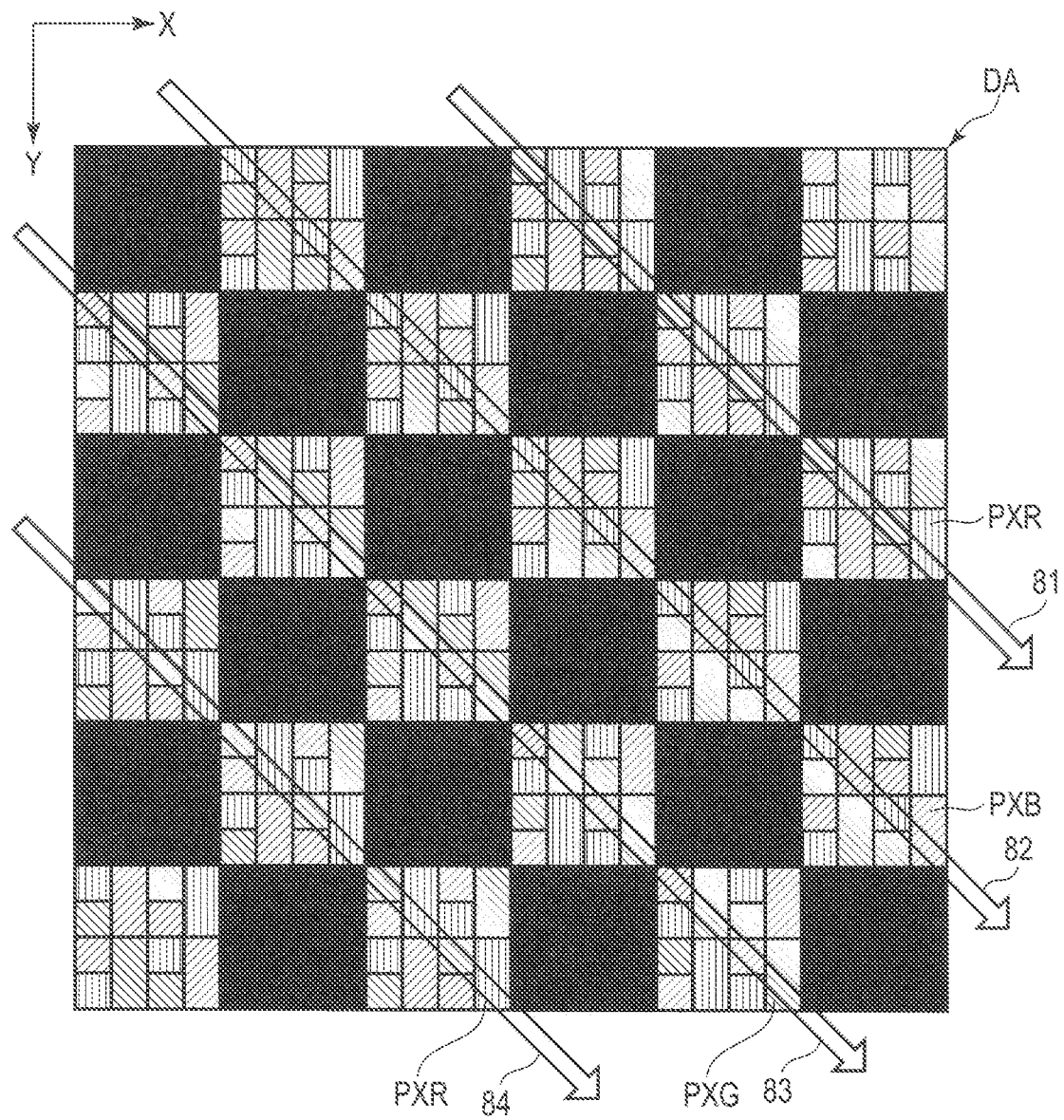
FIG. 8 is an illustration for explanation of an example of coloring at the time of displaying a checkered pattern in the display area DA including the main pixels shown in FIG. 6.

FIG. 8 is an illustration for explanation of an example of coloring at the time of displaying a checkered pattern in the display area DA including the main pixels shown in FIG. 6.

In FIG. 8, too, a portion colored in black is a region displaying black, a portion represented by hatch lines sloped right-downward is the green sub-pixel PXG, a portion represented by hatch lines sloped right-upward is the blue sub-pixel PXB, and a portion represented by longitudinal lines is the red sub-pixel PXR displaying red, similarly to FIG. 7. When the illustrated pattern is displayed, a red display area is larger than the blue and green display areas at the portions of arrows 81 and 84 illustrated, and the portions seem entirely colored in red. In addition, the blue display area is larger than the red and green display areas at a portion of arrow 82, and the portion seems entirely colored in cyan. The green display area is larger than the red and blue display areas at a portion of arrow 83, and the portion seems entirely colored in yellow. In other words, when the illustrated pattern is displayed, the stripe pattern of red, green, and blue can easily be recognized visually.

Figure 9:
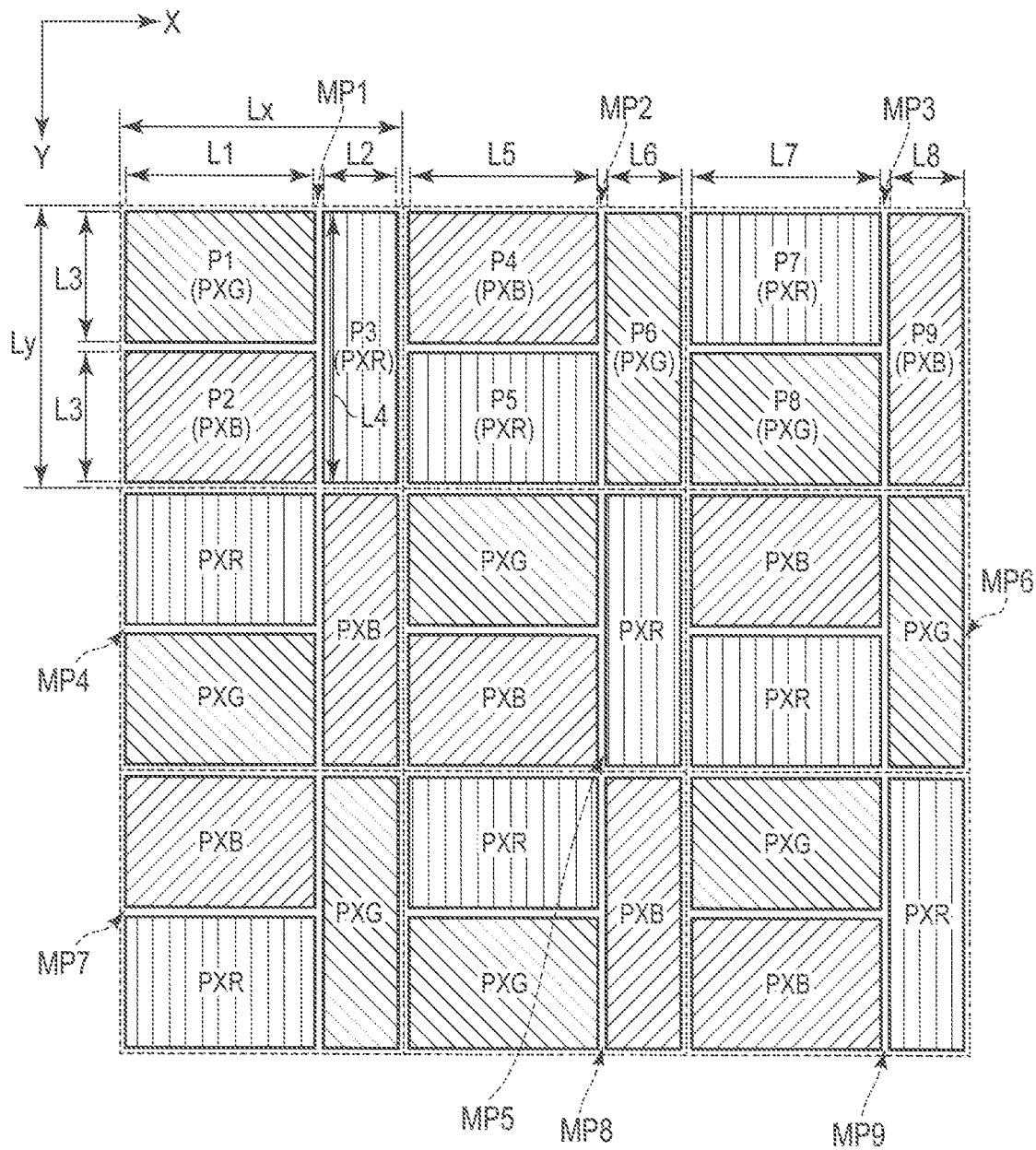
FIG. 9 is an illustration showing another example of pixel array in the display area DA shown in FIG. 2.

FIG. 9 is an illustration showing another example of pixel array in the display area DA shown in FIG. 2. The example shown in FIG. 9 is different from the example shown in FIG. 6 with respect to a feature that a difference in area between the sub-pixel having the largest area and the sub-pixel having the smallest area in each main pixel MP is set to be smaller than twice.

In the following explanations, the main pixel MP1 corresponding to the first main pixel is noted, the sub-pixel P1 corresponds to the first sub-pixel displaying a first color, the sub-pixel P2 corresponds to the second sub-pixel displaying a second color, and the sub-pixel P3 corresponds to the third sub-pixel displaying a third color. The first color, the second color, and the third color are different colors and, for example, the first color is green, the second color is blue, and the third color is red but the colors are not limited to the combination of these colors.

The main pixel MP1 has a length Lx in the first direction X, and a length Ly in the second direction Y. For example, the length Lx is substantially equal to the length Ly, and the main pixel MP1 is formed in a square shape. The sub-pixels P1 and P2 are arranged in the second direction Y, the sub-pixels P1 and P3 are arranged in the first direction X, and the sub-pixels P2 and P3 are arranged in the first direction X. Each of the sub-pixels P1 and P2 has a length L1 in the first direction X, and the sub-pixel P3 has a length L2 in the first direction X. The length L2 is shorter than the length L1.

A sum of the lengths of the sub-pixels P1 and P2 in the second direction Y is substantially equal to the length of the sub-pixel P3 in the second direction Y. In the example illustrated, each of the sub-pixels P1 and P2 has a length L3 in the first direction X, and the sub-pixel P3 has a length L4 in the second direction Y. The length L4 is larger than the length L3 and is approximately twice the length L3.

The sub-pixels P1 and P2 have the same shape and the same area. For example, the length L3 is shorter than the length L1, and the sub-pixels P1 and P2 are formed in a rectangular shape elongated in the first direction X. The length L4 is larger than the length L2, and the sub-pixel P3 is formed in a rectangular shape elongated in the second direction Y. An area A3 of the sub-pixel P3 is greater than 0.5 times and less than twice an area A1 of the sub-pixel P1. In other words, according to the illustrated pixel array, the difference between the area A1 of each of the sub-pixels P1 and P2 and the area A3 of the sub-pixel P3 can be reduced as compared with the pixel array shown in FIG. 6. If the area A3 is greater than 0.5 times and smaller than once the area A1, each of the sub-pixels P1 and P2 has the largest area and the sub-pixel P3 has the smallest area, in the main pixel MP1. If the area A3 is once the area A1, the sub-pixels P1 to P3 have the same areas in the main pixel MP1. If the area A3 is greater than once and smaller than twice the area A1, each of the sub-pixels P1 and P2 has the smallest area and the sub-pixel P3 has the largest area, in the main pixel MP1. The condition for making the difference in area smallest is that the area A3 is once the area A1, and is desirable with respect to a feature of obtaining preferable white balance in one main pixel.

The main pixel MP2 corresponding to the second main pixel comprises the sub-pixel P4 corresponding to the fourth sub-pixel, the sub-pixel P5 corresponding to the fifth sub-pixel, and the sub-pixel P6 corresponding to the sixth sub-pixel. Each of the sub-pixels P4 and P5 has a length L5 in the first direction X, and the sub-pixel P6 has a length L6 in the first direction X. The length L6 is shorter than the length L5.

The main pixel MP3 corresponding to the third main pixel comprises the sub-pixel P7 corresponding to the seventh sub-pixel, the sub-pixel P8 corresponding to the eighth sub-pixel, and the sub-pixel P9 corresponding to the ninth sub-pixel. Each of the sub-pixels P7 and P8 has a length L7 in the first direction X, and the sub-pixel P9 has a length L8 in the first direction X. The length L8 is shorter than the length L7.

In the example illustrated, the lengths L5 and L7 are equal to the length L1, and the lengths L6 and L8 are equal to the length L2. Each of the sub-pixels P4, P5, P7, and P8 has an area equal to the area of the sub-pixel P1. Each of the sub-pixels P9 and P9 has an area equal to the area of the sub-pixel P3.

The sub-pixels P6 and P8 are the sub-pixels displaying the first color, similarly to the sub-pixel P1. The sub-pixels P4 and P9 are the sub-pixels displaying the second color, similarly to the sub-pixel P2. The sub-pixels P5 and P7 are the sub-pixels displaying the third color, similarly to the sub-pixel P3.

The main pixels MP5 and MP9 have the same configuration as the main pixel MP1. The main pixels MP6 and MP7 have the same configuration as the main pixel MP2. The main pixels MP4 and MP8 have the same configuration as the main pixel MP3. Nine main pixels MP1 to MP9 illustrated in the drawing constitute one display block. Such display blocks are repeatedly arranged in the first direction X and the second direction Y to constitute the display area DA.

The degradation of the display quality in displaying a specific pattern can be suppressed by using the pixel array shown in FIG. 9, as compared with use of the pixel array shown in FIG. 6. According to the pixel array shown in FIG. 9, the difference in area between the sub-pixel having the largest area and the sub-pixel having the smallest area can be reduced to less than twice in the main pixel comprising three sub-pixels of different colors. For this reason, difference in area contributing to the display becomes small in the sub-pixels of the respective colors. The difference among the red component, green component, and the blue component becomes small in one main pixel. The hue in one main pixel therefore becomes closer to white as compared with the pixel array shown in FIG. 6. In addition, the difference in hue is also reduced in adjacent main pixels.

FIG. 10 is an illustration for explanation of a displayed state of displaying an oblique line in the display area DA including main pixels shown in FIG. 9.

In the example illustrated, the portion contributing to the display (or the portion through which light is transmitted) includes the sub-pixels PXR, PXG, and PXB, and their areas are substantially equal to each other. For this reason, coloring to add a color different from white can be reduced. In other words, when the illustrated pattern is displayed, white balance is maintained and coloring of the portions of arrows 71 and 72 illustrated in the drawing can not easily be recognized visually.

Figure 11:
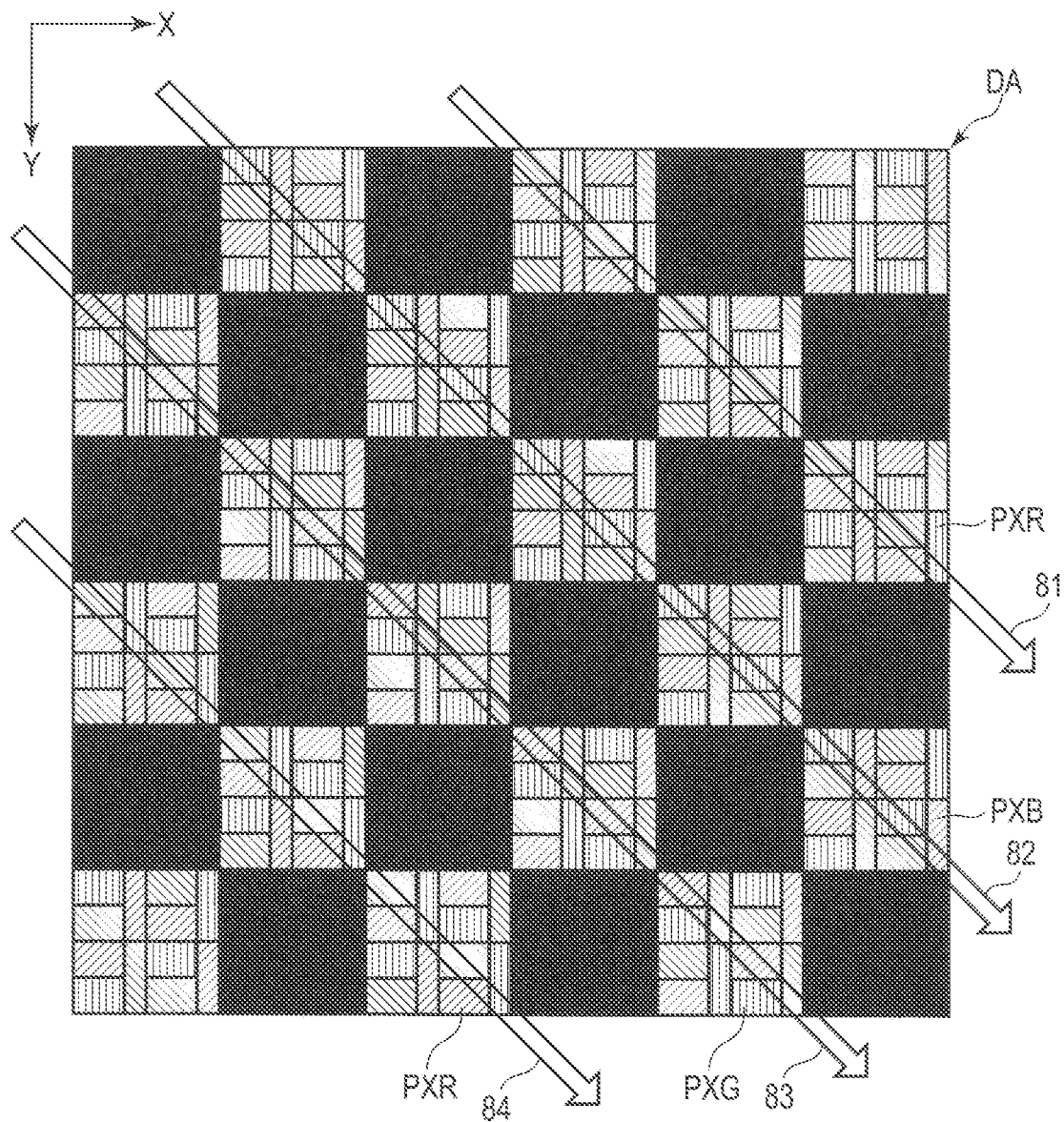
FIG. 11 is an illustration for explanation of a displayed state of displaying a checkered pattern in the display area DA including the main pixels shown in FIG. 9.

FIG. 11 is an illustration for explanation of a displayed state of displaying a checkered pattern in the display area DA including the main pixels shown in FIG. 9.

In the example illustrated, too, the areas of the sub-pixels PXR, PXG, and PXB are substantially equal to each other at the portion contributing to the display. For this reason, when the illustrated pattern is displayed, coloring of the portions of arrows 81 to 84 illustrated in the drawing can be reduced and the stripe pattern of a specific color is not easily recognized visually.

According to the embodiments, the degradation in display quality can be thus suppressed.

FIG. 12 is an illustration showing an example of a structural example applicable to the pixel array shown in FIG. 9. A region including the main pixels MP1, MP2, MP4, and MP5 is illustrated. The signal lines S1 to S7 are arranged in this order in the first direction X. In the example illustrated, an interval between the signal lines S1 and S2 is larger than an interval between the signal lines S2 and S3, and the interval between the signal lines S2 and S3 is larger than an interval between the signal lines S3 and S4. The scanning lines G1 to G3 are arranged in this order in the second direction Y. The intervals between the adjacent scanning lines are equal to each other.

The main pixel MP1 will be noted. The main pixel MP1 comprises a pixel electrode PE1 disposed in the sub-pixel P1, a pixel electrode PE2 disposed in the sub-pixel P2, and a pixel electrode PE3 disposed in the sub-pixel P3. The pixel electrodes PE1 and PE2 are arranged in the second direction Y, and each of the pixel electrodes is located between the scanning lines G1 and G2 and between the signal lines S1 and S2. The pixel electrodes PE1 and PE3 are arranged in the first direction X while sandwiching the signal line S2, and the pixel electrodes PE2 and PE3 are arranged in the first direction X while sandwiching the signal line S2. The pixel electrode PE3 is located between the scanning lines G1 and G2 and between the signal lines S2 and S3. In the embodiments, the area of the sub-pixel corresponds to the installation area of the pixel electrode disposed in each sub-pixel.

A switching element SW1 is electrically connected with the scanning line G1 and the signal line S1. The pixel electrode PE1 is electrically connected with the switching element SW1. A switching element SW2 is electrically connected with the scanning line G2 and the signal line S2. The pixel electrode PE2 is electrically connected with the switching element SW2. A switching element SW3 is electrically connected with the scanning line G1 and the signal line S3. The pixel electrode PE3 is electrically connected with the switching element SW3.

The main pixel MP2 has the same configuration as the main pixel MP1. The pixel electrode PE4 of the sub-pixel P4 is electrically connected with the switching element SW4, the pixel electrode PE5 of the sub-pixel P5 is electrically connected with the switching element SW5, and the pixel electrode PE6 of the sub-pixel P6 is electrically connected with the switching element SW6. The pixel electrodes PE3 and PE4 are arranged in the first direction X while sandwiching the signal lines S3 and S4, and the pixel electrodes PE3 and PE5 are arranged in the first direction X while sandwiching the signal lines S3 and S4.

FIG. 13 is an illustration showing another example of the pixel array in the display area DA shown in FIG. 2. The example shown in FIG. 13 is different from the example in FIG. 9 with respect to a feature that the sub-pixels P4 and P7 are the sub-pixels displaying the first color similarly to the sub-pixel P1, the sub-pixels P5 and P8 are the sub-pixels displaying the second color similarly to the sub-pixel P2, and the sub-pixels P6 and P9 are the sub-pixels displaying the third color similarly to the sub-pixel P3. In other words, all the main pixels MP1 to MP9 have the same configuration. In the example illustrated, the first color is green, the second color is blue, and the third color is red. The third color may be blue, and the first color and the second color may be red and green, respectively. The third color may be green, and the first color and the second color may be red and blue, respectively.

If this pixel array is employed, the same advantage as the above explained advantage can be obtained.

In the illustrated pixel array, the area of the sub-pixel P3 is equal to the area of each of the sub-pixels P1 and P2. The areas contributing to the display in three sub-pixels of different colors thereby become equal to each other in one main pixel, and the white balance can be maintained. In the pixel array shown in FIG. 6, for example, the red component is more than the blue and green components in the main pixel MP1, the green component is more than the red and blue components in the main pixel MP2, and a difference in hue is generated between the adjacent main pixels. In contrast, in the pixel array shown in FIG. 13, the red component, the green component, and the blue component are substantially equal to each other in each main pixel, and no difference in hue is generated between the adjacent main pixels. For this reason, the same color arrangement can be implemented in all the main pixels and the pixel array can be simplified.

Next, a coloring reducing method using the pixel array shown in FIG. 6 will be explained. The coloring reducing method explained below may be combined with the pixel array explained with reference to FIG. 9 and FIG. 13.

Figure 14:
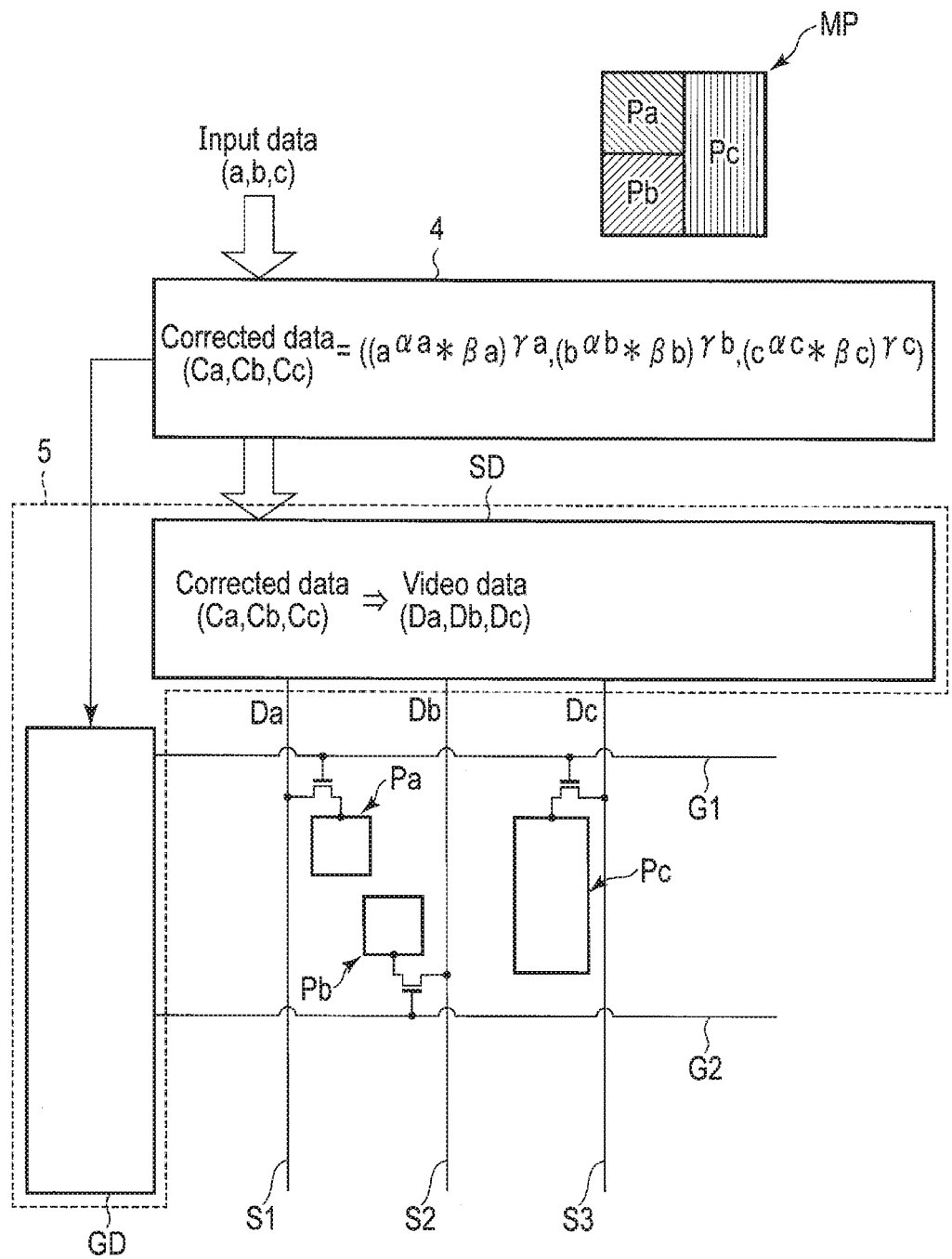
FIG. 14 is an illustration for explanation of a method of driving at least one sub-pixel based on corrected data.

FIG. 14 is an illustration for explanation of a method of driving at least one sub-pixel based on corrected data. The illustrated main pixel MP can correspond to any one of the main pixels MP1 to MP9 shown in FIG. 6. For example, the illustrated main pixel MP corresponds to the main pixel MP1 in FIG. 6, and the illustrated sub-pixels Pa, Pb, and Pc correspond to the sub-pixels P1 to P3 in FIG. 6, respectively. Each of the sub-pixels Pa, Pb, and Pc may be a correcting target pixel to be corrected as driven based on corrected data. The input data for driving the sub-pixels Pa, Pb, and Pc at predetermined luminance levels are denoted by a, b, and c, respectively, and the input data (a, b, c) in the drawing indicates input data input to the signal processor 4 to drive the main pixel MP.

The signal processor 4 converts the input data (a, b, c) into corrected data (Ca, Cb, Cc) and outputs the corrected data to the driver 5. For example, the input data and the corrected data is data corresponding to a gradation value, for example, values in a range from 0 to 255. The signal line drive circuit SD generates video signals (Da, Db, Dc) of a voltage value corresponding to the gradation value, based on the corrected data (Ca, Cb, Cc). In addition, the signal line drive circuit SD outputs the video signal Da to the signal line S1 electrically connected to the sub-pixel Pa and outputs the video signal Dc to the signal line S3 electrically connected to the sub-pixel Pc, at timing of supplying an ON signal to the scanning line G1. In addition, the signal line drive circuit SD outputs the video signal Db to the signal line S2 electrically connected to the sub-pixel Pb at timing of supplying an ON signal to the scanning line G2. The video signals Da, Db, and Dc are thereby written to the sub-pixels Pa, Pb, and Pc.

An example of a method of converting the input data (a, b, c) into the corrected data (Ca, Cb, Cc) in the signal processor 4 will be explained.

$$Ca = (a^{\alpha a} * \beta a)^{\gamma a} \qquad (1)$$

$$Cb = (b^{\alpha b} * \beta b)^{\gamma b} \qquad (2)$$

$$Cc = (c^{\alpha c} * \beta c)^{\gamma c} \qquad (3)$$

In Expressions (1) to (3), β is a parameter to determine the rate for converting the luminance level, and α and γ are parameters determined arbitrarily in accordance with requirement for correction of the gamma property at conversion of the luminance level.

For example, the sub-pixel Pc having the largest area in the main pixel MP is assumed to be the correcting target pixel and to be driven with the corrected data Cc of the second luminance level lower than the first luminance level at which the sub-pixel Pc is driven with the input data c. For example, the sub-pixel Pc is driven at the second luminance level in a range higher than 0.5 times and lower than 1.0 time the first luminance level but is assumed to be driven at the second luminance level that is 0.8 times (βc=0.8) the first luminance level.

The input data (a, b, c) is assumed to be (127, 127, 127) as the gradation values. Parameters in Expressions (1) to (3) are as follows.

$$\alpha a = 1 \ \beta a = 1 \ \gamma a = 1$$

$$\alpha b = 1 \ \beta b = 1 \ \gamma b = 1$$

$$\alpha c = 2.2 \ \beta c = 0.8 \ \gamma c = (1/2.2)$$

If these parameters are substituted into Expressions (1) to (3), the corrected data is computed as follows.

Corrected data $(Ca, Cb, Cc) = (127, 127, 115)$

In other words, each of the sub-pixels Pa and Pb is driven based on the corrected data that is the same as the input data while the sub-pixel is driven based on the corrected data of the gradation values smaller than the input data. A second luminance level in driving the sub-pixel Pc at gradation value 115 corresponds to a level which is 0.8 times the first luminance level in driving the sub-pixel at gradation value 127.

Figure 15A:
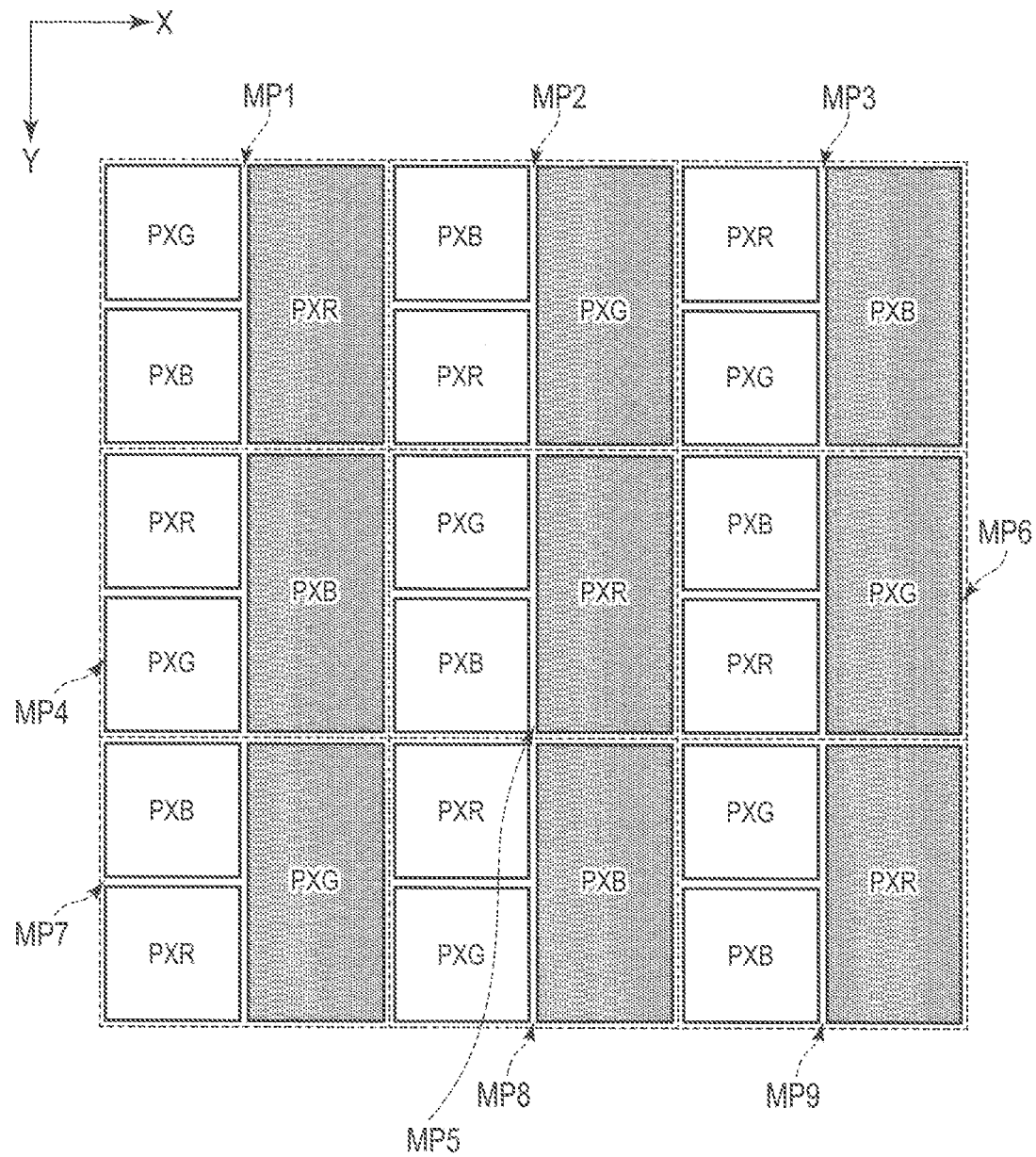
FIG. 15A is an illustration for explanation of a state of driving a sub-pixel having the largest area in the pixel array shown in FIG. 6, based on the corrected data.

In the pixel array shown in FIG. 6, if the sub-pixel having the largest area in each of the main pixels MP1 to MP9 is the correcting target pixel, the red sub-pixel PXR in each of the main pixels MP1, MP5, and MP9, the green sub-pixel PXG in each of the main pixels MP2, MP6, and MP7, and the blue sub-pixel PXB in each of the main pixels MP3, MP4, and MP8 are driven at the second luminance level lower than the first luminance level, as shown in FIG. 15A.

As the other example, the sub-pixel Pa having the smallest area in the main pixel MP is assumed to be the correcting target pixel and to be driven with the corrected data Ca of the second luminance level higher than the first luminance level at which the sub-pixel Pa is driven with the input data a. For example, the sub-pixel Pa is assumed to be driven at the second luminance level that is 1.1 times (βa=1.1) the first luminance level. The input data (a, b, c) is assumed to be (127, 127, 127) as the gradation values. Parameters in Expressions (1) to (3) are as follows.

$\alpha a=2.2$ $\beta a=1.1$ $\gamma a=(1/2.2)$ $\alpha b=1$ $\beta b=1$ $\gamma b=1$ $\alpha c=1$ $\beta c=1$ $\gamma c=1$ If these parameters are substituted into Expressions (1) to (3), the corrected data is computed as follows.

Corrected data$(Ca,Cb,Cc)$=(133,127,127)

In other words, each of the sub-pixels Pb and Pc is driven based on the corrected data that is the same as the input data while the sub-pixel Pa is driven based on the corrected data of the gradation values larger than the input data. The second luminance level in driving the sub-pixel Pa at gradation value 133 corresponds to a level which is 1.1 times the first luminance level in driving the sub-pixel at gradation value 127.

Not only the sub-pixel Pa, but the sub-pixel Pb may be correcting target pixels and each of $\alpha b$, $\beta b$, $\gamma b$ may be set at a value other than 1.

Figure 15B:
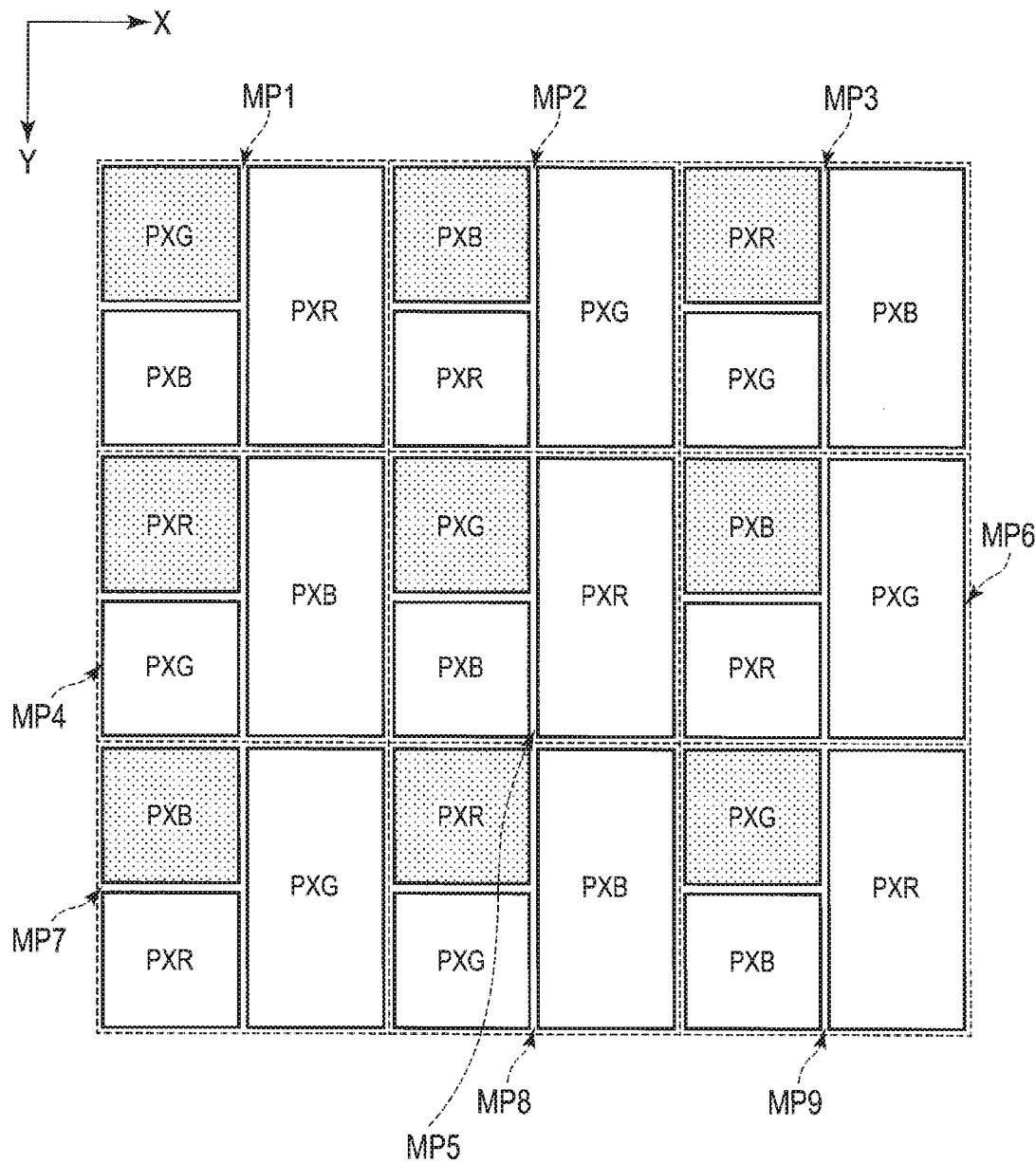
FIG. 15B is an illustration for explanation of a state of driving a sub-pixel having the smallest area in the pixel array shown in FIG. 6, based on the corrected data.

In the pixel array shown in FIG. 6, if the sub-pixel having the smallest area in each of the main pixels MP1 to MP9 is the correcting target pixel, the green sub-pixel PXG in each of the main pixels MP1, MP5, and MP9, the blue sub-pixel PXB in each of the main pixels MP2, MP6, and MP7, and the red sub-pixel PXR in each of the main pixels MP3, MP4, and MP8 are driven at the second luminance level higher than the first luminance level, as shown in FIG. 15B.

Next, all the sub-pixels Pa, Pb, and Pc in the main pixel MP are assumed to be the correcting target pixels, the sub-pixels Pa and Pb are assumed to be driven with the corrected data Ca and Cb of the second luminance level higher than the first luminance level at which the sub-pixels Pa and Pb are driven with the input data a and b, and the sub-pixel Pc is assumed to be driven with the corrected data Cc of the second luminance level lower than the first luminance level at which the sub-pixel Pc is driven with the input data c. For example, the sub-pixel Pa is assumed to be driven at the second luminance level that is 1.1 times ($\beta a=1.1$) the first luminance level, the sub-pixel Pb is assumed to be driven at the second luminance level that is 1.2 times ($\beta b=1.2$) the first luminance level, and the sub-pixel Pc is assumed to be driven at the second luminance level that is 0.8 times ($\beta c=0.8$) the first luminance level.

The input data (a, b, c) is assumed to be (127, 127, 127) as the gradation values. Parameters in Expressions (1) to (3) are as follows.

$\alpha a=2.2$ $\beta a=1.1$ $\gamma a=(1/2.2)$ $\alpha b=2.2$ $\beta b=1.2$ $\gamma b=(1/2.2)$ $\alpha c=2.2$ $\beta c=0.8$ $\gamma c=(1/2.2)$ If these parameters are substituted into Expressions (1) to (3), the corrected data is computed as follows.

Corrected data$(Ca,Cb,Cc)$=(133,138,115)

In other words, each of the sub-pixels Pa and Pb is driven based on the corrected data that is larger than the input data while the sub-pixel Pc is driven based on the corrected data of the gradation values smaller than the input data. The second luminance level in driving the sub-pixel Pa at gradation value 133 corresponds to a level which is 1.1 times the first luminance level in driving the sub-pixel at gradation value 127. The second luminance level in driving the sub-pixel Pb at gradation value 138 corresponds to a level which is 1.2 times the first luminance level in driving the sub-pixel at gradation value 127. A second luminance level in driving the sub-pixel Pc at gradation value 115 corresponds to a level which is 0.8 times the first luminance level in driving the sub-pixel at gradation value 127.

Figure 15C:
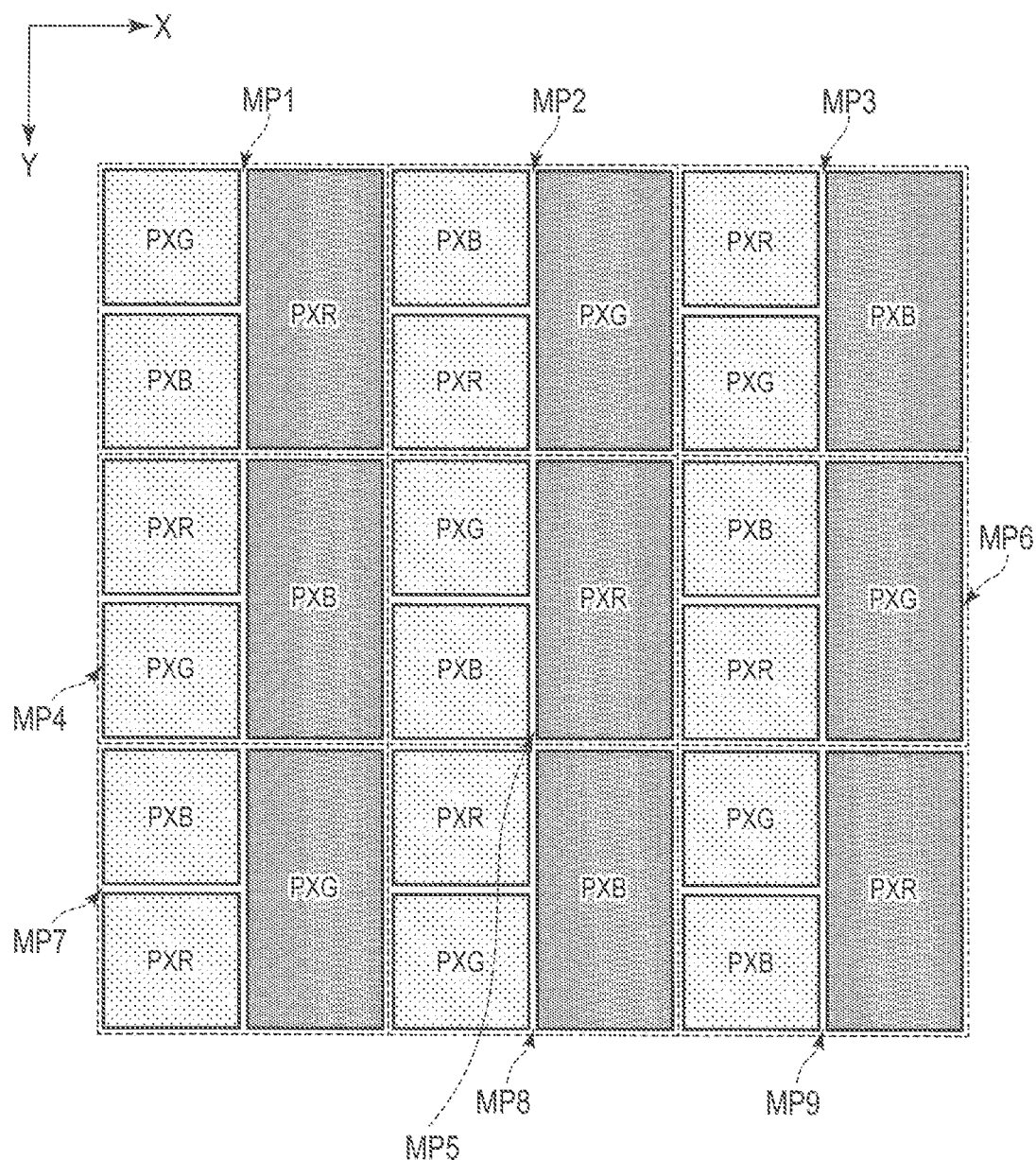
FIG. 15C is an illustration for explanation of a state of driving all the sub-pixels of the main pixel shown in FIG. 6, based on the corrected data.

In the pixel array shown in FIG. 6, if the sub-pixel having the largest area in each of the main pixels MP1 to MP9 is the correcting target pixel, the red sub-pixel PXR in each of the main pixels MP1, MP5, and MP9, the green sub-pixel PXG in each of the main pixels MP2, MP6, and MP7, and the blue sub-pixel PXB in each of the main pixels MP3, MP4, and MP8 are driven at the second luminance level lower than the first luminance level, as shown in FIG. 15C.

In addition, the green sub-pixel PXG in each of the main pixels MP1, MP5, and MP9, the blue sub-pixel PXB in each of the main pixels MP2, MP6, and MP7, and the red sub-pixel PXR in each of the main pixels MP3, MP4, and MP8 are driven at the second luminance level higher than the first luminance level. In addition, the blue sub-pixel PXB in each of the main pixels MP1, MP5, and MP9, the red sub-pixel PXR in each of the main pixels MP2, MP6, and MP7, and the green sub-pixel PXG in each of the main pixels MP3, MP4, and MP8 are driven at the second luminance level higher than the first luminance level.

In the above-explained example, the parameters $\alpha$, $\beta$, and $\gamma$ are defined when the input data is converted into the corrected but, more simply, the gradation values of the corrected data may be obtained by setting $\alpha$ and $\gamma$ of Expressions (1) to (3) at 1 and multiplying the gradation values of the input data by $\beta$. In this case, $\beta$ can be set in a range of, for example, larger than 0.5 and smaller than 2.0. For example, $\beta a$ and $\beta b$ are set in a range of larger than 1 and smaller than 2 while $\beta c$ is set in a range of larger than 0.5 and smaller than 1. The parameter values can be arbitrarily selected in the signal processor 4 in accordance with the displayed pattern and the like.

As explained above, even if the area of the sub-pixel Pc is twice the area of each of the sub-pixels Pa and Pb in the main pixel MP, the difference in luminance among the sub-pixels Pa, Pb, and Pc can be reduced by driving the sub-pixel Pc with the corrected data to make the luminance lower than that in a case where the sub-pixel Pc is driven with the input data. For this reason, undesired coloring can be reduced even in displaying the pattern as shown in FIG. 7 and FIG. 8. In addition, coloring can be simultaneously reduced by driving the sub-pixels Pa and Pb with the corrected data to make the luminance higher than that in a case where the sub-pixels are driven with the input data. Moreover, the difference in luminance among the sub-pixels Pa, Pb, and Pc can be further reduced by driving the sub-pixel Pc with the corrected data which makes the luminance lower and driving the sub-pixels Pa and Pb with the corrected data which makes the luminance higher. For this reason, undesired coloring can be further reduced.

Next, another coloring reducing method using the pixel array shown in FIG. 6 will be explained.

Figure 16:
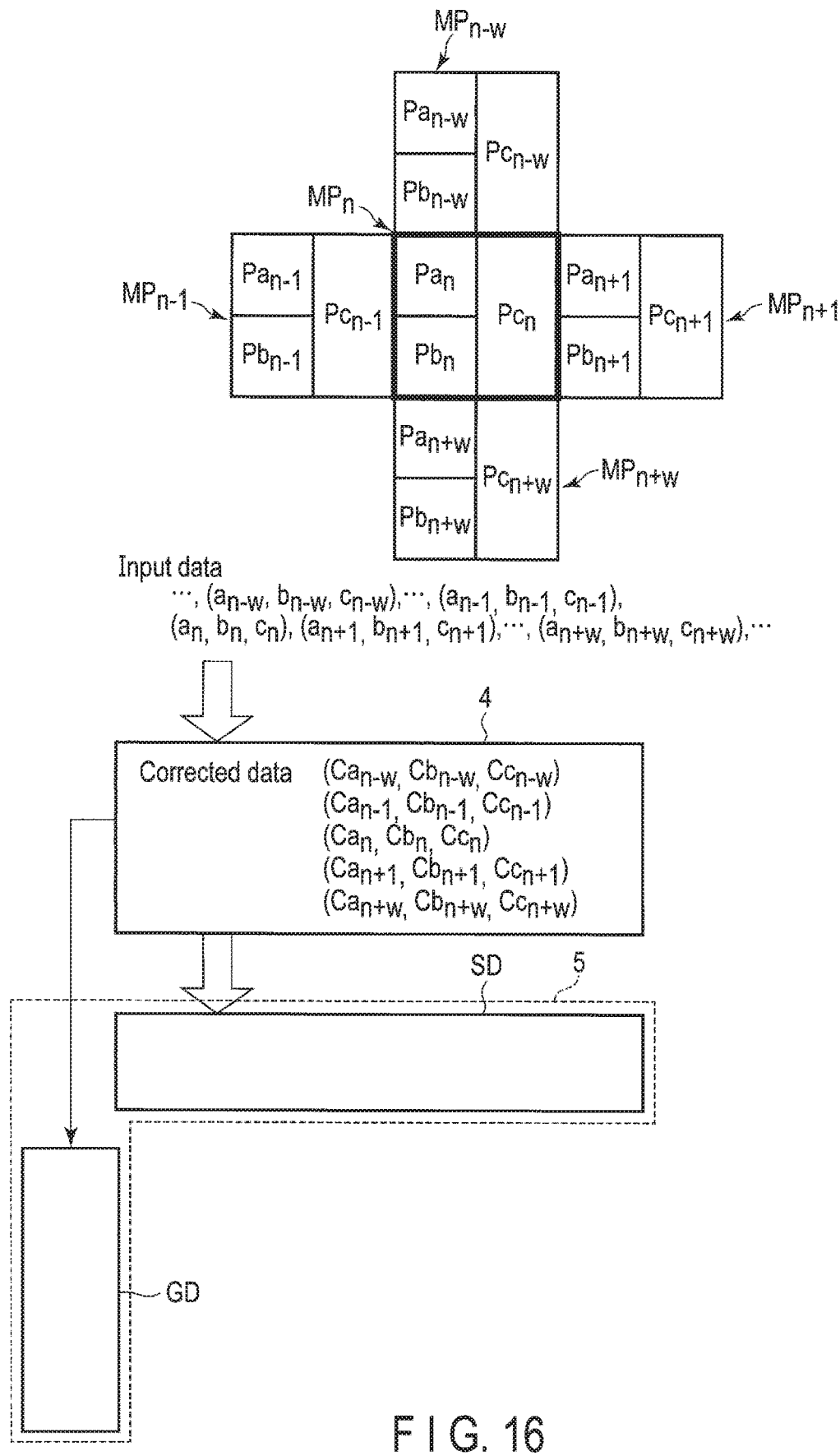
FIG. 16 is an illustration for explanation of a method of driving adjacent main pixels, based on the corrected data.

FIG. 16 is an illustration for explanation of a method of driving adjacent main pixels, based on the corrected data. Correspondence of the illustrated main pixels to the main pixels shown in FIG. 6 is as follows. A main pixel MPn−w corresponds to the main pixel MP2, a main pixel MPn−1 corresponds to the main pixel MP4, a main pixel MPn corresponds to the main pixel MP5, a main pixel MPn+1 corresponds to the main pixel MP6, and a main pixel MPn+w corresponds to the main pixel MP8.

If the main pixel MPn is considered as a first main pixel, each of the main pixels MPn−w, MPn+w, MPn−1, and MPn+1 can be a second main pixel adjacent to the first main pixel. In this case, any one of the sub-pixels of the main pixel MPn can be a reference pixel, and at least one of the sub-pixels of the main pixels MPn−w, MPn+w, MPn−1, and MPn+1 can be a correcting target pixel driven based on the corrected data.

The signal processor 4 converts the input data (a, b, c) into the corrected data (Ca, Cb, Cc) and outputs the corrected data to the driver 5, similarly to the above-explained examples. As illustrated in the drawing, input data (an−w, bn−w, cn−w) to drive sub-pixels Pan−w, Pbn−w, and Pcn−w of the main pixel MPn−w is converted into corrected data (Can−w, Cbn−w, Ccn−w). Input data (an−1, bn−1, cn−1) to drive sub-pixels Pan−1, Pbn−1, and Pcn−1 of the main pixel MPn−1 is converted into corrected data (Can−1, Cbn−1, Ccn−1). Input data (an, bn, cn) to drive sub-pixels Pan, Pbn, and Pcn of the main pixel MPn is converted into corrected data (Can, Cbn, Ccn). Input data (an+1, bn+1, cn+1) to drive sub-pixels Pan+1, Pbn+1, and Pcn+1 of the main pixel MPn+1 is converted into corrected data (Can+1, Cbn+1, Ccn+1). Input data (an+w, bn+w, cn+w) to drive sub-pixels Pan+w, Pbn+w, and Pcn+w of the main pixel MPn+w is converted into corrected data (Can+w, Cbn+w, Ccn+w).

An example of a method of converting the input data (a, b, c) into the corrected data (Ca, Cb, Cc) in the signal processor 4 will be explained. If the input data for driving the reference pixel at the first luminance level is considered as first input data and the input data for driving the correcting target pixel at the second luminance level is considered as second input data, the second input data is converted into corrected data of the third luminance level different from the second luminance level, based on the first input data and the second input data. The correcting target pixel is driven based on the corrected data.

EXAMPLE 1

Figure 17A:
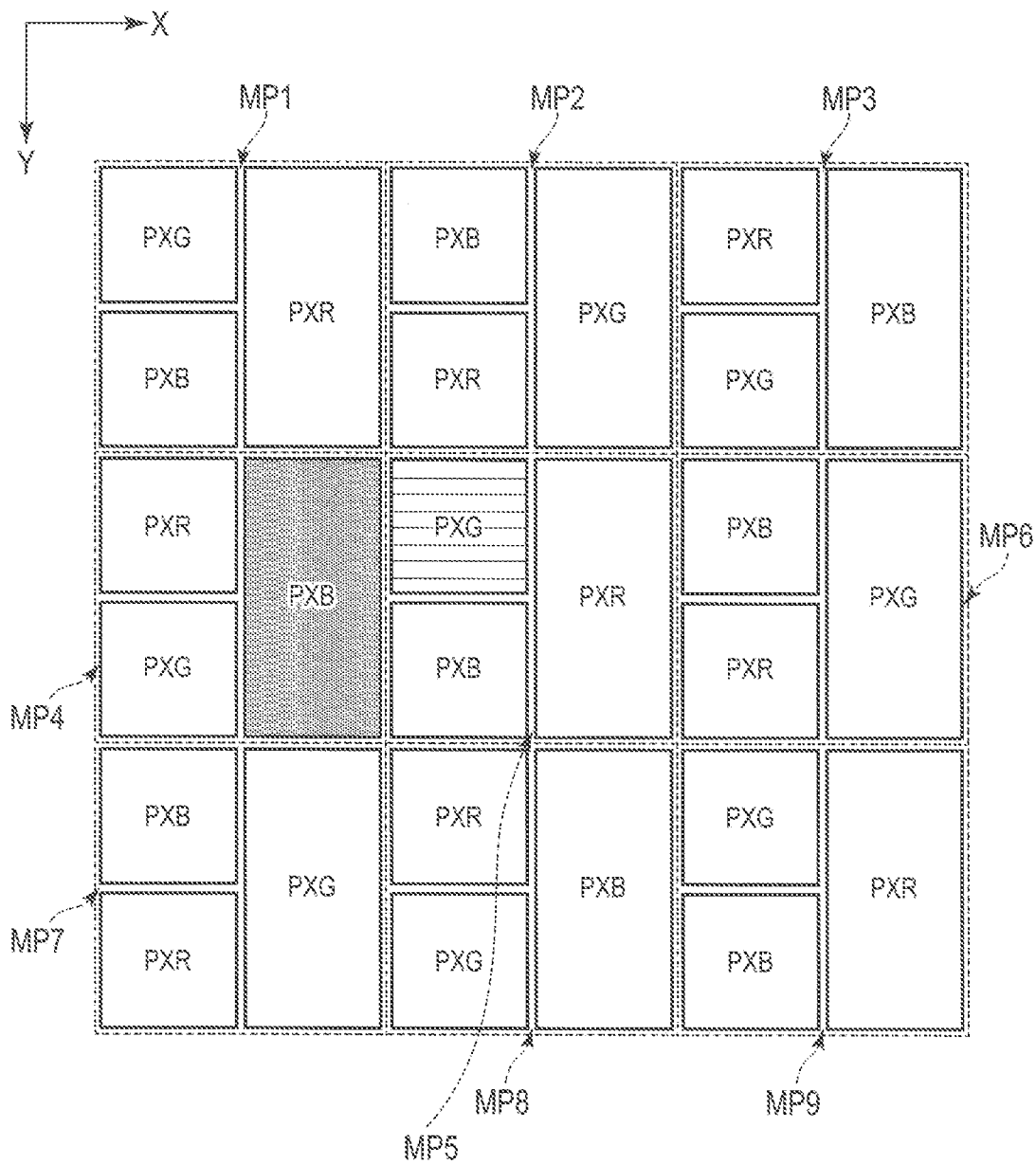
FIG. 17A is an illustration for explanation of a reference pixel and a pixel to be corrected according to Example 1.

As Example 1, the sub-pixel Pan (or Pbn) having the smallest area in the main pixel MPn is assumed to be the reference pixel, the sub-pixel Pcn−1 having the largest area in the main pixel MPn−1 is assumed to be the correcting target pixel, and the sub-pixel Pcn−1 is assumed to be driven with the corrected data Ccn−1 of third luminance level different from the second luminance level at which the sub-pixel Pcn−1 is driven with second input data cn−1. If the reference pixel and the correcting target pixel explained here are applied to the pixel array shown in FIG. 6, the green sub-pixel PXG of the main pixel MP5 corresponds to the reference pixel, and the blue sub-pixel PXB of the main pixel MP4 correspond to the correcting target pixels, as shown in FIG. 17A. In all examples explained below, the reference pixel is represented by lateral lines and the correcting target pixel is represented by dots.

First input data to drive the main pixel MPn is represented as (an, bn, cn). Second input data to drive the main pixel MPn−1 is represented as (an−1, bn−1, cn−1). Corrected data of the second input data is represented as (Can−1, Cbn−1, Ccn−1). Can−1 is consider to be equal to an−1 and Cbn−1 is considered to be equal to bn−1. An example of a transformation for obtaining the corrected data Ccn−1 is as follows.

$$Ccn-1=((cn-1^{\alpha cn-1}*\beta cn-1)^{\gamma cn-1}+(an^{\alpha an}*\beta an)^{\gamma an})/2 \qquad (4)$$

The first input data (an, bn, cn) is considered to be (127, 127, 127) as gradation values, and the second input data (an−1, bn−1, cn−1) is considered to be (0, 0, 0) as gradation values. Parameters in Expression (4) are as follows.

$\alpha cn-1=2.2$ $\beta cn-1=1.0$ $\gamma cn-1=(1/2.2)$ $\alpha an=2.2$ $\beta an=0.8$ $\gamma an=(1/2.2)$ If these parameters are substituted into Expression (4), the corrected data is computed as follows.

Corrected data($Can-1, Cbn-1, Ccn-1$)=(0,0,58)

The sub-pixels Pan−1, Pbn−1, and Pcn−1 of the main pixel MPn−1 are driven with the corrected data Can−1, Cbn−1, and Ccn−1, respectively. In other words, each of the sub-pixels Pan−1 and Pbn−1 is driven based on the corrected data that is the same as the second input data while the sub-pixel Pcn−1 is driven based on the corrected data of the gradation values larger than the input data.

In contrast, the sub-pixels Pan, Pbn, and Pcn of the main pixel MPn are driven with the first input data an, bn, and cn, respectively.

In Expression (4) explained above, αcn, αcn−1, γcn, and γcn−1 may be set at 1 and βcn and βcn−1 may be arbitrarily set within a range of larger than or equal to 0.5 and smaller than 1. For example, if βcn−1 is set at 1 and βcn is set at 0.8, the corrected data Ccn−1 is 50 according to Expression (4) explained above.

The sub-pixel Pan of the main pixel MPn is considered as the reference pixel and the sub-pixel Pcn−1 of the main pixel MPn−1 is considered as the correcting target pixel in the above example, but the sub-pixels are not limited to the example.

Figure 17B:
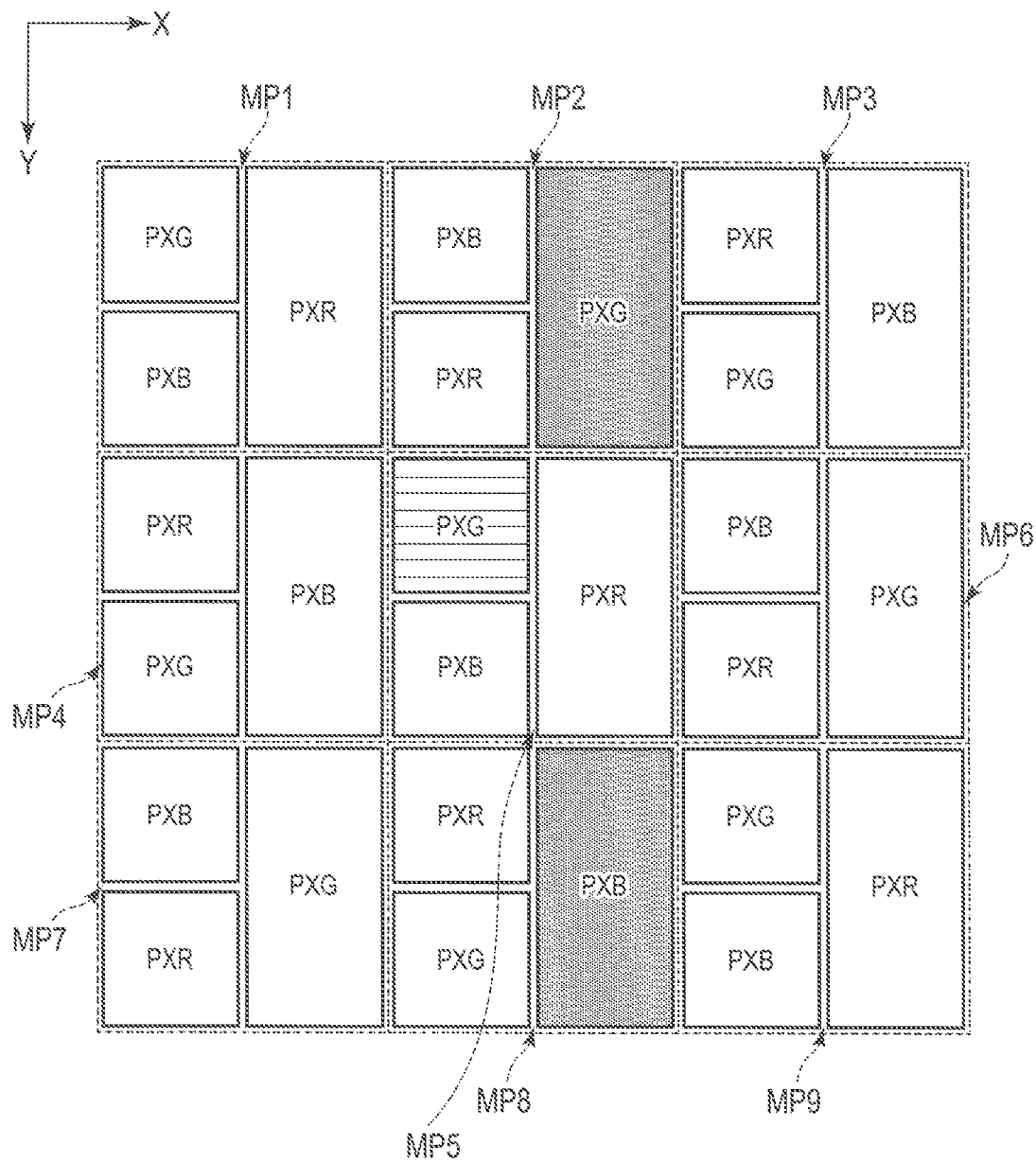
FIG. 17B is an illustration for explanation of a reference pixel and two pixels to be corrected according to Example 1.

In the following explanation, the sub-pixel Pan of the main pixel MPn is considered as the reference pixel, and the sub-pixel Pcn−w of the main pixel MPn−w and the sub-pixel Pcn+w of the main pixel MPn+w are considered as the correcting target pixels. If the reference pixel and the correcting target pixels explained here are applied to the pixel array shown in FIG. 6, the green sub-pixel PXG of the main pixel MP5 corresponds to the reference pixel, and the green sub-pixel PXG of the main pixel MP2 and the blue sub-pixel PXB of the main pixel MP8 correspond to the correcting target pixels, as shown in FIG. 17B.

An example of a transformation for obtaining the corrected data Ccn−w and Ccn+w is as follows.

$$Ccn-w=Ccn+w=((cn-w^{\alpha cn-w}*\beta cn-w)^{\gamma cn-w}+ \\ (cn+w^{\alpha cn\pm w}*\beta cn+w)^{\gamma cn+w}+(an^{\alpha an}*\beta an)^{\gamma an})/3 \qquad (5)$$

The input data (an, bn, cn) is (224, 224, 224) as gradation values, the input data (an−w, bn−w, cn−w) is (63, 63, 63) as gradation values, and the input data is (an+w, bn+w, cn+w) is (127, 127, 127) as gradation values. Parameters in Expression (5) are as follows.

$\alpha cn-w=2.2$ $\beta cn-w=1.1$ $\gamma cn-w=(1/2.2)$ $\alpha cn+w=2.2$ $\beta cn+w=1.2$ $\gamma cn+w=(1/2.2)$ $\alpha an=2.2$ $\beta an=0.8$ $\gamma an=(1/2.2)$ If these parameters are substituted into Expression (5), the corrected data is computed as follows.

Corrected data($Can-w, Cbn-w, Ccn-w$)=(63,63,135)

Corrected data($Can+w, Cbn+w, Ccn+w$)=(127,127,135)

The sub-pixels Pan−w, Pbn−w, and Pcn−w of the main pixel MPn−w are driven with the corrected data Can−w, Cbn−w, and Ccn−w, respectively. In other words, each of the sub-pixels Pan−w and Pbn−w is driven based on the corrected data that is the same as the second input data while the sub-pixel Pcn−w is driven based on the corrected data of the gradation values larger than the input data.

The sub-pixels Pan+w, Pbn+w, and Pcn+w of the main pixel MPn+w are driven with the corrected data Can+w, Cbn+w, and Ccn+w, respectively. In other words, each of the sub-pixels Pan+w and Pbn+w is driven based on the corrected data that is the same as the second input data while the sub-pixel Pcn+w is driven based on the corrected data of the gradation values larger than the input data.

In contrast, the sub-pixels Pan, Pbn, and Pcn of the main pixel MPn are driven with the input data an, bn, and cn, respectively.

An example of a further simplified transformation will be explained below. The sub-pixel Pan of the main pixel MPn is considered as the reference pixel, and the sub-pixel Pcn−1 of the main pixel MPn−1 is considered as the correcting target pixel. Another example of the transformation for obtaining the corrected data Ccn−1 driving the sub-pixel pcn−1 is as follows.

$$Ccn-1=((cn-1)+an)\div 2 \qquad (11)$$

$$Ccn-1=((cn-1)+(cn+1)+an)\div 3 \qquad (12)$$

$$Ccn-1=((cn-1)+(cn+1)+(cn+w)+an)\div 4 \qquad (13)$$

$$Ccn-1=((cn-1)+(cn+1)+(cn+w)+(cn-w)+an)\div 5 \qquad (14)$$

Expression (11) corresponds to an example of obtaining the corrected data by considering luminance of the main pixel MPn including the reference pixel Pan and luminance of the main pixel MPn−1 adjacent to the main pixel MPn. In this case, the correcting target pixel may be any one of the green sub-pixel PXG (sub-pixel Pcn−w) of the main pixel MP2, the blue sub-pixel PXB (sub-pixel Pcn−1) of the main pixel MP4, the green sub-pixel PXG (sub-pixel Pcn+1) of the main pixel MP6, and the blue sub-pixel PXB (sub-pixel Pcn+w) of the main pixel MP8 as shown in FIG. 17A.

Expression (12) corresponds to an example of obtaining the corrected data by considering luminance of the main pixel MPn including the reference pixel Pan and luminance of two main pixels MPn−1 and MPn+1 adjacent to the main pixel MPn. The corrected data Ccn+1 of the sub-pixel Pn+1 can also be obtained based on Expression (12). In this case, the correcting target pixel may be a combination of any two sub-pixels of the green sub-pixel PXG (sub-pixel Pcn−w) of the main pixel MP2, the blue sub-pixel PXB (sub-pixel Pcn−1) of the main pixel MP4, the green sub-pixel PXG (sub-pixel Pcn+1) of the main pixel MP6, and the blue sub-pixel PXB (sub-pixel Pcn+w) of the main pixel MP8, as shown in FIG. 17B.

Figure 17C:
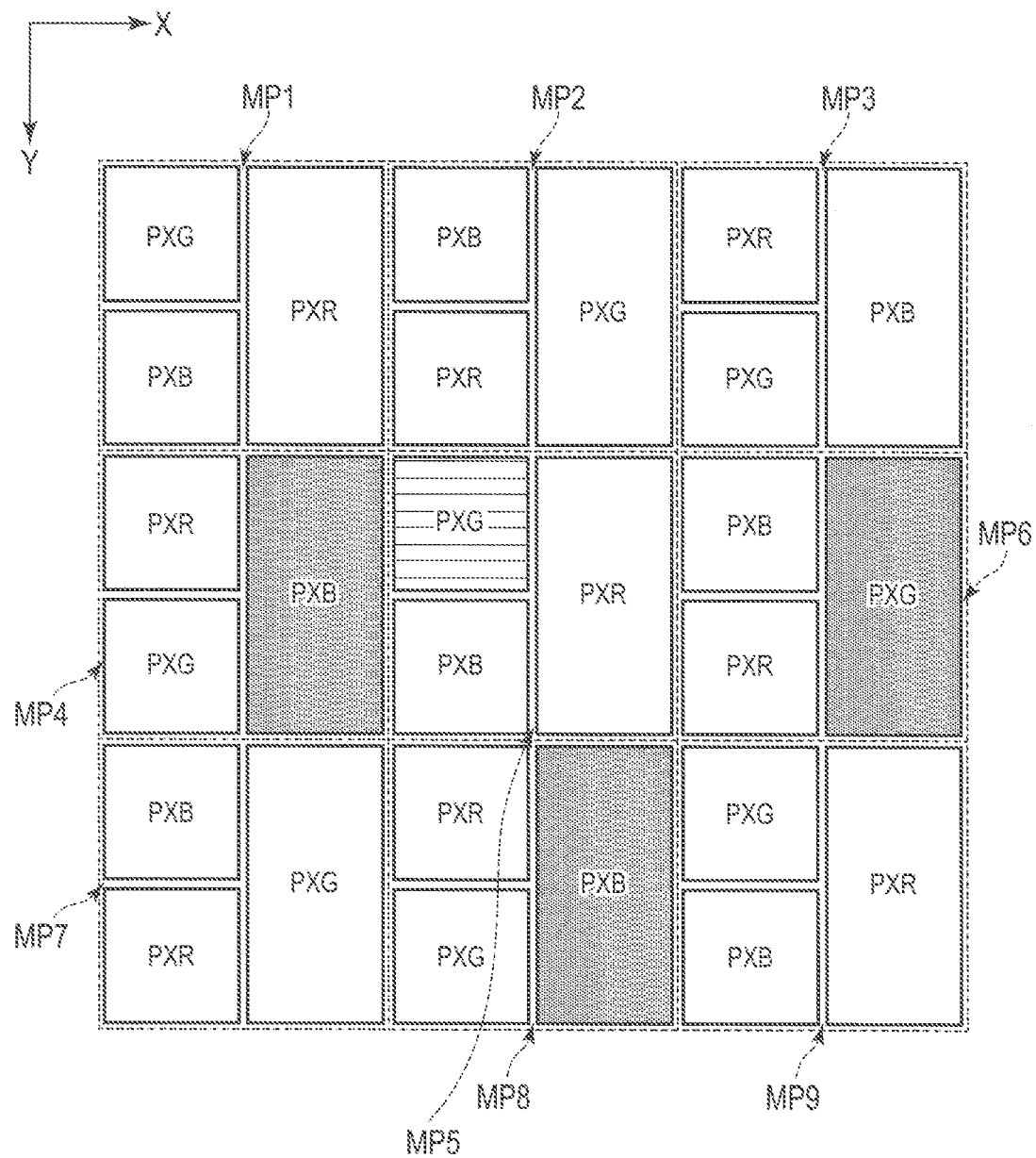
FIG. 17C is an illustration for explanation of a reference pixel and three pixels to be corrected according to Example 1.

Expression (13) corresponds to an example of obtaining the corrected data by considering luminance of the main pixel MPn including the reference pixel Pan and luminance of three main pixels MPn−1, MPn+1 and MPn+w adjacent to the main pixel MPn. The corrected data Ccn+1 of the sub-pixel Pn+1 and the corrected data Ccn+w of the sub-pixel Pn+w can also be obtained based on Expression (13). In Expression (13), the green sub-pixel PXG of the main pixel MP5 corresponds to the reference pixel, and the blue sub-pixel PXB of the main pixel MP4, the green sub-pixel PXG of the main pixel MP6, and the blue sub-pixel PXB of the main pixel MP8 correspond to the correcting target pixels, as shown in FIG. 17C. However, the correcting target pixel may be a combination of any three sub-pixels of the green sub-pixel PXG (sub-pixel Pcn−w) of the main pixel MP2, the blue sub-pixel PXB (sub-pixel Pcn−1) of the main pixel MP4, the green sub-pixel PXG (sub-pixel Pcn+1) of the main pixel MP6, and the blue sub-pixel PXB (sub-pixel Pcn+w) of the main pixel MP8, as shown in FIG. 17C.

Figure 17D:
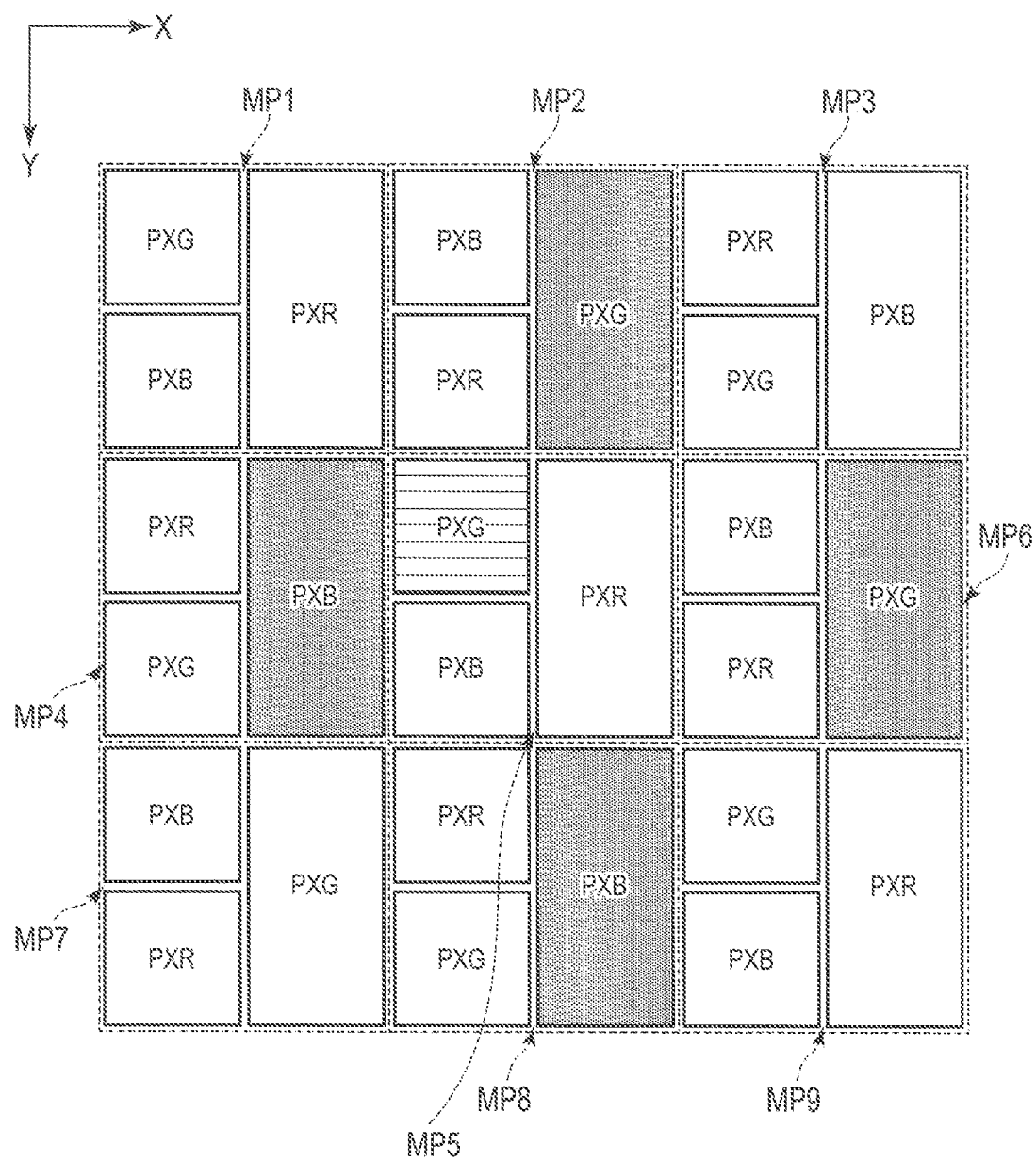
FIG. 17D is an illustration for explanation of a reference pixel and four pixels to be corrected according to Example 1.

Expression (14) corresponds to an example of obtaining the corrected data by considering luminance of the main pixel MPn including the reference pixel Pan and luminance of all of four main pixels MPn−1, MPn+1, MPn+w and MPn−w adjacent to the main pixel MPn. The corrected data Ccn+1 of the sub-pixel Pn+1, the corrected data Ccn+w of the sub-pixel Pn+w and the corrected data Ccn−w of the sub-pixel Pn−w can also be obtained based on Expression (14). In Expression (14), the green sub-pixel PXG of the main pixel MP5 corresponds to the reference pixel, and the green sub-pixel PXG of the main pixel MP2, the blue sub-pixel PXB of the main pixel MP4, the green sub-pixel PXG of the main pixel MP6, and the blue sub-pixel PXB of the main pixel MP8 correspond to the correcting target pixels, as shown in FIG. 17D.

EXAMPLE 2

As Example 2, the sub-pixel Pcn having the largest area in the main pixel MPn is assumed to be the reference pixel, the sub-pixel Pcn−1 having the largest area in the main pixel MPn−1 is assumed to be the correcting target pixel, and the sub-pixel Pcn−1 is assumed to be driven with the corrected data Ccn−1. An example of a simplified transformation for obtaining the corrected data Ccn−1 is as follows.

$$Ccn-1=((cn-1)+cn)\div 2 \qquad (21)$$

$$Ccn-1=((cn-1)+(cn+1)+cn)\div 3 \qquad (22)$$

$$Ccn-1=((cn-1)+(cn+1)+(cn+w)+cn)\div 4 \qquad (23)$$

$$Ccn-1=((cn-1)+(cn+1)+(cn+w)+(cn-w)+cn)\div 5 \qquad (24)$$

Figure 18A:
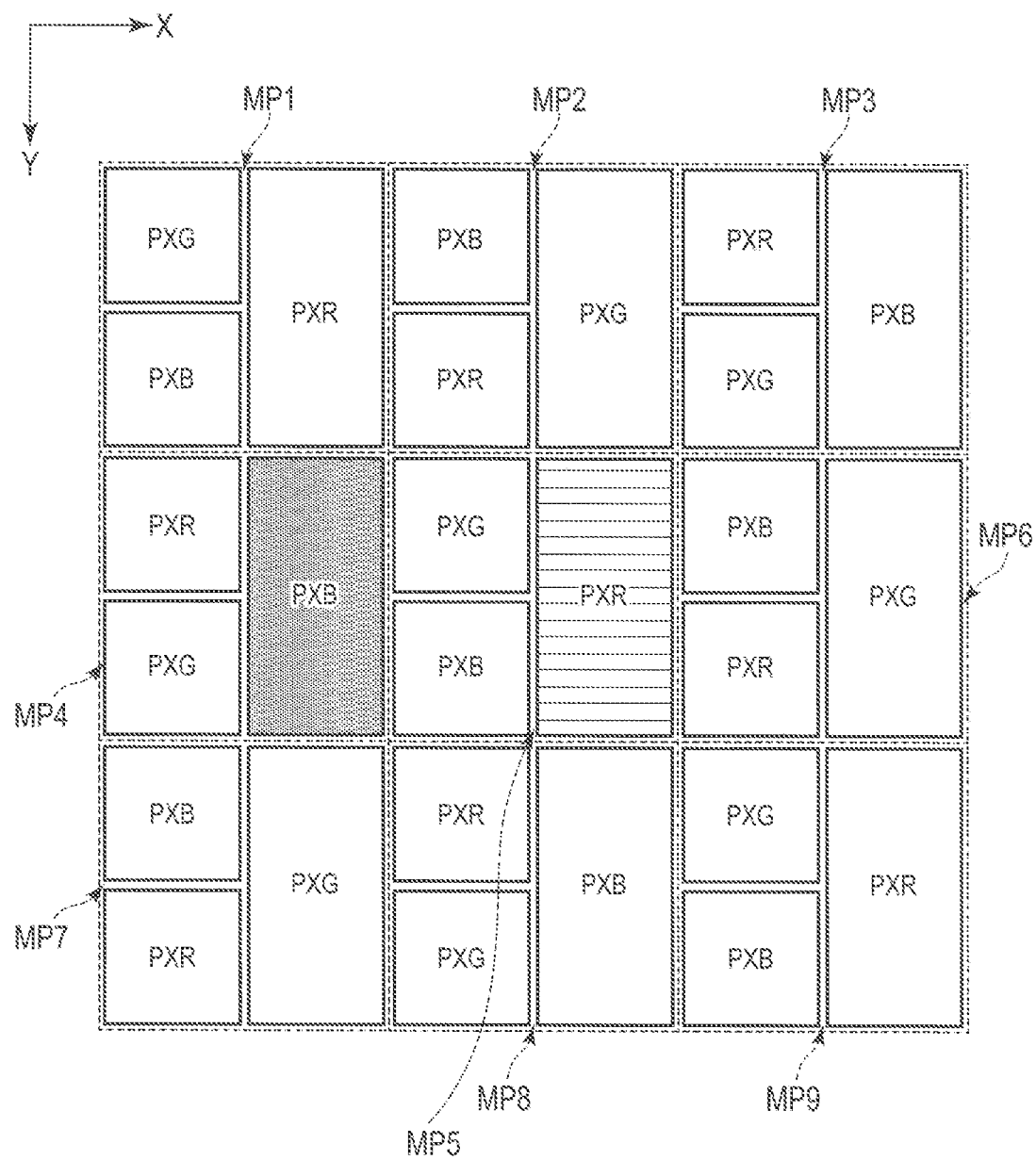
FIG. 18A is an illustration for explanation of a reference pixel and a pixel to be corrected according to Example 2.

In Expression (21), the red sub-pixel PXR of the main pixel MP5 corresponds to the reference pixel, and the blue sub-pixel PXB of the main pixel MP4 corresponds to the correcting target pixel, as shown in FIG. 18A. However, the correcting target pixel may be any one of the green sub-pixel PXG (sub-pixel Pcn−w) of the main pixel MP2, the blue sub-pixel PXB (sub-pixel Pcn−1) of the main pixel MP4, the green sub-pixel PXG (sub-pixel Pcn+1) of the main pixel MP6, and the blue sub-pixel PXB (sub-pixel Pcn+w) of the main pixel MP8 as shown in FIG. 18A.

In Expression (22), the red sub-pixel PXR of the main pixel MP5 corresponds to the reference pixel, and the blue sub-pixel PXB of the main pixel MP4 and the green sub-pixel PXG of the main pixel MP6 correspond to the correcting target pixels, as shown in FIG. 18B. However, the correcting target pixel may be a combination of any two sub-pixels of the green sub-pixel PXG (sub-pixel Pcn−w) of the main pixel MP2, the blue sub-pixel PXB (sub-pixel Pcn−1) of the main pixel MP4, the green sub-pixel PXG (sub-pixel Pcn+1) of the main pixel MP6, and the blue sub-pixel PXB (sub-pixel Pcn+w) of the main pixel MP8, as shown in FIG. 18B.

Figure 18C:
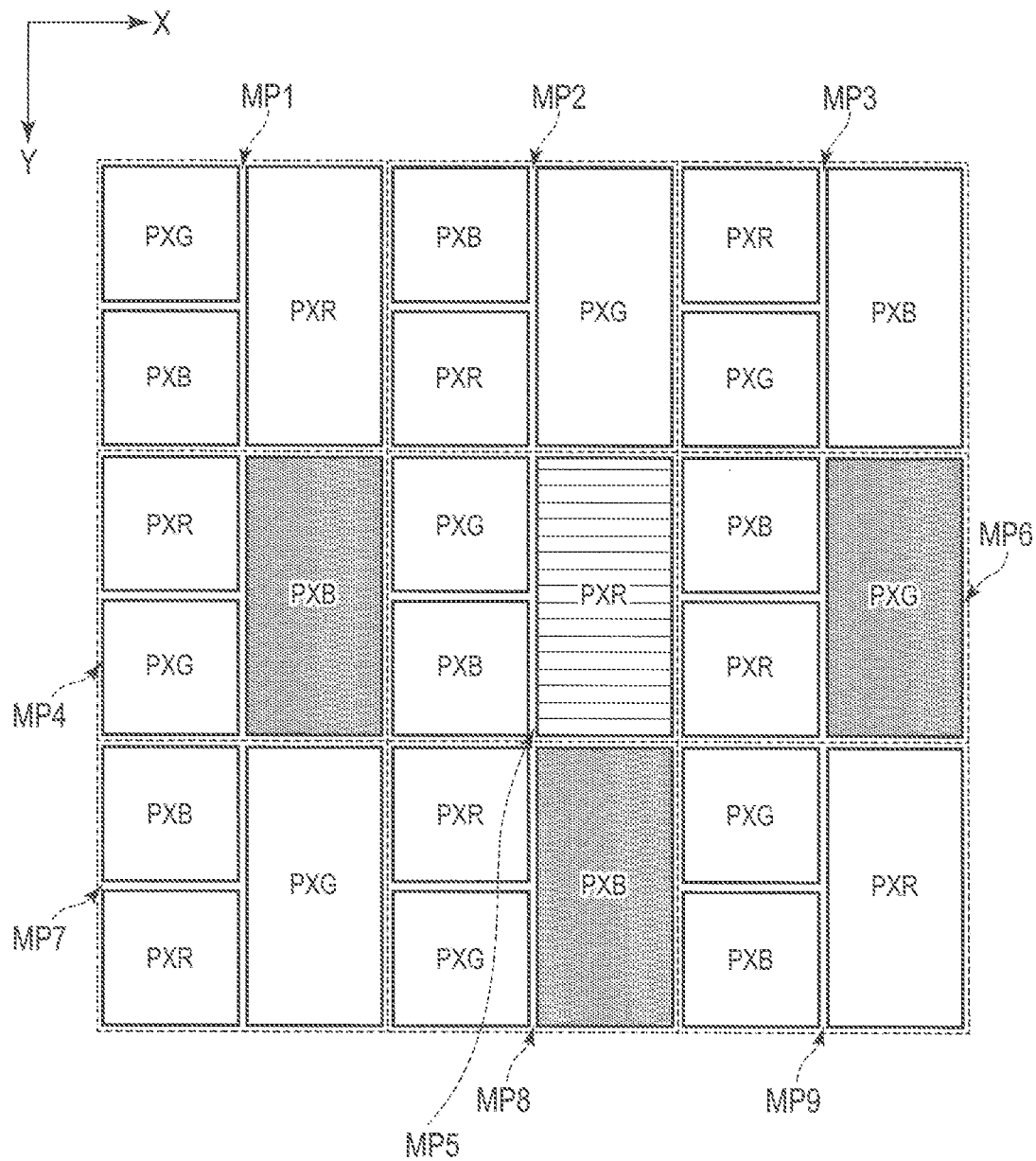
FIG. 18C is an illustration for explanation of a reference pixel and three pixels to be corrected according to Example 2.

In Expression (23), the red sub-pixel PXG of the main pixel MP5 corresponds to the reference pixel, and the blue sub-pixel PXB of the main pixel MP4, the green sub-pixel PXG of the main pixel MP6, and the blue sub-pixel PXB of the main pixel MP8 correspond to the correcting target pixels as shown in FIG. 18C. However, the correcting target pixel may be a combination of any three sub-pixels of the green sub-pixel PXG (sub-pixel Pcn−w) of the main pixel MP2, the blue sub-pixel PXB (sub-pixel Pcn−1) of the main pixel MP4, the green sub-pixel PXG (sub-pixel Pcn+1) of the main pixel MP6, and the blue sub-pixel PXB (sub-pixel Pcn+w) of the main pixel MP8 as shown in FIG. 18C.

Figure 18D:
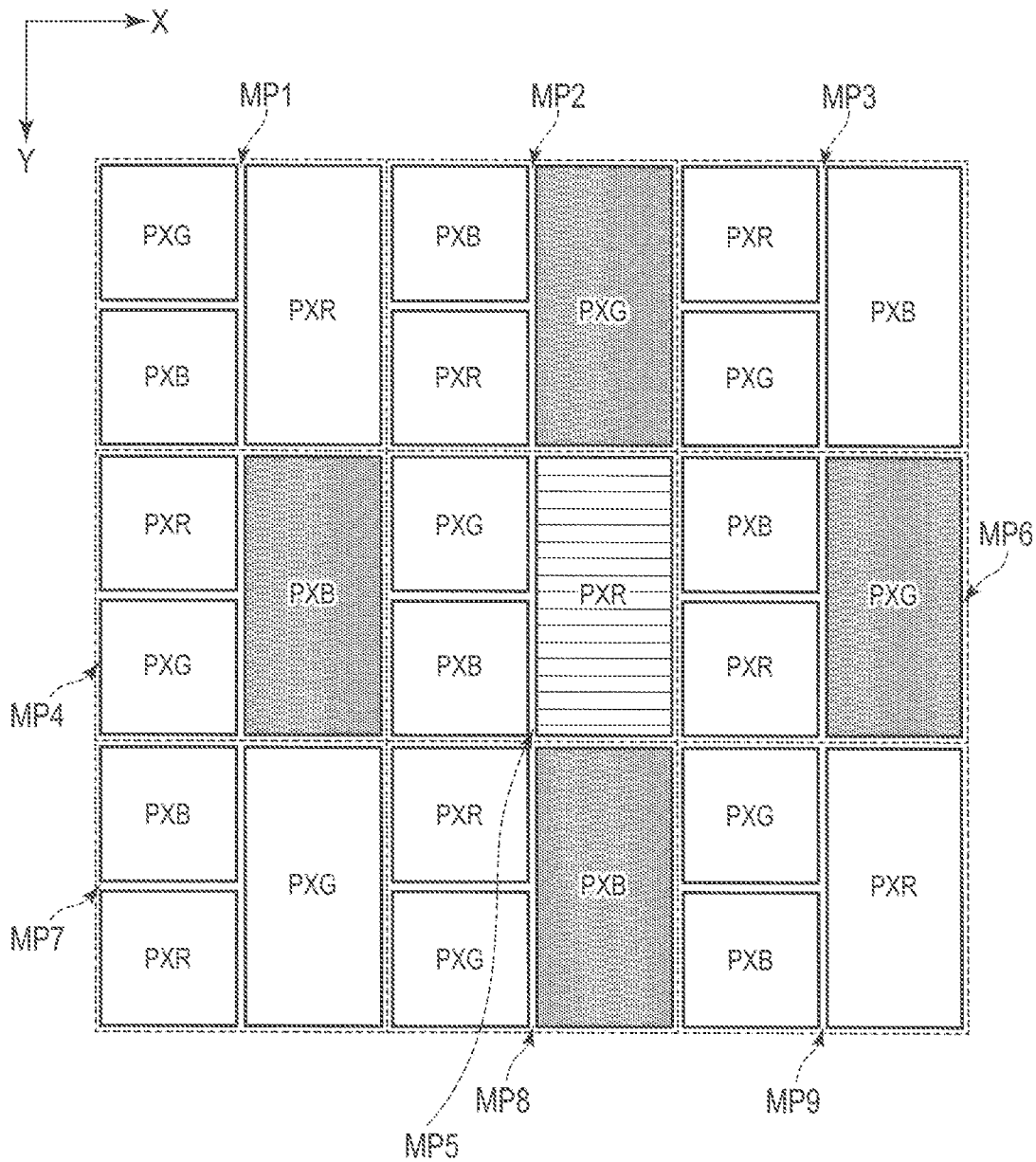
FIG. 18D is an illustration for explanation of a reference pixel and four pixels to be corrected according to Example 2.

In Expression (24), the red sub-pixel PXR of the main pixel MP5 corresponds to the reference pixel, and the green sub-pixel PXG of the main pixel MP2, the blue sub-pixel PXB of the main pixel MP4, the green sub-pixel PXG of the main pixel MP6, and the blue sub-pixel PXB of the main pixel MP8 correspond to the correcting target pixels, as shown in FIG. 18D.

EXAMPLE 3

As Example 3, the sub-pixel Pan (or Pbn) having the smallest area in the main pixel MPn is assumed to be the reference pixel, the sub-pixel Pbn−1 (or Pan−1) having the smallest area in the main pixel MPn−1 is assumed to be the correcting target pixel, and the sub-pixel Pbn−1 is assumed to be driven with the corrected data Cbn−1. An example of a simplified transformation for obtaining the corrected data Cbn−1 is as follows.

$$Cbn-1=((bn-1)+an)\div 2 \quad (31)$$

$$Cbn-1=((bn-1)+(bn+1)+an)\div 3 \quad (32)$$

$$Cbn-1=((bn-1)+(bn+1)+(bn+w)+an)\div 4 \quad (33)$$

$$Cbn-1=((bn-1)+(bn+1)+(bn+w)+(bn-w)+an)\div 5 \quad (34)$$

In each of Expressions (31) to (34), (bn−1) can be replaced with (an−1), (bn+1) can be replaced with (an+1), (bn+w) can be replaced with (an+w), (bn−w) can be replaced with (an−w), and an can be replaced with bn.

The corrected data Can−1 can also be obtained based on Expression (31). The corrected data Can−1, Can+1, and Cbn+1 can also be obtained based on Expression (32). The corrected data Can−1, Can+1, Cbn+1, Can+w, and Cbn+w can also be obtained based on Expression (33). The corrected data Can−1, Can+1, Cbn+1, Can+w, Cbn+w, Can−w, and Cbn−w can also be obtained based on Expression (34).

For example, in Expression (31), the green sub-pixel PXG of the main pixel MP5 corresponds to the reference pixel, and the green sub-pixel PXG of the main pixel MP4 corresponds to the correcting target pixel, as shown in FIG. 19A. However, the correcting target pixel may be any one of the blue sub-pixel PXB (sub-pixel Pan−w) and the red sub-pixel PXR (sub-pixel Pbn−w) of the main pixel MP2, the red sub-pixel PXR (sub-pixel Pan−1) and the green sub-pixel PXG (sub-pixel Pbn−1) of the main pixel MP4, the blue sub-pixel PXB (sub-pixel Pan+1) and the red sub-pixel PXR (sub-pixel Pbn+1) of the main pixel MP6, and the red sub-pixel PXR (sub-pixel Pan+w) and the green sub-pixel PXG (sub-pixel Pbn+w) of the main pixel MP8 as shown in FIG. 19A.

In Expression (32), the green sub-pixel PXG of the main pixel MP5 corresponds to the reference pixel, and the green sub-pixel PXG of the main pixel MP4 and the red sub-pixel PXR of the main pixel MP6 correspond to the correcting target pixels, as shown in FIG. 19B. However, the correcting target pixel may be a combination of any two sub-pixels of the blue sub-pixel PXB (sub-pixel Pan−w) and the red sub-pixel PXR (sub-pixel Pbn−w) of the main pixel MP2, the red sub-pixel PXR (sub-pixel Pan−1) and the green sub-pixel PXG (sub-pixel Pbn−1) of the main pixel MP4, the blue sub-pixel PXB (sub-pixel Pan+1) and the red sub-pixel PXR (sub-pixel Pbn+1) of the main pixel MP6, and the red sub-pixel PXR (sub-pixel Pan+w) and the green sub-pixel PXG (sub-pixel Pbn+w) of the main pixel MP8 as shown in FIG. 19B.

Figure 19C:
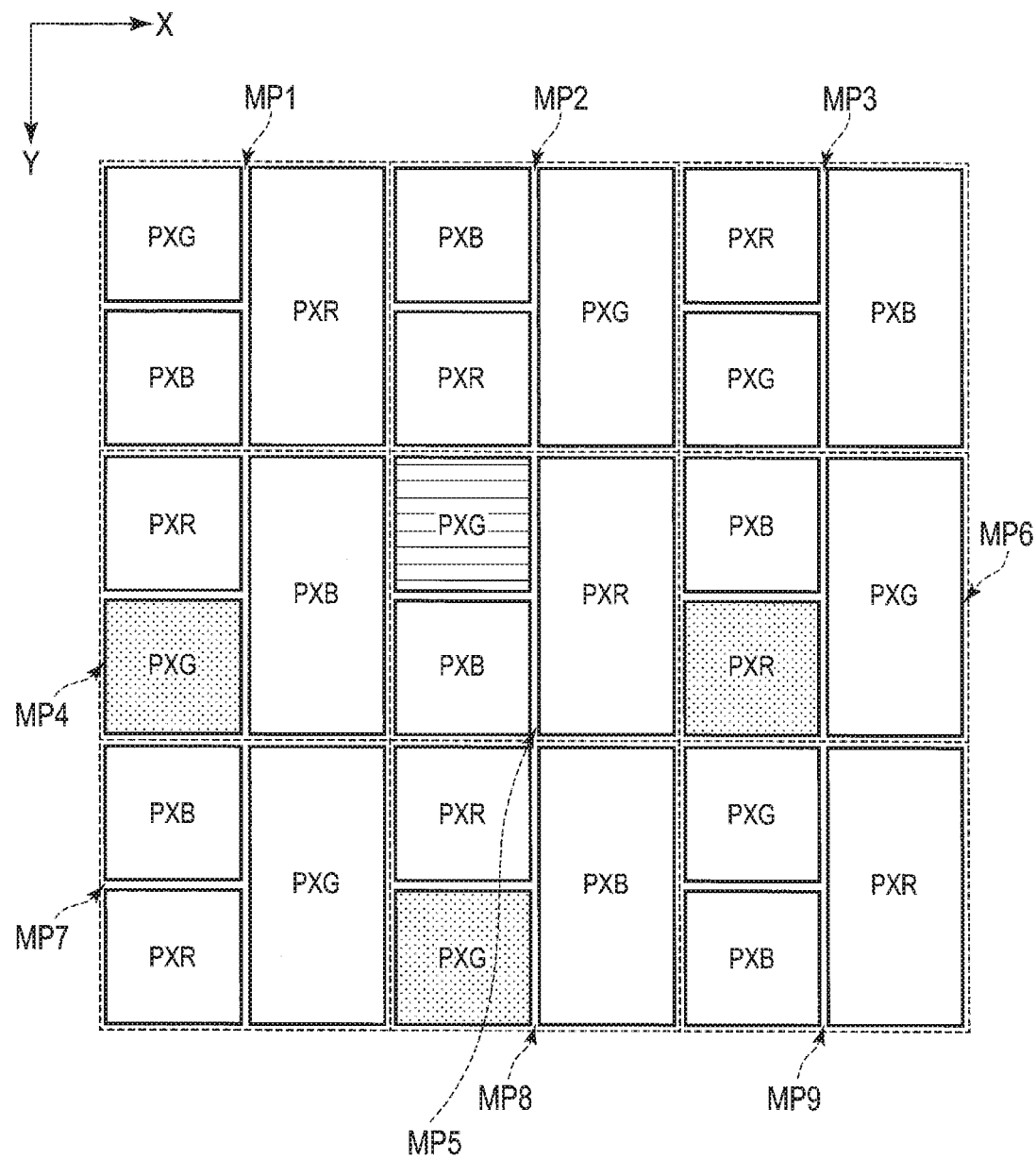
FIG. 19C is an illustration for explanation of a reference pixel and three pixels to be corrected according to Example 3.

In Expression (33), the green sub-pixel PXG of the main pixel MP5 corresponds to the reference pixel, and the green sub-pixel PXG of the main pixel MP4, the red sub-pixel PXR of the main pixel MP6, and the green sub-pixel PXG of the main pixel MP8 correspond to the correcting target pixels, as shown in FIG. 19C. However, the correcting target pixel may be a combination of any three sub-pixels of the blue sub-pixel PXB (sub-pixel Pan−w) and the red sub-pixel PXR (sub-pixel Pbn−w) of the main pixel MP2, the red sub-pixel PXR (sub-pixel Pan−1) and the green sub-pixel PXG (sub-pixel Pbn−1) of the main pixel MP4, the blue sub-pixel PXB (sub-pixel Pan+1) and the red sub-pixel PXR (sub-pixel Pbn+1) of the main pixel MP6, and the red sub-pixel PXR (sub-pixel Pan+w) and the green sub-pixel PXG (sub-pixel Pbn+w) of the main pixel MP8 as shown in FIG. 19C.

Figure 19D:
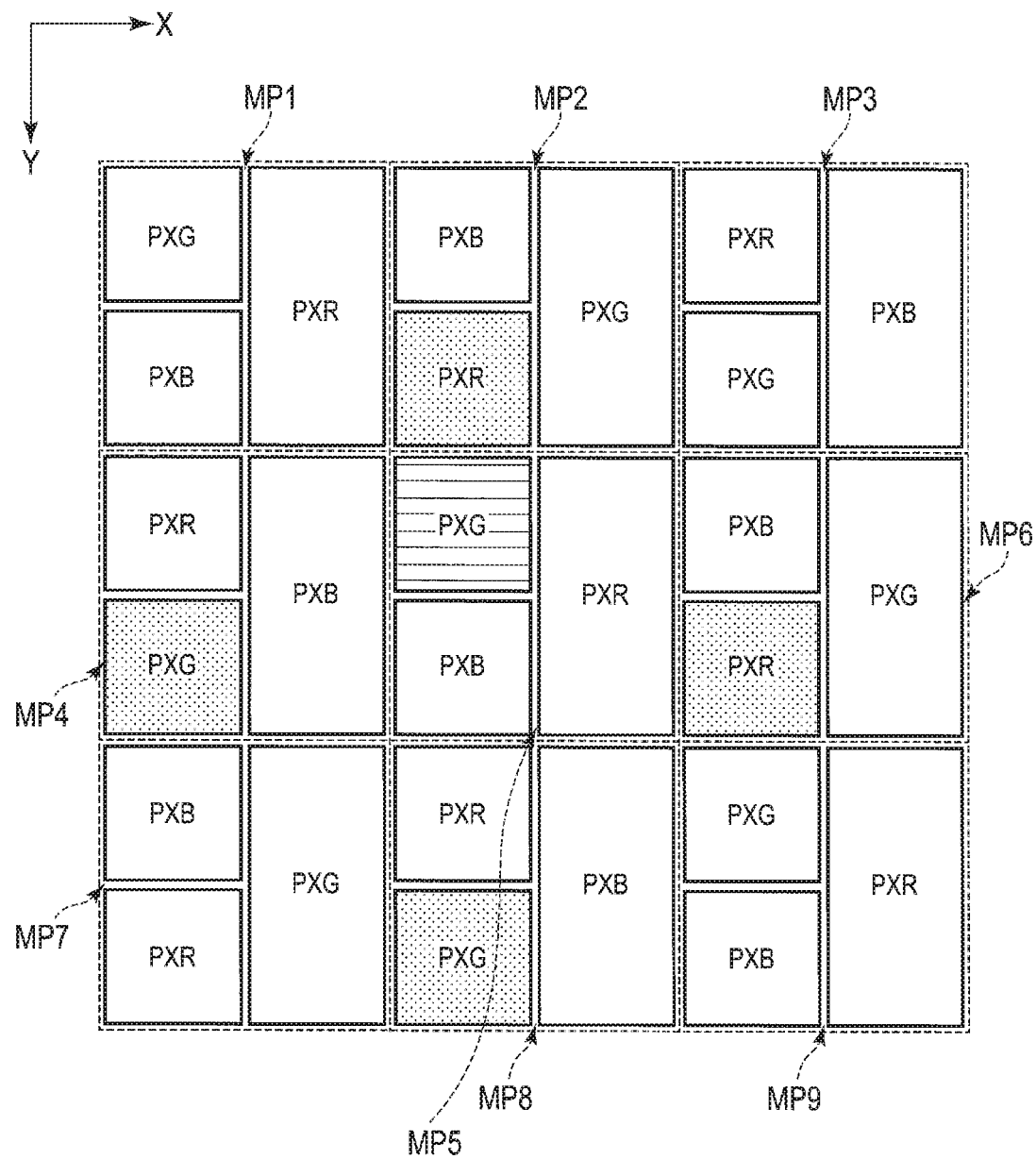
FIG. 19D is an illustration for explanation of a reference pixel and four pixels to be corrected according to Example 3.

In Expression (34), the green sub-pixel PXG of the main pixel MP5 corresponds to the reference pixel, and the red sub-pixel PXR of the main pixel MP2, the green sub-pixel PXG of the main pixel MP4, the red sub-pixel PXR of the main pixel MP6, and the green sub-pixel PXG of the main pixel MP8 correspond to the correcting target pixels, as shown in FIG. 19D.

EXAMPLE 4

As Example 4, the sub-pixel Pcn having the largest area in the main pixel MPn is assumed to be the reference pixel, the sub-pixel Pbn−1 (or Pan−1) having the smallest area in the main pixel MPn−1 is assumed to be the correcting target pixel, and the sub-pixel Pbn−1 is assumed to be driven with the corrected data Cbn−1. An example of a simplified transformation for obtaining the corrected data Cbn−1 is as follows.

$$Cbn-1=((bn-1)+cn)\div 2 \quad (41)$$

$$Cbn-1=((bn-1)+(bn+1)+cn)\div 3 \quad (42)$$

$$Cbn-1=((bn-1)+(bn+1)+(bn+w)+cn)\div 4 \quad (43)$$

$$Cbn-1=((bn-1)+(bn+1)+(bn+w)+(bn-w)+cn)\div 5 \quad (44)$$

In Example 4, too, the replacement explained in Example 3 can be executed and the other corrected data can also be obtained based on Expressions (41) to (44).

Figure 20A:
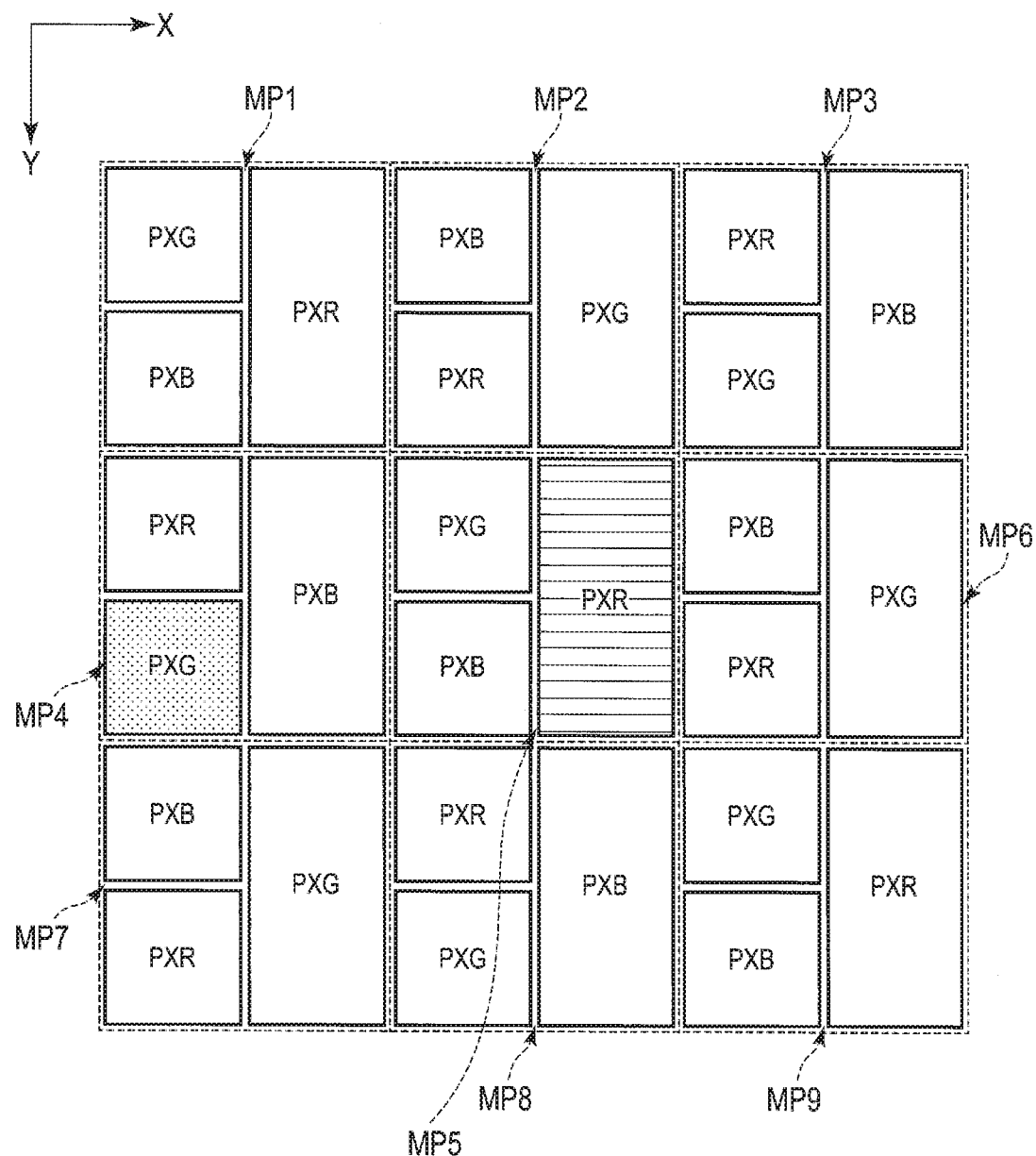
FIG. 20A is an illustration for explanation of a reference pixel and a pixel to be corrected according to Example 4.

For example, in Expression (41), the red sub-pixel PXR of the main pixel MP5 corresponds to the reference pixel, and the green sub-pixel PXG of the main pixel MP4 corresponds to the correcting target pixel, as shown in FIG. 20A. However, the correcting target pixel may be any one of the blue sub-pixel PXB (sub-pixel Pan−w) and the red sub-pixel PXR (sub-pixel Pbn−w) of the main pixel MP2, the red sub-pixel PXR (sub-pixel Pan−1) and the green sub-pixel PXG (sub-pixel Pbn−1) of the main pixel MP4, the blue sub-pixel PXB (sub-pixel Pan+1) and the red sub-pixel PXR (sub-pixel Pbn+1) of the main pixel MP6, and the red sub-pixel PXR (sub-pixel Pan+w) and the green sub-pixel PXG (sub-pixel Pbn+w) of the main pixel MP8 as shown in FIG. 20A.

Figure 20B:
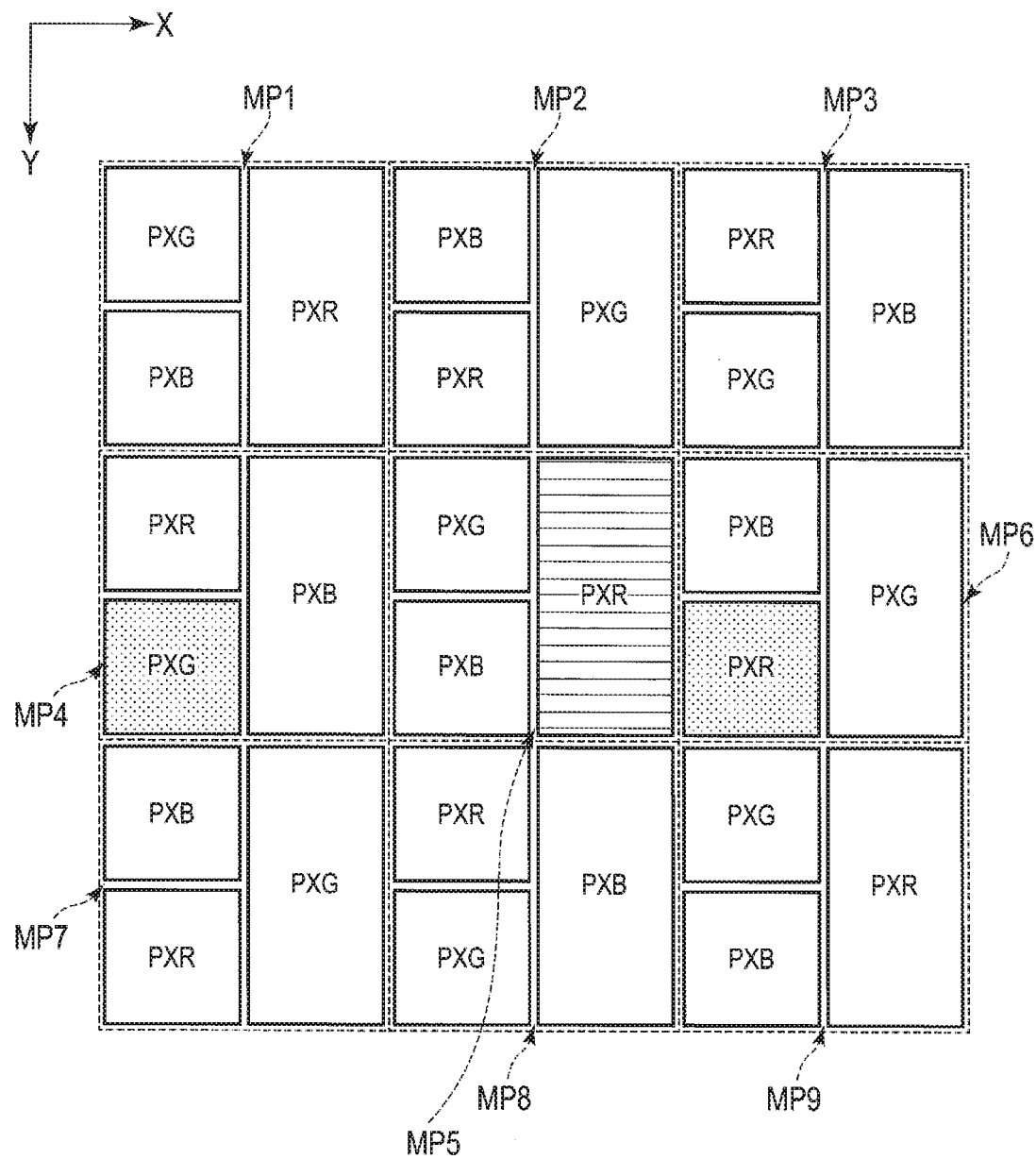
FIG. 20B is an illustration for explanation of a reference pixel and two pixels to be corrected according to Example 4.

In Expression (42), the red sub-pixel PXR of the main pixel MP5 corresponds to the reference pixel, and the green sub-pixel PXG of the main pixel MP4 and the red sub-pixel PXR of the main pixel MP6 correspond to the correcting target pixels, as shown in FIG. 20B. However, the correcting target pixel may be a combination of any two sub-pixels of the blue sub-pixel PXB (sub-pixel Pan−w) and the red sub-pixel PXR (sub-pixel Pbn−w) of the main pixel MP2, the red sub-pixel PXR (sub-pixel Pan−1) and the green sub-pixel PXG (sub-pixel Pbn−1) of the main pixel MP4, the blue sub-pixel PXB (sub-pixel Pan+1) and the red sub-pixel PXR (sub-pixel Pbn+1) of the main pixel MP6, and the red sub-pixel PXR (sub-pixel Pan+w) and the green sub-pixel PXG (sub-pixel Pbn+w) of the main pixel MP8 as shown in FIG. 20B.

Figure 20C:
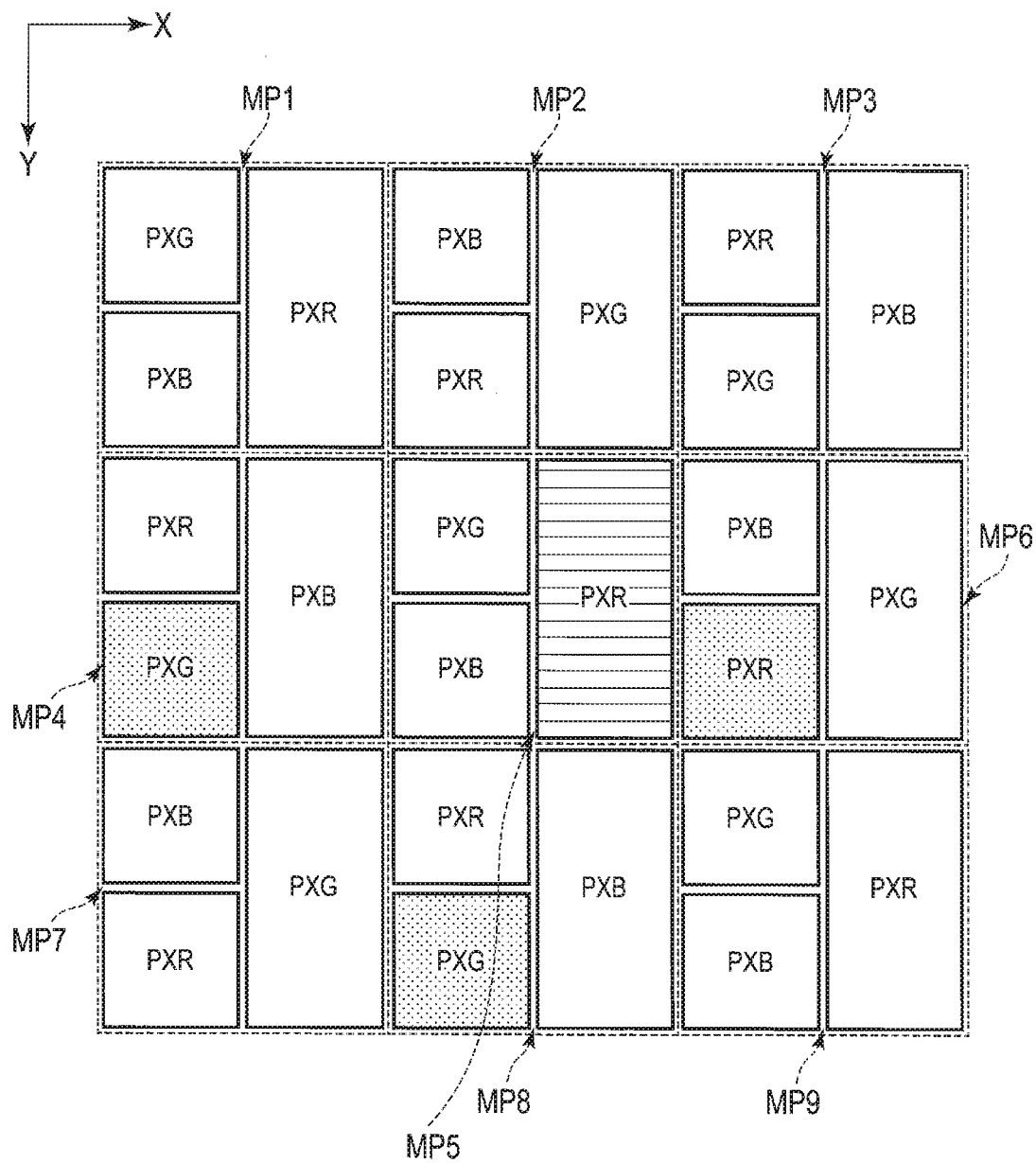
FIG. 20C is an illustration for explanation of a reference pixel and three pixels to be corrected according to Example 4.

In Expression (43), the red sub-pixel PXR of the main pixel MP5 corresponds to the reference pixel, and the green sub-pixel PXG of the main pixel MP4, the red sub-pixel PXR of the main pixel MP6, and the green sub-pixel PXG of the main pixel MP8 correspond to the correcting target pixels, as shown in FIG. 20C. However, the correcting target pixel may be a combination of any three sub-pixels of the blue sub-pixel PXB (sub-pixel Pan−w) and the red sub-pixel PXR (sub-pixel Pbn−w) of the main pixel MP2, the red sub-pixel PXR (sub-pixel Pan−1) and the green sub-pixel PXG (sub-pixel Pbn−1) of the main pixel MP4, the blue sub-pixel PXB (sub-pixel Pan+1) and the red sub-pixel PXR (sub-pixel Pbn+1) of the main pixel MP6, and the red sub-pixel PXR (sub-pixel Pan+w) and the green sub-pixel PXG (sub-pixel Pbn+w) of the main pixel MP8 as shown in FIG. 20C.

Figure 20D:
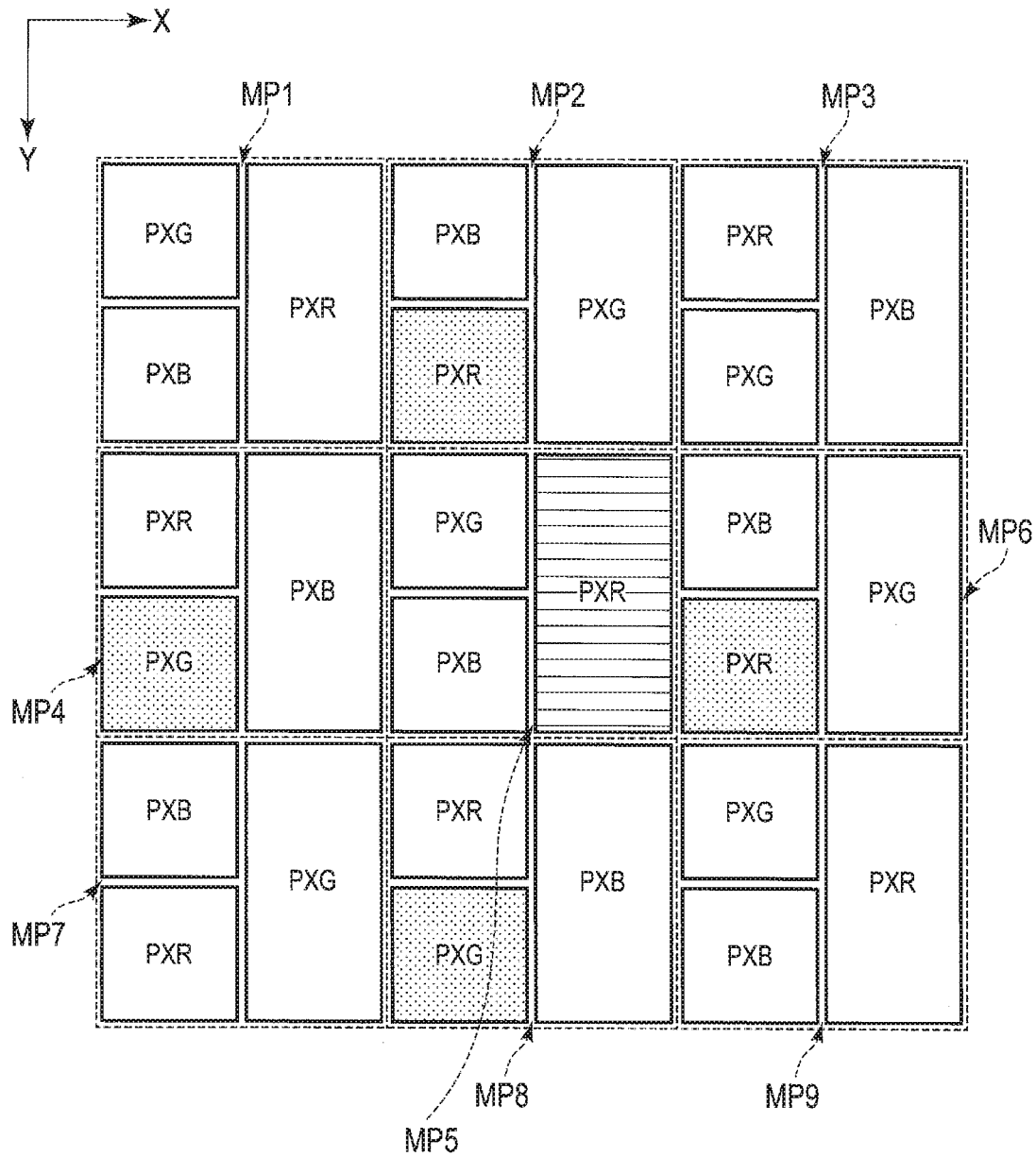
FIG. 20D is an illustration for explanation of a reference pixel and four pixels to be corrected according to Example 4.

In Expression (44), the red sub-pixel PXR of the main pixel MP5 corresponds to the reference pixel, and the red sub-pixel PXR of the main pixel MP2, the green sub-pixel PXG of the main pixel MP4, the red sub-pixel PXR of the main pixel MP6, and the green sub-pixel PXG of the main pixel MP8 correspond to the correcting target pixels, as shown in FIG. 20D.

EXAMPLE 5

As Example 5, any one of the sub-pixels in the main pixel MPn is assumed to be the reference pixel, any one of the sub-pixels in the adjacent main pixel MPn−1 is assumed to be the correcting target pixel, and the reference pixel and the correcting target pixel are assumed to be the sub-pixels having the same color.

First, the sub-pixel Pcn having the largest area in the main pixel MPn is assumed to be the reference pixel, and the sub-pixel Pan−1 having the smallest area in the main pixel MPn−1 is assumed to be the correcting target pixel. As shown in FIG. 6, both of the sub-pixels Pcn and Pan−1 are sub-pixels displaying red. An example of a simplified transformation for obtaining the corrected data Can−1 of the sub-pixel Pan−1 is as follows.

$$Can-1=((bn-w)+(an-1)+(bn+1)+(an+w)+cn)\div 5 \quad (51)$$

Expression (51) corresponds to an example of obtaining the corrected data by considering luminance of the reference pixel Pcn, and sub-pixels which are red similarly to the reference pixel Pcn, in four main pixels MPn−1, MPn+1, MPn+w and MPn−w adjacent to the main pixel MPn. The corrected data Cbn−w, Cbn+1, Can+w, and Ccn can also be obtained based on Expression (51).

Figure 21A:
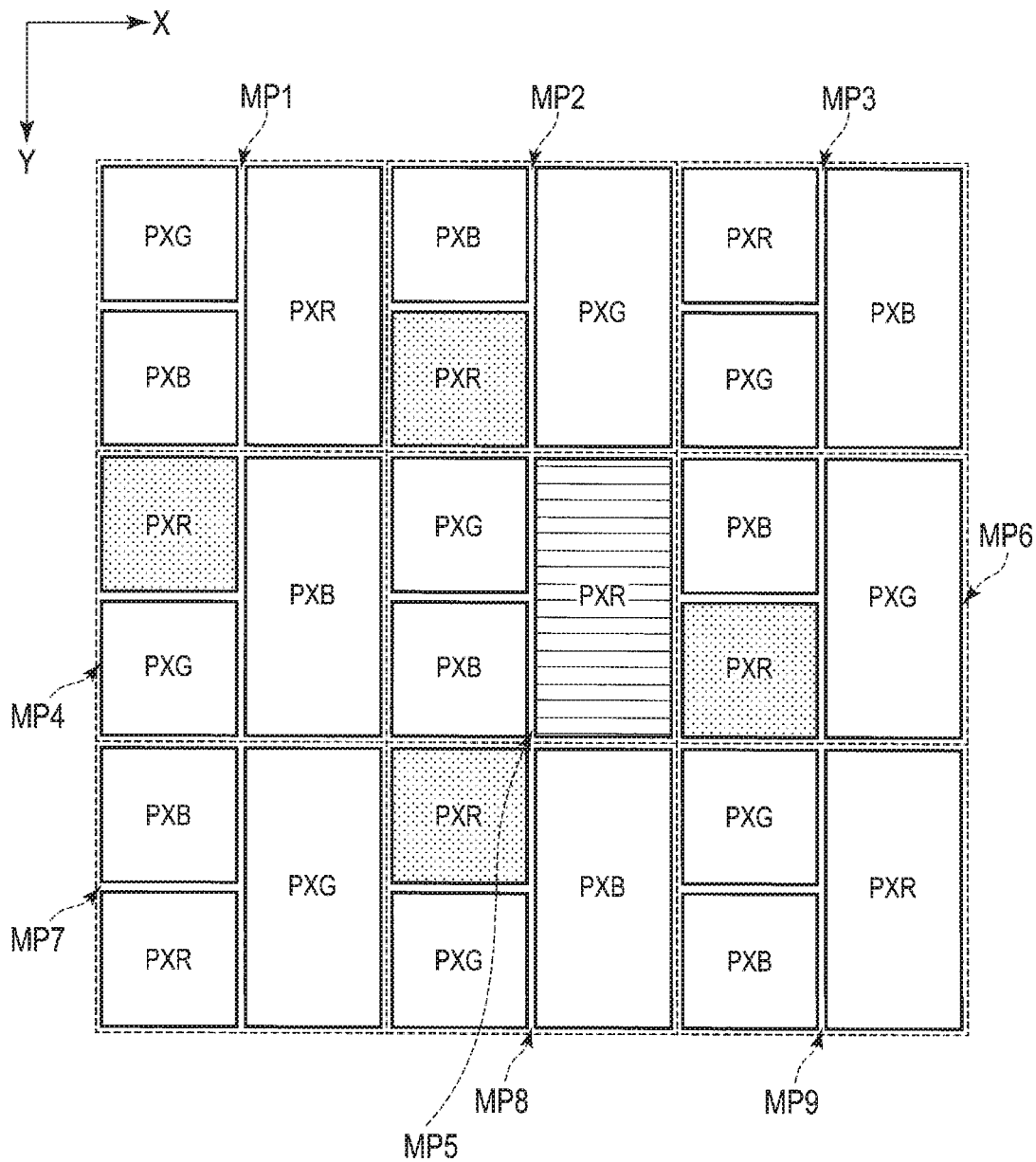
FIG. 21A is an illustration for explanation of a reference pixel and four pixels to be corrected according to Example 5.

In Expression (51), the red sub-pixel PXR of the main pixel MP5 corresponds to the reference pixel, and the red sub-pixel PXR of each of the main pixels MP2, MP4, MP6, and MP8 corresponds to the correcting target pixels, as shown in FIG. 21A.

Next, the sub-pixel Pan having the smallest area in the main pixel MPn is assumed to be the reference pixel, and the sub-pixel Pbn−1 having the smallest area in the main pixel MPn−1 is assumed to be the correcting target pixel. As shown in FIG. 6, both of the sub-pixels Pan and Pbn−1 are sub-pixels displaying green. An example of a simplified transformation for obtaining the corrected data Cbn−1 of the sub-pixel Pbn−1 is as follows.

$$Cbn-1=((bn-1)+(bn+w)+an)\div 3 \quad (52)$$

Expression (52) corresponds to an example of obtaining the corrected data by considering luminance of the reference pixel Pan, and sub-pixels which are green similarly to the reference pixel Pan, in four main pixels MPn−1, MPn+1, MPn+w and MPn−w adjacent to the main pixel MPn. The corrected data Cbn+w and Can can also be obtained based on Expression (52).

In addition, an can be replaced with bn in Expression (52). In other words, the reference pixel can be replaced with the blue sub-pixel. In this case, (bn−1) is replaced with (an+1) while (bn+w) is replaced with (an−w).

Figure 21B:
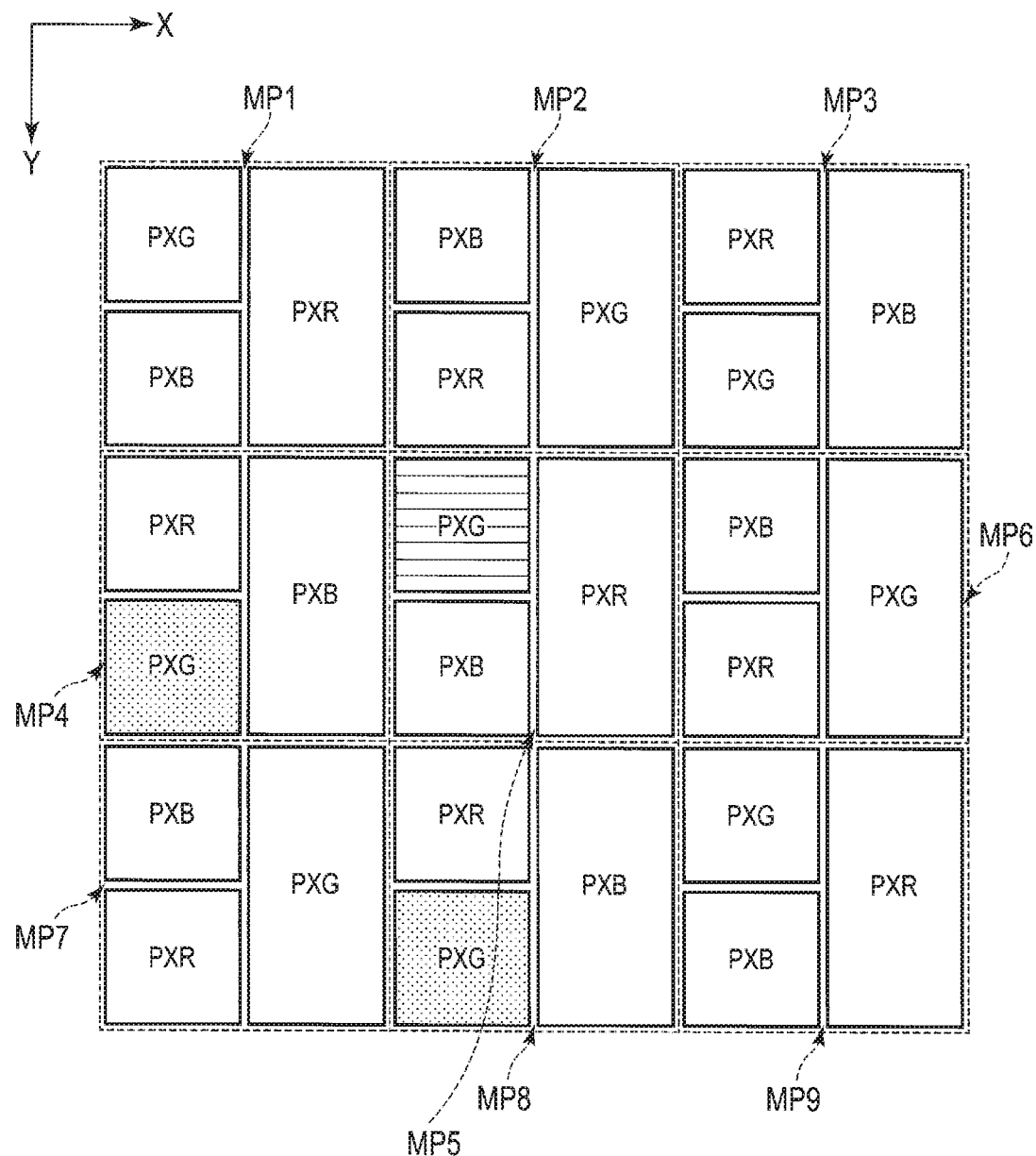
FIG. 21B is an illustration for explanation of a reference pixel and two pixels to be corrected according to Example 5.

In Expression (52), the green sub-pixel PXG of the main pixel MP5 corresponds to the reference pixel, and the green sub-pixel PXG of each of the main pixels MP4 and MP8 corresponds to the correcting target pixel, as shown in FIG. 21B.

Next, the sub-pixel Pbn having the smallest area in the main pixel MPn is assumed to be the reference pixel, and the sub-pixel Pcn−1 having the largest area in the main pixel MPn−1 is assumed to be the correcting target pixel. As shown in FIG. 6, both of the sub-pixels Pbn and Pcn−1 are sub-pixels displaying blue. An example of a simplified transformation for obtaining the corrected data Ccn−1 of the sub-pixel Pcn−1 is as follows.

$$Ccn-1=((cn-1)+(cn+w)+bn)\div 3 \quad (53)$$

Expression (53) corresponds to an example of obtaining the corrected data by considering luminance of the reference pixel Pbn, and sub-pixels which are blue similarly to the reference pixel Pbn, in four main pixels MPn−1, MPn+1, MPn+w and MPn−w adjacent to the main pixel MPn. The corrected data CCn+w and CBn can also be obtained based on Expression (53).

In addition, bn can be replaced with an in Expression (53). In other words, the reference pixel can be replaced with the green sub-pixel. In this case, (cn−1) is replaced with (cn+1) while (cn+w) is replaced with (cn−w).

Figure 21C:
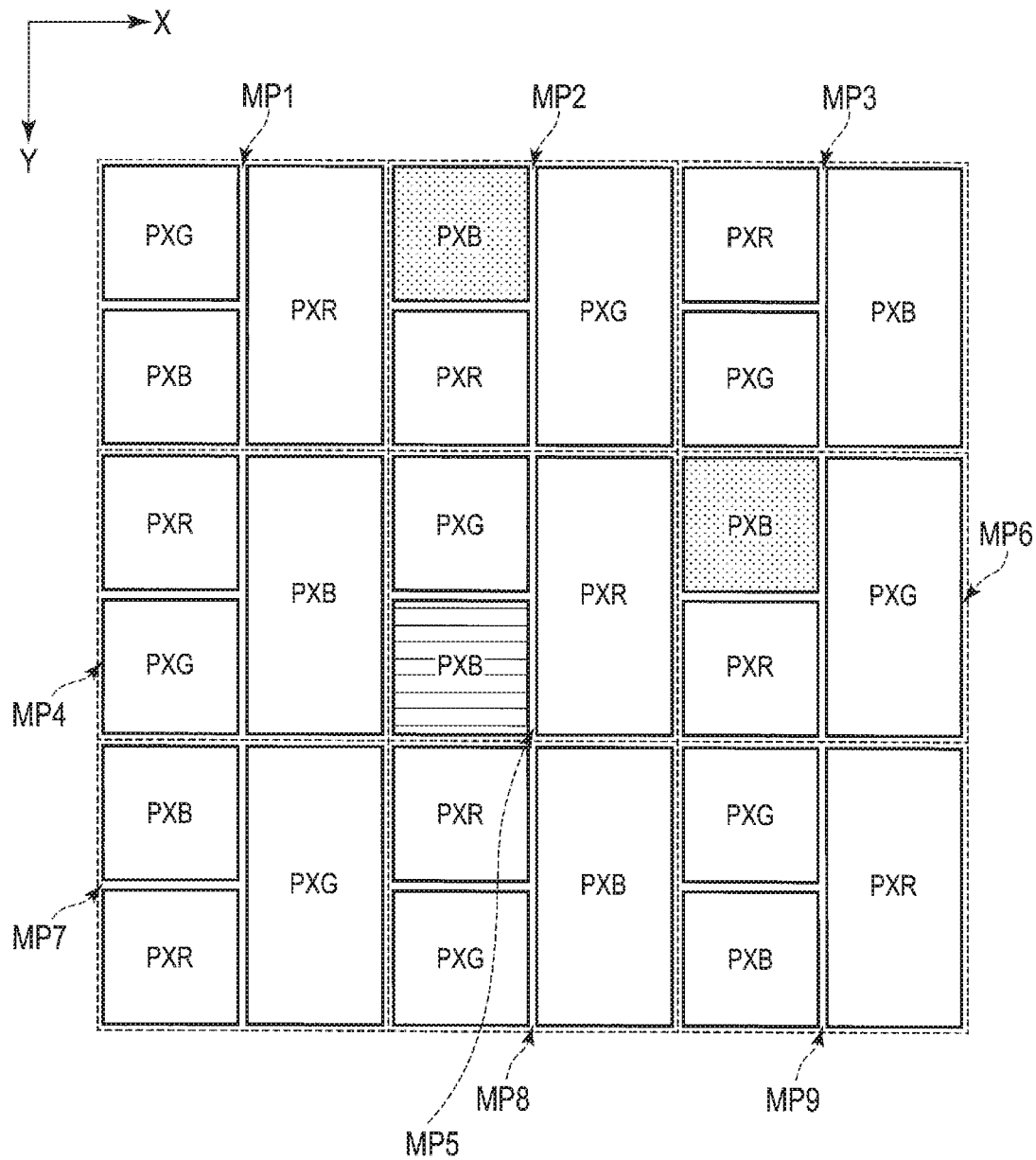
FIG. 21C is an illustration for explanation of a reference pixel and two pixels to be corrected according to Example 5.

In Expression (53), the blue sub-pixel PXB of the main pixel MP5 corresponds to the reference pixel, and the blue sub-pixel PXB of each of the main pixels MP2 and MP6 corresponds to the correcting target pixel, as shown in FIG. 21C.

As explained above, a display device capable of suppressing the degradation in display quality can be provided by the embodiments.

The present invention is not limited to the embodiments described above but the constituent elements of the invention can be modified in various manners without departing from the spirit and scope of the invention. Various aspects of the invention can also be extracted from any appropriate combination of constituent elements disclosed in the embodiments. For example, some of the constituent elements disclosed in the embodiments may be deleted. Furthermore, the constituent elements described in different embodiments may be arbitrarily combined.

What is claimed is:
1. A display device, comprising:
a plurality of main pixels including a first main pixel disposed in intersecting first and second directions,
the plurality of main pixels including a first main pixel, a second main pixel and a third main pixel,
wherein
the first main pixel comprises a first sub-pixel displaying a first color, a second sub-pixel displaying a second color different from the first color, and a third sub-pixel displaying a third color different from the first and second colors, the first and second sub-pixels are arranged in the second direction, the first and third sub-pixels are arranged in the first direction, and the second and third sub-pixels are arranged in the first direction, and each of the first and second sub-pixels has a first length in the first direction, and the third sub-pixel has a second length smaller than the first length in the first direction, a second main pixel includes fourth to sixth sub-pixels, a third main pixel includes seventh to ninth sub-pixels, the first main pixel, the second main pixel, and the third main pixel are arranged in order in the first direction, the fourth and fifth sub-pixels are arranged in the second direction and located between the third and sixth sub-pixels, and each of the fourth and fifth sub-pixels has a fifth length in the first direction, the sixth sub-pixel has a sixth length smaller than the fifth length in the first direction, the seventh and eighth sub-pixels are arranged in the second direction and located between the sixth and ninth sub-pixels, and each of the seventh and eighth sub-pixels has a seventh length in the first direction, the ninth sub-pixel has an eighth length smaller than the seventh length in the first direction, the sixth and eighth sub-pixels are sub-pixels displaying the first color, the fourth and ninth sub-pixels are sub-pixels displaying the second color, and the fifth and seventh sub-pixels are sub-pixels displaying the third color.

2. The display device of claim 1, wherein the first and second sub-pixels are formed in a same shape, and each of the first and second sub-pixels is formed in a rectangular shape having a third length smaller than the first length in the second direction.

3. The display device of claim 2, wherein the third sub-pixel is formed in a rectangular shape having a fourth length larger than the second length in the second direction.

4. The display device of claim 1, wherein a sum of the lengths of the first and the second sub-pixels in the second direction is equal to the length of the third sub-pixel in the second direction.

5. The display device of claim 1, wherein each of the first and second sub-pixels has a first area, the third sub-pixel has a second area, and the second area is greater than 0.5 times and smaller than twice the first area.

6. The display device of claim 1, wherein the length of the first main pixel in the first direction is equal to the length of the first main pixel in the second direction.

7. The display device of claim 1, wherein areas of the first to ninth sub-pixels are equal to each other.

8. A display device, comprising:

a plurality of main pixels including a first main pixel and a second main pixel adjacent to each other, disposed in intersecting first and second directions, wherein the first main pixel comprises first to third sub-pixels, the third sub-pixel has an area larger than areas of the first and second sub-pixels, the first and second sub-pixels are arranged in the second direction, the first and third sub-pixels are arranged in the first direction, and the second and third sub-pixels are arranged in the first direction, the second main pixel comprises fourth to sixth sub-pixels, the sixth sub-pixel has an area larger than areas of the fourth and fifth sub-pixels, the fourth and fifth sub-pixels are arranged in the second direction, the fourth and sixth sub-pixels are arranged in the first direction, and the fifth and sixth sub-pixels are arranged in the first direction, any one of the first to third sub-pixels is a reference pixel and any one of the fourth to sixth sub-pixels is a correcting target pixel to be corrected, input data to drive the reference pixel on a first luminance level is set at first input data, input data to drive the correcting target pixel on a second luminance level is set at second input level, the second input data is converted into corrected data of a third luminance level different from the second luminance level, based on the first input data and the second input data, and the correcting target pixel is driven based on the corrected data, and the corrected data is lower than a sum of the first input data and the second input data.

9. The display device of claim 8, wherein the reference pixel is the first sub-pixel and the correcting target pixel is the sixth sub-pixel.

10. The display device of claim 8, wherein the reference pixel is the third sub-pixel and the correcting target pixel is the sixth sub-pixel.

11. The display device of claim 8, wherein the reference pixel is the first sub-pixel and the correcting target pixel is the fourth sub-pixel.

12. The display device of claim 8, wherein the reference pixel is the third sub-pixel and the correcting target pixel is the fourth sub-pixel.

13. The display device of claim 8, wherein the reference pixel has a same color as the correcting target pixel.

14. The display device of claim 8, wherein the corrected data is half of a sum of the first input data and the second input data.

15. A display device, comprising:

a plurality of main pixels including a first main pixel disposed in intersecting first and second directions, wherein the first main pixel comprises first to third sub-pixels, the third sub-pixel has an area larger than areas of the first and second sub-pixels, the first and second sub-pixels are arranged in the second direction, the first and third sub-pixels are arranged in the first direction, and the second and third sub-pixels are arranged in the first direction, any one of the first to third sub-pixels is a correcting target pixel to be corrected, input data to drive the correcting target pixel on a first luminance level is converted into corrected data of a second luminance level different from the first luminance level, and the correcting target pixel is driven based on the corrected data, and the correcting target pixel is the third sub-pixel and the second luminance level is lower than the first luminance level.

16. A display device, comprising:

a plurality of main pixels including a first main pixel disposed in intersecting first and second directions, wherein the first main pixel comprises first to third sub-pixels, the third sub-pixel has an area larger than areas of the first and second sub-pixels, the first and second sub-pixels are arranged in the second direction, the first and third sub-pixels are arranged in the first direction, and the second and third sub-pixels are arranged in the first direction, any one of the first to third sub-pixels is a correcting target pixel to be corrected, input data to drive the correcting target pixel on a first luminance level is converted into corrected data of a second luminance level different from the first luminance level, the correcting target pixel is driven based on the corrected data, and the correcting target pixel is the first sub-pixel and the second luminance level is higher than the first luminance level.

* * * * *